United States Patent
Polu et al.

(10) Patent No.: US 12,365,006 B2
(45) Date of Patent: Jul. 22, 2025

(54) POWDER COATING FORMULATIONS AND METHODS THEREOF

(71) Applicant: IFS Coatings, Inc., Gainesville, TX (US)

(72) Inventors: Rajendra Polu, Gainesville, TX (US); Glynn Mason, Gainesville, TX (US)

(73) Assignee: IFS Coatings, Inc., Gainesville, TX (US)

( * ) Notice: Subject to any disclaimer, the term of this patent is extended or adjusted under 35 U.S.C. 154(b) by 0 days.

(21) Appl. No.: 18/815,736

(22) Filed: Aug. 26, 2024

(65) Prior Publication Data

US 2025/0065368 A1    Feb. 27, 2025

Related U.S. Application Data

(60) Provisional application No. 63/636,595, filed on Apr. 19, 2024, provisional application No. 63/534,448, filed on Aug. 24, 2023.

(51) Int. Cl.
| | | |
|---|---|---|
| *B05D 7/00* | (2006.01) | |
| *B05D 1/38* | (2006.01) | |
| *C09D 5/03* | (2006.01) | |
| *C09D 7/61* | (2018.01) | |
| *C09D 7/65* | (2018.01) | |

(52) U.S. Cl.
CPC ............ *B05D 7/542* (2013.01); *B05D 1/38* (2013.01); *C09D 5/037* (2013.01); *C09D 5/038* (2013.01); *C09D 7/61* (2018.01); *C09D 7/65* (2018.01)

(58) Field of Classification Search
CPC ...... C09D 5/037; C09D 5/038; C09D 167/00; C09D 5/03
See application file for complete search history.

(56) References Cited

U.S. PATENT DOCUMENTS

| | | | | |
|---|---|---|---|---|
| 8,354,173 B2 * | 1/2013 | Jing | ......... | C08K 5/13 |
| | | | | 524/323 |
| 9,751,107 B2 * | 9/2017 | Decker | ........... | B05D 1/06 |
| 10,280,314 B2 | 5/2019 | Reno et al. | | |
| 10,737,290 B2 | 8/2020 | Chapman | | |

(Continued)

FOREIGN PATENT DOCUMENTS

| | | | | |
|---|---|---|---|---|
| CN | 111793413 A | * | 10/2020 | ......... C09D 167/00 |
| EP | 0600546 B1 | | 4/1999 | |
| EP | 1095110 B1 | | 4/2005 | |

OTHER PUBLICATIONS

Machine-generated English-language translation of CN-111793413-A.*

(Continued)

*Primary Examiner* — Vu A Nguyen
(74) *Attorney, Agent, or Firm* — Fish & Richardson P.C.

(57) ABSTRACT

Provided herein are powder formulations for a primer coat and a topcoat, and methods of applying the powder formulations to at least a portion of a surface of a substrate. Such methods can include applying a powder formulation to a substrate for a topcoat alone or in combination with a primer coat, and then heating the substrate, thereby forming a cured coating on at least the portion of the surface of the substrate. Such heating can be conducted in a single cure step to provide the cured coating including a cured topcoat alone or in combination with a cured primer coat.

24 Claims, 5 Drawing Sheets

(56) References Cited

U.S. PATENT DOCUMENTS

| | | |
|---|---|---|
| 10,793,723 B2 | 10/2020 | Reno et al. |
| 10,857,566 B2 | 12/2020 | Chapman |
| 10,940,505 B2 | 3/2021 | Decker et al. |
| 11,007,550 B2 * | 5/2021 | Comley ............... B05D 3/108 |
| 11,098,202 B2 | 8/2021 | Decker et al. |
| 11,904,355 B2 | 2/2024 | Decker et al. |
| 11,925,957 B2 | 3/2024 | Decker et al. |
| 12,064,789 B2 | 8/2024 | Decker et al. |
| 2016/0257845 A1 | 9/2016 | Park et al. |
| 2018/0282572 A1 | 10/2018 | Lucas |
| 2018/0361429 A1 | 12/2018 | Comley et al. |

OTHER PUBLICATIONS

"The Role of Additives in Powder Coatings," published by Paint & Coatings Industry (PIC) online at https://www.pcimag.com/articles/93753-the-role-of-additives-in-powder-coatings on Nov. 6, 2003.*
Crylcoat-4420-0 Datasheet.*
International Search Report and Written Opinion in International Appln. No. PCT/US2024/043925, mailed on Jan. 17, 2025, 17 pages.

* cited by examiner

Conventional Powder Formulation

Powder Formulation

POWDER COATING FORMULATIONS AND METHODS THEREOF

CROSS-REFERENCE TO RELATED APPLICATION

This application claims the benefit of U.S. Provisional Application No. 63/534,448, filed Aug. 24, 2023, and U.S. Provisional Application No. 63/636,595, filed Apr. 19, 2024, the contents of which are incorporated herein by reference.

BACKGROUND

Powder coatings are superior to traditional liquid coatings in terms of sustainability because powder coatings are free of toxic solvents. Powder coatings, however, can be prone to poor coverage of certain surfaces, including those coated with a sealant.

SUMMARY

The present document relates to powder coatings that can be formulated to provide improved coverage of edges, corners, ridges, welds, and/or seams, including welds and/or seams coated with a sealant.

Accordingly, aspects of the present disclosure provide a powder coating system comprising:
  a powder formulation for a topcoat comprising:
  about 40 wt % to about 90 wt % of a carboxyl functional polyester resin, a hydroxyl functional polyester resin, or both;
  about 0.1 wt % to about 10 wt % of a first curing agent;
  about 0.05 wt % to about 5 wt % of a degassing agent;
  about 0.1 wt % to about 5 wt % of a first flow modifier; and
  one or more of about 0.05 wt % to about 5 wt % of a scratch resistance agent, about 0.05 wt % to about 5 wt % of a first transfer efficiency additive, and about 0.05 wt % to about 5 wt % of a phase-transfer catalyst;
  a powder formulation for a primer coat comprising:
  about 20 wt % to about 70 wt % of an epoxy resin;
  about 0.1 wt % to about 30 wt % of a second curing agent;
  about 1 wt % to about 80 wt % of a corrosion resistance filler; and
  about 0.05 wt % to about 5 wt % of a second flow modifier; wherein the powder coating system is formulated to provide a cured coating in which the powder formulations for the topcoat and the primer coat are simultaneously cured on a substrate using a single cure step.

In some embodiments, the powder formulation for the primer coat comprises about 0.05 wt % to about 5 wt % of a second degassing agent, about 0.05 wt % to about 5 wt % of a second transfer efficiency additive, or both.

In some embodiments, the powder coating system is suitable to provide a cured coating having one or more of the following characteristics:
  a scratch resistance of about 15 to about 45 mg loss of weight using ASTM test method D4060;
  a sealant coverage characterized by a thickness of the cured coating of about 25 to about 250 microns by a percentage coverage of at least 60% using ASTM test method D4138;
  an edge coverage of at least 12% using an Edge Coverage Test;
  a transfer efficiency of at least 60% using ASTM test method D5286-20; and
  the cured coating is substantially free of visible defects selected from the group consisting of a loss of gloss, sagging, blistering, discoloration, striation, a loss of adhesion, microcracks, bleed through, and combinations thereof.

In some embodiments, the carboxyl functional polyester resin comprises an acid number of about 25 to about 75 mg KOH/g of resin.

In some embodiments, the first curing agent comprises a polyepoxide, an isocyanate, a glycidyl ester, a hydroxyalkylamide, or combinations thereof.

In some embodiments, the degassing agent comprises benzoin, benzoin coated polyamide, polyamide, polyethylene, a modified or derivative form of any of these, or combinations thereof.

In some embodiments, the scratch resistance agent comprises polyethylene, wax, polysiloxane, an organosilicone polyether copolymer, a surface treated filler, or combinations thereof.

In some embodiments, the first transfer efficiency additive comprises a ceramic.

In some embodiments, the phase-transfer catalyst comprises an ammonium salt or a phosphonium salt.

In some embodiments, the powder formulation for the topcoat further comprises a corrosion resistance filler.

In some embodiments, the powder formulation for the topcoat is characterized by a flow of about 30 to about 90 mm at 340° F. using ASTM test method D4242.

In some embodiments, the epoxy resin has an epoxy equivalent weight (EEW) of about 500 to about 1250 g/eq.

In some embodiments, the second curing agent comprises cyanamide; dicyanamide; dicyandiamide; guanidine; cyanoguanidine; diguanide; an acid functional acrylic resin, a carboxyl functional polyester resin, a phenolic resin, a novolac phenolic resin; a diacid; hydroxyalkylamide; or combinations thereof.

In some embodiments, the corrosion resistance filler comprises an alkaline earth metal salt, an aluminate, a borate, a borosilicate, a carbonate, a chromate, a molybdate, an oxide, a phosphate, a phosphosilicate, a silicate, a sulfate, zinc, a zinc salt, or combinations thereof.

In some embodiments, the second transfer efficiency additive comprises a ceramic.

In some embodiments, the powder formulation for the primer coat is characterized by a flow of about 13 to about 60 mm at 340° F. using ASTM test method D4242.

Aspects of the present disclosure provide a powder formulation for a topcoat, the formulation comprising:
  about 40 wt % to about 90 wt % of a resin comprising a carboxyl functional polyester resin, a hydroxyl functional polyester resin, or both;
  about 0.1 wt % to about 10 wt % of a curing agent;
  about 0.05 wt % to about 5 wt % of a degassing agent;
  about 0.1 wt % to about 5 wt % of a flow modifier; and
  optionally about 0.05 wt % to about 5 wt % of a scratch resistance agent, about 0.05 wt % to about 5 wt % of a transfer efficiency additive, about 0.05 wt % to about 5 wt % of a phase-transfer catalyst, or combinations thereof.

Aspects of the present disclosure provide a powder formulation for a primer coat, the formulation comprising:
  about 20 wt % to about 70 wt % of an epoxy resin;
  about 0.1 wt % to about 30 wt % of a second curing agent;
  about 1 wt % to about 80 wt % of a corrosion resistance filler; and
  about 0.05 wt % to about 5 wt % of a second flow modifier; and optionally about 0.05 wt % to about 5 wt % of a second degassing agent, about 0.05 wt % to about 5 wt % of a second transfer efficiency additive, or both.

Aspects of the present disclosure provide a powder coating system comprising:

a first powder formulation for a primer coat, wherein the first powder formulation comprises an epoxy resin and a cyanimide curing agent; and a second powder formulation for a topcoat, wherein the second powder formulation comprises a carboxyl functional polyester resin, a hydroxyl functional polyester resin, or both, and an epoxy curing agent;

wherein the powder coating system is formulated to provide a cured coating in which the first and second powder formulations are simultaneously cured on a substrate with a single cure step.

Aspects of the present disclosure provide a powder coated substrate comprising:

a substrate; and a cured coating, wherein the cured coating comprises:

a primer coat comprising the powder formulation of any one of claims 1-17 or a cured form thereof, wherein the primer coat is disposed on at least a portion of a surface of the substrate; and a topcoat comprising the powder formulation of any one of claims 1-17, or a cured form thereof, wherein the topcoat is disposed on at least a portion of a surface of the primer.

In some embodiments, the substrate comprises a metal substrate.

In some embodiments, the substrate comprises a seam comprising a polymeric sealant.

In some embodiments, the cured coating has one or more of the following characteristics:

a scratch resistance of about 15 to about 45 mg loss of weight using ASTM test method D4060;

a sealant coverage characterized by a thickness of the cured coating of about 25 to about 250 microns, by a percentage coverage of at least 60%, or a combination thereof using ASTM test method D4138;

an edge coverage of at least 12% using an Edge Coverage Test;

a transfer efficiency of at least 60% using ASTM test method D5286-20; and the cured coating is substantially free of visible defects consisting of a group selected from a loss of gloss, sagging, blistering, discoloration, striation, loss of adhesion, microcracks, bleed through, and combinations thereof.

Aspects of the present disclosure provide a method of forming a cured powder coating, the method comprising:

applying a first powder formulation of any one of claims 1-17 to a substrate to form a primer coat on at least a portion of a surface of the substrate;

applying a second powder formulation of any one of claims 1-17 to at least a portion of a surface of the primer coat to form a topcoat disposed on the primer coat, wherein the primer coat has not been heated prior to forming the topcoat; and heating the substrate with the primer coat and the topcoat applied thereon, thereby forming a cured coating on at least a portion of the surface of the substrate.

In some embodiments, the applying the second powder formulation comprises applying the second powder to an uncured primer coat.

In some embodiments, the cured coating is formed by heating the substrate with the primer coat and the topcoat in a single heating step.

Other features and advantages of the disclosure will be apparent from the following detailed description, and from the claims.

DETAILED DESCRIPTION

Figure 1:
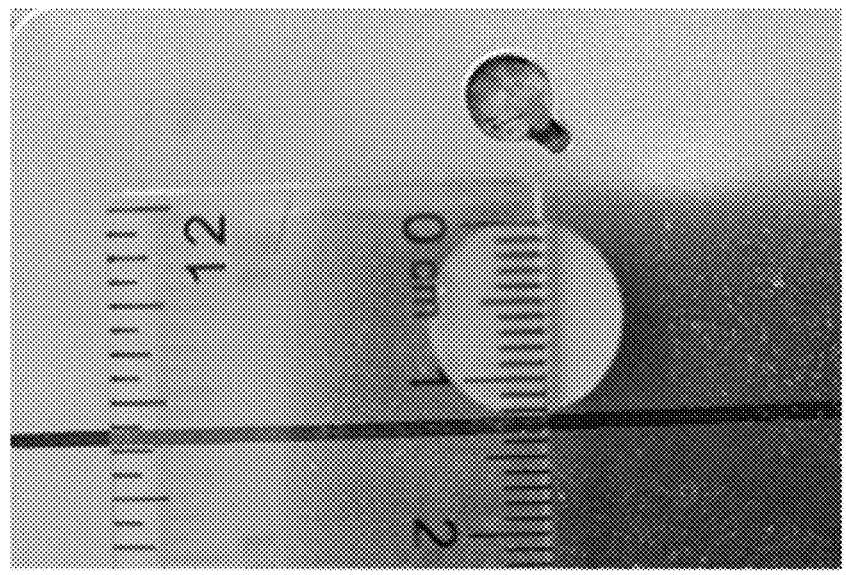
FIG. 1 is a representative image of a pellet from a pill flow preparation of an example primer formulation.

Aspects of the present disclosure provide powder coating formulations including powder formulations for a primer coat and powder formulations for a topcoat. A powder formulation for a topcoat can be applied to a portion of a surface of a substrate without use of another coating such as a primer coat. Alternatively, the powder formulation for the topcoat can be applied to a substrate in combination with a powder formulation for a primer coat. In such instances, the powder formulation for the topcoat can be applied to at least a portion of a surface of the primer coat to form a topcoat disposed on the primer coat. The powder coating formulations disclosed herein are formulated to advantageously provide a cured coating in which the powder formulations for the topcoat and the primer coat are simultaneously cured on a substrate using a single cure step.

Also provided herein are methods of applying the powder formulations to at least a portion of a surface of a substrate. Methods described herein can include heating the substrate with the primer coat and the topcoat applied thereon, thereby forming a cured coating on at least the portion of the surface of the substrate. Such heating can be conducted without curing the primer coat prior to applying the topcoat. In this way, heating can provide a single cure step to provide the cured coating including a cured primer coat and a cured topcoat. When a powder formulation for a topcoat is employed without use of another coating such as a primer coat, the methods can include heating the substrate with the topcoat applied thereon, thereby forming a cured topcoat on at least a portion of a surface of a substrate.

In some embodiments, the powder formulations described herein possess certain characteristics to address challenges that can be encountered when using conventional powder coatings. Without wishing to be limited by mechanism or theory, the use of powder formulations can be challenging with certain types of surfaces, such as those having non-planar features (e.g., edges, welds, etc.) and/or those having certain compositions disposed thereon (e.g., a sealant composition disposed on a portion of a surface). As described herein, certain types and/or amounts of components can be provided to enhance one or more characteristics of the powder formulation or a coating formed by using such a formulation.

In some embodiments, a powder formulation (e.g., for a topcoat and/or a primer coat) and/or a coating (e.g., formed from one or more powder formulations) is characterized, but are not limited to one or more of the following:

(a) Conventional powder coatings can be prone to scratching, marring, or other types of mechanical and chemical damage. However, the powder coating formulations provided herein can be advantageously configured to allow for enhanced mechanical resistance, such as enhanced resistance to scratch, mar, or other types of mechanical damage to a powder coating. In some embodiments, the powder formulation can include one or more scratch resistance agents or other components of a type and/or in an amount configured to provide improved mechanical resistance. Thus, in some non-limiting embodiments, a powder formulation herein can provide improved mechanical resistance, as compared to a conventional powder coating.

(b) Use of a water-proof sealant can minimize corrosion of metal-metal contacts that may be present in proximity to a metal substrate. Yet, conventional powder coatings can be prone to poor coverage of the sealant. In addition to providing a non-planar surface to be coated, the sealant can also undergo physical or chemical changes upon exposure to heat during curing of the powder coating. Such poor coverage can be evidenced by, e.g., sagging of the sealant in the presence of the conventional powder coating. But the powder formulation provided herein can be configured to stabilize the sealant and minimize its sagging, thereby providing enhanced sealant coverage as compared to conventional powder coatings. In some embodiments, the powder formulation can include one or more flow modifiers or other components of a type and/or in an amount configured to provide improved sealant coverage. Thus, in some non-limiting embodiments, a powder formulation herein can provide improved sealant coverage, as compared to a conventional powder coating. Such enhanced sealant coverage can be achieved with a variety of different sealants, e.g., butyl sealants, silicone sealants, polyurethane sealants, and the like. Enhanced sealant coverage can be determined in any useful manner, e.g., as described herein.

(c) Conventional powder coatings can often be prone to poor coverage of edges, corners, ridges, welds, and/or seams. The powder formulations provided herein, however, can be advantageously configured to exhibit improved flow properties and/or improved electrostatic properties that reduce Faraday cage effects to enable more robust coverage of edges, corners, ridges, welds, and/or seams than can be achieved using conventional powder coatings. In some embodiments, the powder formulation can include one or more flow modifiers, phase-transfer catalysts, transfer efficiency additives, or other components of a type and/or in an amount configured to provide improved coverage of edges, corners, ridges, welds, and/or seams. Thus, in some non-limiting embodiments, a powder formulation herein can provide improved coverage of edges, corners, ridges, welds, and/or seams, as compared to a conventional powder coating.

(d) Conventional powder coatings can be characterized as having poor transfer efficiency under certain conditions, e.g., such as when the substrate is poorly grounded, when the substrate includes Faraday cage areas, recessed areas, sharp edges, and/or when conditions involve back ionization due to the application of multiple coats and/or thicker films. In some embodiments, transfer efficiency can be used to determine the extent to which an applied or sprayed powder formulation is deposited onto a substrate, such as by determining the ratio of an amount of powder deposited on the substrate to an amount of powder applied to the substrate. The powder formulations provided herein can be configured to include particles that hold their charge for longer times than particles in conventional powder coatings, thereby allowing more of the powder formulation to build up and/or remain on a conductive substrate. In some embodiments, the powder formulation can include one or more transfer efficiency additives, flow modifiers, or other components of a type and/or in an amount configured to provide improved transfer efficiency. Thus, in some embodiments, a powder formulation herein can provide improved transfer efficiency, as compared to a conventional powder coating.

(e) Conventional powder coatings can suffer from properties that arise when a topcoat and a primer coat are not sufficiently compatible when employed together. The powder formulation provided herein can be advantageously configured to have improved gloss of the topcoat when employed in combination with the primer coat and/or to have reduced bleed through of a primer coat through the topcoat. In some embodiments, the powder formulation can include one or more flow modifiers, transfer efficiency additives, or other components of a type and/or in an amount configured to provide improved compatibility, which in turn can be characterized by improved gloss, improved gloss consistency, reduced bleed through, and/or reduced discoloring. Thus, in some non-limiting embodiments, a powder formulation herein can provide improved gloss, improved gloss consistency, reduced bleed through, and/or reduced discoloring, as compared to a conventional powder coating.

(f) Conventional powder coatings can suffer from inconsistent or insufficient gloss over dissimilar materials. But the powder formulations provided herein can be beneficially configured to have reduced curing times compared to conventional powder coatings, which can minimize over baking and destruction of the gloss. In some embodiments, the powder formulation can include one or flow modifiers or other components of a type and/or in an amount configured to provide enhanced gloss and/or improved gloss consistency. Thus, in some non-limiting embodiments, a powder formulation herein can provide enhanced gloss and/or improved gloss consistency, as compared to a conventional powder coating.

(g) Conventional powder coatings can be prone to discoloring, which can result when a substance from the substrate bleeds through the coating, thereby creating a discolored finish. However, the powder formulations provided herein can be advantageously configured to minimize the bleed through of substances from the substrate through the powder formulation or powder coating to provide a uniform finish. In some embodiments, the powder formulation can include one or flow modifiers or other components of a type and/or in an amount configured to provide reduced bleed through and/or reduced discoloring. Thus, in some non-limiting embodiments, a powder formulation herein can provide reduced bleed through or discoloring, as compared to a conventional powder coating.

(h) Conventional powder coatings can be prone to gassing defects arising from trapped gas (e.g., volatile gas, moisture, etc.) that evolve through the coating during curing, which in turn may cause holes or other discontinuous features to form in the coating. The powder formulation described herein can be configured to allow for degassing of trapped gas through the powder formulation during curing, thereby facilitating formation of a continuous coating. In some embodiments, the powder formulation can include one or degassing agents, flow modifiers, or other components of a type and/or in an amount configured to provide reduced degassing defects. Thus, in some non-limiting embodiments, a powder formulation herein can provide reduced gassing defects, as compared to a conventional powder coating.

(i) Conventional powder coatings can often be prone to poor edge coverage. But the flow of the powder formulations provided herein can be formulated to allow robust edge coverage by the powder formulation, which can hold the powder formulation on the edge of the surface, thereby providing enhanced edge coverage as compared to conventional powder coatings. In some embodiments, the powder formulation can include one or more flow modifiers, phase-transfer catalysts, transfer efficiency additives, or other components of a type and/or in an amount configured to provide improved flow and improved edge coverage. Thus, in some non-limiting embodiments, a powder formulation herein can provide improved edge coverage as compared to a conventional powder coating.

(j) Conventional powder coatings can often be prone to poor substrate wetting. But the powder formulation disclosed herein can be beneficially configured to exhibit improved flow properties that allow more robust substrate wetting than can be achieved using conventional powder coatings. In some embodiments, the powder formulation can include one or more flow modifiers, phase-transfer catalysts, transfer efficiency additives, or other components of a type and/or in an amount configured to provide improved substrate wetting. Thus, in some non-limiting embodiments, a powder formulation herein can provide improved substrate wetting as compared to a conventional powder coating.

(k) Conventional powder coatings can often be heated at high temperatures to ensure formation of a cured coating. The powder formulation provided herein can be advantageously configured to exhibit lower cure temperatures, thereby reducing substrate distortion and energy demands compared to conventional powder coatings. In some embodiments, the powder formulation can include one or more flow modifiers, phase-transfer catalysts, transfer efficiency additives, or other components of a type and/or in an amount configured to provide lower cure temperatures compared to conventional powder coating. Thus, in some non-limiting embodiments, a powder formulation herein can provide lower cure temperatures as compared to a conventional powder coating.

In some embodiments, a powder formulation (e.g., for a topcoat and/or a primer coat) and/or a coating (e.g., formed from one or more powder formulations) includes one or more of the following properties:

(a) a cure temperature from about 300° F. to about 400° F. (e.g., from about 300° F. to about 375° F.);

(b) a cure time from about 5 minutes to about 35 minutes;

(c) a crosshatch adhesion of 4B to 5B, which may be determined in any manner, such as in accordance with ASTM test method D3359;

(d) a harness of H to 5H, which may be determined in any manner, such as by using a pencil test in accordance with ASTM test method D3363 or by using a Knoop indentation test in accordance with ASTM test method D1474;

(e) an edge coverage of at least 12%, which may be determined in any manner, such as in accordance with ASTM test method D2967-96 or an Edge Coverage Test described herein; and (f) resistance to corrosion, impact, chipping, weathering or a combination of any of these.

Powder Formulation for a Topcoat

Provided herein is a powder formulation for a topcoat comprising a resin, a curing agent, a degassing agent, and/or a flow modifier. In some embodiments, the powder formulation can include one or more of a scratch resistance agent, a transfer efficiency additive, and/or a phase-transfer catalyst. The resin for a powder formulation for a topcoat can comprise a carboxyl functional polyester resin, a hydroxyl functional polyester resin, or both.

The powder formulation for the topcoat can further comprise one or more of the following: a wetting agent, an antioxidant, a pigment, a matting agent, a crosslinking agent, a corrosion resistance filler, an adhesion promoting agent, and/or a rheology modifier.

The powder formulation for the topcoat can comprise a resin, e.g., a carboxyl functional polyester resin, a hydroxyl functional polyester resin, or both. In some embodiments, the powder formulation for the topcoat comprises a carboxyl functional polyester resin and a hydroxyl functional polyester resin. In some embodiments, the powder formulation for the topcoat can comprise a carboxyl functional polyester resin and a hydroxyl functional polyester resin in any amount such that the total amount of resin in the formulation is about 40 wt % to about 90 wt %. For example and without limitation, a person of ordinary skill in the art would understand that when the total amount of resin in the formulation is about 90 wt %, the carboxyl functional polyester resin and the hydroxyl functional polyester resin can be present between the following amounts: 0 wt % and 90 wt %, 1 wt % and 89 wt %, 5 wt % and 85 wt %, 10 wt % and 80 wt %, 15 wt % and 75 wt %, 30 wt % and 60 wt %, 45 wt % and 45 wt %, 60 wt % and 30 wt %, 75 wt % and 15 wt %, 80 wt % and 10 wt %, 85 wt % and 5 wt %, 89 wt % and 1 wt %, or 90 wt % and 0 wt % (amount of carboxyl functional polyester resin and amount of hydroxyl functional polyester resin). Accordingly, the person of ordinary skill in the art will recognize the amount of carboxyl functional polyester resin and the amount of hydroxyl functional polyester resin that are suitable such that the total amount of resin in the formulation is about 40 wt % to about 90 wt %.

In some embodiments, the powder formulation for the topcoat comprises a carboxyl functional polyester resin comprising an acid number of about 25 to about 75 mg KOH/g of resin, e.g., about 25 to about 50, about 25 to about 45, about 25 to about 40, about 25 to about 35, about 25 to about 30 mg, about 30 to about 55, about 35 to about 55, about 40) to about 55, about 45 to about 55, or about 50 to about 55 KOH/g of resin. In some embodiments, the powder formulation for the topcoat comprises a carboxyl functional polyester resin comprising an acid number of about 25 to about 40 mg KOH/g of resin and an equivalent weight of about 1400 to about 2225.

In some embodiments, the powder formulation for the topcoat comprises a hydroxyl functional polyester resin comprising a hydroxyl number of about 20 to about 200 mg KOH/g of resin, e.g., about 25 to about 200, about 50 to about 200, about 75 to about 200, about 100 to about 200, about 125 to about 200, about 150 to about 200, about 175 to about 200, about 20) to about 175, about 20 to about 150, about 20 to about 125, about 20 to about 100, about 20 to about 75, about 20 to about 50, or about 20 to about 25 mg KOH/g of resin.

In some embodiments, the powder formulation for the topcoat comprises a hydroxyl functional polyester resin comprising a hydroxyl number of about 20 to about 170 mg KOH/g, about 30 to about 160 mg KOH/g, or about 40 to about 150 mg KOH/g of resin.

In some embodiments, the powder formulation for the topcoat comprises a resin (e.g., a carboxyl functional polyester resin, a hydroxyl functional polyester resin, or both) in a total amount of about 40 wt % to about 90 wt % of the formulation, e.g., about 50 wt % to about 90 wt %, about 60 wt % to about 90 wt %, about 60 wt % to about 70 wt %, about 50 wt % to about 80 wt %, about 40 wt % to about 80 wt %, about 40 wt % to about 70 wt %, about 40 wt % to about 60 wt %, or about 40 wt % to about 60 wt % of the formulation. In some embodiments, the powder formulation for the topcoat comprises a resin in a total amount of about 65 wt % to about 90 wt % of the formulation.

In some embodiments, the powder formulation for the topcoat comprises one or more resins (e.g., any described herein) in a total amount of at least about 40 wt % (e.g., at least about 45 wt %, at least about 50 wt %, at least about 55 wt %, at least about 60 wt %, at least about 65 wt %, or at least about 70 wt %) and/or at most about 90 wt % (e.g., at most about 85 wt %, at most about 80 wt %, at most about 75 wt %, at most about 70 wt %, at most about 65 wt %, or at most about 60 wt %) of the formulation.

In some embodiments, the resin (e.g., for the topcoat) is characterized by a viscosity of about 1,000 to 10,000 mPa s at 200° C., e.g., about 2,500 to 10,000; about 5,000 to 10,000; about 7,500 to 10,000; about 1,000 to 7,500; about 1,000 to 5,000; or about 1,000 to 2,500; mPa s at 200° C. In some embodiments, viscosity may be determined in accordance with ASTM test method D4287.

Non-limiting examples for resins include ALBESTER™ resins from Synthomer, London, UK (e.g., ALBESTER™ 3391, hydroxyl terminated polyester resin having a hydroxyl value of 190-210; ALBESTER™ 3140, hydroxyl terminated polyester resin having a hydroxyl value of 40-50), CRYL-COAT® resins from Allnex, Frankfurt, Germany (e.g., CRYLCOAT® 4420-0, carboxyl functional polyester resin having an acid value from 49 to 54: CRYLCOAT® 4488-0, carboxyl functional polyester resin having an acid value from 27 to 33: CRYLCOAT® E 04569, carboxyl functional polyester resin having an acid value from 33 to 37: CRYL-COAT® 4626-0, carboxyl functional polyester resin having an acid value from 47-53), RUCOTE® resins from Stepan Company, Northfield, IL (e.g., RUCOTE® 102, hydroxyl functional polyester resin having a hydroxyl value of 40: RUCOTE® 104, hydroxyl functional polyester resin having a hydroxyl value of 112: RUCOTE® 9010, carboxyl functional polyester resin having an acid value of 32), SP-6400 (a carboxylated polyester resin having an acid value from 28 to 36 from Sun Polymers International, Inc., Mooresville, IN), URALAC® P3281 (a saturated, carboxylated polyester resin having an acid value from 34 to 38 from Covestro AG, Leverkusen, Germany), URALAC P® 1550 (a hydroxylated polyester having a hydroxyl value of 38-45 mg KOH/g from Covestro AG, Leverkusen, Germany), and the like. Combinations of such resins, or any other resins herein, may be employed.

The powder formulation for the topcoat can comprise a curing agent, e.g., a polyepoxide such as triglycidyl isocyanurate. In some embodiments, the powder formulation for the topcoat comprises a curing agent (e.g., a polyepoxide (e.g., such as triglycidyl isocyanurate or tris (2,3-epoxypropyl) isocyanurate), an isocyanate (e.g., a polyisocyanate, an isocyanate adduct, an aliphatic polyisocyanate, a cycloaliphatic polyisocyanate, and the like), a glycidyl ester (e.g., glycidyl methacrylate, triglycidyl trimellitate, diglycidyl terephthalate, and the like), a hydroxyalkylamide (e.g., β-hydroxyalkylamide, and the like), or a combination of any of these) in a total amount of about 1 wt % to about 8 wt % of the formulation, e.g., about 2 wt % to about 8 wt %, about 4 wt % to about 8 wt %, about 6 wt % to about 8 wt %, about 1 wt % to about 6 wt %, about 1 wt % to about 4 wt %, or about 1 wt % to about 2 wt % of the formulation.

In some embodiments, the powder formulation for the topcoat comprises one or more curing agents (e.g., any described herein) in a total amount of at least about 1 wt % (e.g., at least about 1.5 wt %, at least about 2 wt %, at least about 2.5 wt %, at least about 3 wt %, at least about 3.5 wt %, at least about 4 wt %, at least about 4.5 wt %, or at least about 5 wt %) and/or at most about 10 wt % (e.g., at most about 8 wt %, at most about 7.5 wt %, at most about 7 wt %, at most about 6.5 wt %, at most about 6 wt %, at most about 5.5 wt %, or at most about 5 wt %) of the formulation.

In some embodiments, the polyepoxide comprises a plurality of —CH(O)CH$_2$ groups or a plurality of —CH$_2$CH(O)CH$_2$ groups. In some embodiments, the isocyanate comprises one or more-NCO groups. In some embodiments, the glycidyl ester includes one or more of —C(O)OCH$_2$CH(O)CH$_2$ groups.

In some embodiments, the hydroxyalkylamide is (R$^{N1}$)$_2$NC(O)-Ak-C(O)N(R$^{N1}$)$_2$, in which each R$^{N1}$ is, independently, hydrogen (H) or an optionally substituted C$_{1-18}$ hydrocarbyl group (e.g., alkyl, haloalkyl, hydroxyalkyl, aryl, alkaryl, aralkyl, etc.); Ak is an optionally substituted multivalent (e.g., divalent) substituted C$_{1-18}$ hydrocarbyl group (e.g., alkylene, alkenylene, alkynylene, etc.); and at least one R$^{N1}$ is an optionally substituted hydroxyalkyl.

In some embodiments, Ak is optionally substituted with one or more substituents described herein for hydrocarbyl or alkyl.

In some embodiments, the hydroxyalkyl is an alkyl group (e.g., as described herein) with one, two, three, or more hydroxyl groups (e.g., —OH). In some embodiments, the hydroxyalkyl is optionally substituted with one or more substituents described herein for hydrocarbyl or alkyl. In some embodiments, the hydroxyalkyl is -Ak-OH, in which Ak is alkylene optionally substituted with one or more substituents described herein for hydrocarbyl or alkyl.

Depending on the resin present in the formulation, a corresponding curing agent can be selected based on its reactivity with the functional groups present on the resin. In addition to the type of curing agent, the amount of curing agent and resin can be selected to provide a coating having desired properties. For example and without limitation, a person of ordinary skill in the art would understand that an optimized ratio of curing agent to resin may depend on the number and type of reactive groups presented on the resin and provided by the curing agent. In some embodiments, an equivalent ratio of curing agent and resin can be included in the powder formulation for the topcoat to minimize the amount of unreacted resin and/or unreacted curing agent in the powder formulation. Accordingly, in some embodiments, the powder formulation for the topcoat can comprise a curing agent and a resin in a ratio of about 1:1 in terms of the reactive group of the curing agent and the functional group of the resin that is capable of reacting with the reactive group of the curing agent.

For example and without limitation, a person of ordinary skill in the art will recognize which curing agent or curing agents are suitable for use with which resin or resins. For example, the person of ordinary skill in the art will recognize that a polyepoxide may be suitable for use as a curing agent with a carboxyl functional polyester resin. In another non-limiting example, the person of ordinary skill in the art will recognize that blocked or internally blocked isocyanate may be suitable for use as a curing agent with a hydroxyl functional polyester resin. In another non-limiting example, the person of ordinary skill in the art will recognize that dicyanamide may be suitable for use as a curing agent with an epoxy resin. Other combinations of curing agent(s) with resin(s) are encompassed by the formulations herein.

The powder formulation for the topcoat can comprise a degassing agent, e.g., benzoin, benzoin coated polyamide, polyamide, polyethylene, modified forms of any of these, or a combination of any of these. In some embodiments, the powder formulation for the topcoat comprises a degassing agent (e.g., benzoin, benzoin coated polyamide, polyamide, a derivative form of any of these, or a combination of any of these) in a total amount of about 0.05 wt % to about 5 wt % of the formulation, e.g., about 1 wt % to about 5 wt %, about 2 wt % to about 5 wt %, about 3 wt % to about 5 wt %, about 4 wt % to about 5 wt %, about 0.05 wt % to about 4 wt %, about 0.05 wt % to about 3 wt %, about 0.05 wt % to about 2 wt %, or about 0.05 wt % to about 1 wt % of the formulation. In some embodiments, the polyamide is an amide modified phenolated urea surfactant. In some embodiments, the modified polyethylene is polyethylene modified with polyamide.

In some embodiments, the powder formulation for the topcoat comprises one or more degassing agents (e.g., any described herein) in a total amount of at least about 0.05 wt % (e.g., at least about 0.1 wt %, at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, at least about 1.5 wt %, at least about 2 wt %, at least about 2.5 wt %, at least about 3 wt %, at least about 3.5 wt %, at least about 4 wt %, at least about 4.5 wt %, or at least about 5 wt %) and/or at most about 10 wt % (e.g., at most about 8.5 wt %, at most about 8 wt %, at most about 7.5 wt %, at most about 7 wt %, at most about 6.5 wt %, at most about 6 wt %, at most about 5.5 wt %, or at most about 5 wt %) of the formulation.

Non-limiting examples for degassing agents include CERETAN® MAB7055 (micronized Amide wax, coated with benzoin from Münzing Micro Technologies GmbH, Abstatt, Germany), POWDERMATE® 542DG (a polyamide- or amide-modified phenolated urea surfactant from Arxada-Troy Corp., Florham Park, NJ), CERAFLOUR® 962 (a micronized modified polyethylene wax from BYK-Chemie GmbH, Wesel, Germany), (MPP-620VF, a micronized polyethylene wax from Micro Powders Inc., Tarrytown, NY), and the like.

The powder formulation for the topcoat can comprise a flow modifier, e.g., an acrylic polymer such as an absorbed acrylic polymer on a particle, polysiloxane, a fluorocarbon, and the like. In some embodiments, the powder formulation for the topcoat comprises a flow modifier (e.g., an acrylic polymer such as an absorbed acrylic polymer on a particle, polysiloxane, a fluorocarbon, and the like) in a total amount of about 0.1 wt % to about 5 wt % of the formulation, e.g., about 0.5 wt % to about 5 wt %, about 1 wt % to about 5 wt %, about 2 wt % to about 5 wt %, about 3 wt % to about 5 wt %, about 4 wt % to about 5 wt %, about 0.1 wt % to about 4 wt %, about 0.1 wt % to about 3 wt %, about 0.1 wt % to about 2 wt %, about 0.1 wt % to about 1 wt %, or about 0.1 wt % to about 0.5 wt % of the formulation.

In some embodiments, the powder formulation for the topcoat comprises one or more flow modifiers (e.g., any described herein) in a total amount of at least about 0.1 wt % (e.g., at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, at least about 1.5 wt %, at least about 2 wt %, at least about 2.5 wt %, at least about 3 wt %, at least about 3.5 wt %, at least about 4 wt %, or at least about 4.5 wt %) and/or at most about 5 wt % (e.g., at most about 4.5 wt %, at most about 4 wt %, at most about 3.5 wt %, at most about 3 wt %, at most about 2.5 wt %, or at most about 2 wt %) of the formulation.

Non-limiting examples for flow modifiers include RESIFLOW® PH-241 (mixture of acrylic polymer and silica from Estron Chemicals, Inc., Calvert City, KY), RESIFLOW® PL-200 (mixture of acrylic polymer and silica from Estron Chemicals, Inc., Calvert City, KY), RESIFLOW® PL-200A (mixture of acrylic polymer and silica from Estron Chemicals, Inc., Calvert City, KY), RESIFLOW® PL-230 (mixture of acrylic polymer and silica from Estron Chemicals, Inc., Calvert City, KY), RESIFLOW® PL-330 (mixture of acrylic polymer and silica from Estron Chemicals, Inc., Calvert City, KY), MODAFLOW® Powder III (silicone free resin from Allnex, Frankfurt, Germany), Floaid MAPS-P (60% polysiloxane from Danick Specialties & Support, Inc., Niceville, FL), Floaid FC-4 (70% fluorochemical surfactant from Danick Specialties & Support, Inc., Niceville, FL), and the like.

The powder formulation for the topcoat can comprise a scratch resistance agent, e.g., polyethylene, wax, polysiloxane, an organosilicone polyether copolymer, a surface treated filler (e.g., silane treated with aluminum trihydrate, barium sulfate, or both), a metal stearate (e.g., zinc stearate, calcium stearate, magnesium stearate, or a combination of any of these), a fatty acid amide (e.g., erucamide, behenamide, stearamide, or a combination of any of these), an inorganic mineral (e.g., molybdenum disulfide, tungsten disulfide, or both), or a combination of any of these. In some embodiments, the powder formulation for the topcoat comprises a scratch resistance agent comprising polyethylene and/or wax that further comprises a metal oxide such as aluminum oxide (e.g., wax coated with aluminum oxide particles), titanium dioxide, silica dioxide, zinc oxide, copper oxide, or combinations thereof.

In some embodiments, the powder formulation for the topcoat comprises a scratch resistance agent (e.g., polyethylene, wax, polysiloxane, an organosilicone polyether copolymer, a surface treated filler (e.g., silane treated with aluminum trihydrate, barium sulfate, or both), a metal stearate (e.g., zinc stearate, calcium stearate, magnesium stearate, or a combination of any of these), a fatty acid amide (e.g., erucamide, behenamide, stearamide, or a combination of any of these), an inorganic mineral (e.g., molybdenum disulfide, tungsten disulfide, or both), or a combination of any of these) in a total amount of about 0.05 wt % to about 5 wt % of the formulation, e.g., about 1 wt % to about 5 wt %, about 2 wt % to about 5 wt %, about 3 wt % to about 5 wt %, about 4 wt % to about 5 wt %, about 0.05 wt % to about 4 wt %, about 0.05 wt % to about 3 wt %, about 0.05 wt % to about 2 wt %, or about 0.05 wt % to about 1 wt % of the formulation.

In some embodiments, the powder formulation for the topcoat comprises one or more scratch resistance agents (e.g., any described herein) in a total amount of at least about 0.05 wt % (e.g., at least about 0.1 wt %, at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, at least about 1.5 wt %, at least about 2 wt %, at least about 2.5 wt %, at least about 3 wt %, at least about 3.5 wt %, at least about 4 wt %, or at least about 4.5 wt %) and/or at most about 5 wt % (e.g., at most about 4.5 wt %, at most about 4 wt %, at most about 3.5 wt %, at most about 3 wt %, at most about 2.5 wt %, at most about 2 wt %, at most about 1.5 wt %, or at most about 1 wt %) of the formulation.

Non-limiting examples for scratch resistance agents include MPP-123 AL (low density polyethylene/aluminum oxide nanocomposite from Micro Powders, Inc., Tarrytown, NY), SILWET™ L-7601 (an organosilicone polyether copolymer from Momentive, Niskayuna, NY), and the like.

The powder formulation for the topcoat can comprise a transfer efficiency additive, e.g., a ceramic (e.g., barium titanate, zirconium titanate, strontium titanate, barium strontium titanate, potassium niobate, sodium niobate, or a combination of any of these), a metal oxide (e.g., aluminum oxide, chromium oxide, titanium oxide, zirconium oxide, or a combination of any of these), or a combination of any of these. In some embodiments, the powder formulation for the topcoat comprises a transfer efficiency additive (e.g., barium titanate) in a total amount of about 0.05 wt % to about 10 wt % of the formulation, e.g., about 0.1 wt % to about 10 wt %, about 1 wt % to about 10 wt %, about 2.5 wt % to about 10 wt %, about 5 wt % to about 10 wt %, about 7.5 wt % to about 10 wt %, about 0.05 wt % to about 7.5 wt %, about 0.05 wt % to about 5 wt %, about 0.05 wt % to about 2.5 wt %, or about 0.05 wt % to about 1 wt % of the formulation.

In some embodiments, the powder formulation for the topcoat comprises one or more transfer efficiency additives (e.g., any described herein) in a total amount of at least about 0.05 wt % (e.g., at least about 0.1 wt %, at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, at least about 1.5 wt %, at least about 2 wt %, at least about 2.5 wt %, at least about 3 wt %, at least about 3.5 wt %, at least about 4 wt %, or at least about 4.5 wt %) and/or at most about 10 wt % (e.g., at most about 8 wt %, at most about 7 wt %, at most about 6 wt %, at most about 5.5 wt %, at most about 5 wt %, at most about 4.5 wt %, at most about 4 wt %, at most about 3.5 wt %, at most about 3 wt %, at most about 2.5 wt %, at most about 2 wt %, at most about 1.5 wt %, or at most about 1 wt %) of the formulation.

The powder formulation for the topcoat can comprise a phase-transfer catalyst, e.g., an ammonium salt, a phosphonium salt (e.g., optionally adsorbed on a solid carrier), or a combination thereof. In some embodiments, the ammonium salt is $N^+(R^{N1})_4 X^-$, and wherein each $R^{N1}$ is, independently, hydrogen (H) or an optionally substituted $C_{1-18}$ hydrocarbyl group (e.g., alkyl, haloalkyl, aryl, alkaryl, aralkyl, etc.) and X is an anion. In some embodiments, the phosphonium salt is $P^+(R^{P1})_4 X^-$, and wherein each $R^{P1}$ is, independently, hydrogen (H) or an optionally substituted $C_{1-18}$ hydrocarbyl group (e.g., alkyl, haloalkyl, aryl, alkaryl, aralkyl, etc.) and X is an anion.

Non-limiting hydrocarbyl groups include alkyl, alkenyl, alkynyl, aryl, alkaryl (e.g., —Ar-Ak, in which Ar is a multivalent aryl group and Ak is an alkyl group), aralkyl (e.g., -Ak-Ar, in which Ak is a multivalent alkyl group and Ar is an aryl group), and the like. Non-limiting examples of alkyl include methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic (e.g., $C_{3-24}$ cycloalkyl) or acyclic. The alkyl group can be a primary, secondary, or tertiary alkyl group substituted with one or more substituents (e.g., one or more halo, alkoxy, acyl, and the like). The hydrocarbyl group can be substituted with one or more substituents (e.g., one or more halo (e.g., F, Cl, Br, or I), alkoxy (e.g., —OR, in which R is alkyl as described herein), acyl (e.g., —C(O)R, in which R is H or alkyl as described herein), and the like). In some embodiments, the unsubstituted hydrocarbyl group or alkyl group is a $C_{1-3}$, $C_{1-6}$, $C_{1-12}$, $C_{1-16}$, $C_{1-18}$, $C_{1-20}$, $C_{1-24}$, $C_{2-3}$, $C_{2-6}$, $C_{2-12}$, $C_{2-16}$, $C_{2-18}$, $C_{2-20}$, or $C_{2-24}$ hydrocarbyl group or alkyl group. Non-limiting examples of aryl include benzyl, naphthalene, phenyl, biphenyl, phenoxy benzene, and the like. The aryl group can optionally include one or more heteroatoms. The aryl group can be substituted with one or more substituents (e.g., one or more halo, alkyl, alkoxy, acyl, and the like). In particular embodiments, an unsubstituted aryl group is a $C_{4-18}$, $C_{4-14}$, $C_{4-12}$, $C_{4-10}$, $C_{6-18}$, $C_{6-14}$, $C_{6-12}$, or $C_{6-10}$ aryl group.

Non-limiting anions include halide (e.g., chloride, bromide, iodide, or fluoride), sulfate, bisulfate, sulfite, bisulfite, carbonate, bicarbonate, hypochlorite, perchlorate, chlorate, phosphate, monohydrogen phosphate, acetate, formate, oxalate, etc.), and the like.

In some embodiments, the ammonium salt includes a tetraalkylammonium halide (e.g., $N^+(R^{N1})_4 X$, and wherein each $R^{N1}$ is, independently, an optionally substituted $C_{1-18}$ alkyl and X is an anion). Non-limiting examples include benzyltriethylammonium chloride, benzyltrimethylammonium chloride, tetrabutylammonium bromide, tetrabutylammonium chloride, tetrabutylammonium iodide, tetradecylammonium bromide, tetradecylammonium chloride, tetradecylammonium iodide, butyl triethyl ammonium bromide, butyl triethyl ammonium chloride, or a combination thereof.

In some embodiments, the phosphonium salt comprises a phosphonium halide (e.g., $P^+(R^{P1})_4 X^-$, in which each $R^{P1}$ is H and X is an anion, such as phosphonium bromide, phosphonium chloride, phosphonium iodide, and the like), an aryl phosphonium halide (e.g., $P^+(R^{P1})_4 X^-$, in which at least one $R^{P1}$ is optionally substituted aryl and X is an anion, such as triphenyl phosphonium bromide, triphenyl phosphonium chloride, triphenyl phosphonium iodide, and the like), or an alkyl phosphonium halide (e.g., $P^+(R^{P1})_4 X^-$, in which at least one $R^{P1}$ is optionally substituted alkyl and X is an anion, such as tetrabutyl phosphonium bromide, tetrabutyl phosphonium chloride, tetrabutyl phosphonium iodide, and the like), or a combination thereof.

In some embodiments, the powder formulation for the topcoat comprises a phase-transfer catalyst (e.g., an ammonium salt, a phosphonium salt, or combinations thereof) in a total amount of about 0.01 wt % to about 5 wt % of the formulation, e.g., about 0.1 wt % to about 5 wt %, about 0.5 wt % to about 5 wt %, about 1 wt % to about 5 wt %, about 2 wt % to about 5 wt %, about 3 wt % to about 5 wt %, about 4 wt % to about 5 wt %, about 0.01 wt % to about 4 wt %, about 0.01 wt % to about 3 wt %, about 0.01 wt % to about 2 wt %, about 0.01 wt % to about 1 wt %, about 0.01 wt % to about 0.5 wt %, about 0.01 wt % to about 0.1 wt %, of the formulation.

In some embodiments, the powder formulation for the topcoat comprises one or more phase-transfer catalysts (e.g., any described herein) in a total amount of at least about 0.01 wt % (e.g., at least about 0.05 wt %, at least about 0.1 wt %, at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, at least about 1.5 wt %, at least about 2 wt %, at least about 2.5 wt %, at least about 3 wt %, at least about 3.5 wt %, at least about 4 wt %, or at least about 4.5 wt %) and/or at most about 5 wt % (e.g., at most about 4.5 wt %, at most about 4 wt %, at most about 3.5 wt %, at most about 3 wt %, at most about 2.5 wt %, at most about 2 wt %, at most about 1.5 wt %, at most about 1 wt %, or at most about 0.5 wt %) of the formulation.

Non-limiting examples for phase-transfer catalysts include ACTIRON® 43-65 (tetrabutylammonium bromide adsorbed on silica from Synthron, Essex, U.K.), ARA-DUR® DT 3126-2 (curing accelerator from Huntsman, The Woodlands, TX), and the like.

Any combination of the scratch resistance agent, the transfer efficiency additive, and the phase-transfer catalyst may be present in the formulation. In some embodiments, only one of the scratch resistance agent, the transfer efficiency additive, and the phase-transfer catalyst is present. In some embodiments, two of the scratch resistance agent, the transfer efficiency additive, and the phase-transfer catalyst are present. In some embodiments, each of the scratch resistance agent, the transfer efficiency additive, and the phase-transfer catalyst are present.

The powder formulation for the topcoat can comprise a wetting agent, e.g., a wax, a modified wax, a wax based wetting agent with pigment affinic groups, a silicone based wetting agent, or a combination of any of these. In some embodiments, the powder formulation for the topcoat comprises a wetting agent (e.g., a wax, a modified wax, a wax based wetting agent with pigment affinic groups, a silicone based wetting agent, or a combination of any of these) in a total amount of about 0.1 wt % to about 5 wt % of the formulation, e.g., about 0.5 wt % to about 5 wt %, about 1 wt % to about 5 wt %, about 2 wt % to about 5 wt %, about 3 wt % to about 5 wt %, about 4 wt % to about 5 wt %, about 0.1 wt % to about 4 wt %, about 0.1 wt % to about 3 wt %, about 0.1 wt % to about 2 wt %, about 0.1 wt % to about 1 wt %, or about 0.1 wt % to about 0.5 wt % of the formulation.

In some embodiments, the powder formulation for the topcoat comprises one or more wetting agents (e.g., any described herein) in a total amount of at least about 0.1 wt % (e.g., at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, at least about 1.5 wt %, at least about 2 wt %, at least about 2.5 wt %, at least about 3 wt %, at least about 3.5 wt %, at least about 4 wt %, or at least about 4.5 wt %) and/or at most about 5 wt % (e.g., at most about 4.5 wt %, at most about 4 wt %, at most about 3.5 wt %, at most about 3 wt %, at most about 2.5 wt %, at most about 2 wt %, at most about 1.5 wt %, at most about 1 wt %, or at most about 0.5 wt %) of the formulation.

Non-limiting examples for wetting agents include BYK®-3950 (modified wax from BYK-Chemie GmbH, Wesel, Germany), BYK®-3933 (modified polyacrylate, adsorbed on silicon dioxide from BYK-Chemie GmbH, Wesel, Germany), and the like.

The powder formulation for the topcoat can comprise an antioxidant, e.g., a phenolic ester such as octadecyl-3-(3,5-di-tertbutyl-4-hydroxyphenyl)-propionate, an organophosphorous compound (e.g., an organophosphonite such as a diphosphonite or an aromatic diphosphonite), or combinations thereof. In some embodiments, the powder formulation for the topcoat comprises an antioxidant (e.g., a phenol such as octadecyl-3-(3,5-di-tert.butyl-4-hydroxy phenyl)-propionate, an organophosphorous compound such as diphosphonite, or combinations thereof) in a total amount of about 0.05 wt % to about 2 wt % of the formulation, e.g., about 0.1 wt % to about 2 wt %, about 0.5 wt % to about 2 wt %, about 1 wt % to about 2 wt %, about 1.5 wt % to about 2 wt %, about 0.05 wt % to about 1.5 wt %, about 0.05 wt % to about 1 wt %, about 0.05 wt % to about 0.5 wt %, or about 0.05 wt % to about 0.1 wt % of the formulation.

In some embodiments, the powder formulation for the topcoat comprises one or more antioxidants (e.g., any described herein) in a total amount of at least about 0.05 wt % (e.g., at least about 0.1 wt %, at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, or at least about 1.5 wt %) and/or at most about 2 wt % (e.g., at most about 1.5 wt %, at most about 1 wt %, at most about 0.8 wt %, or at most about 0.5 wt %) of the formulation.

Non-limiting examples for antioxidants include IRGANOX® 1076 (octadecyl-3-(3,5-di-tert.butyl-4-hydroxyphenyl)-propionate from Ciba Specialty Chemicals, Inc., Basel, Switzerland), HOSTANOX® P-EPQ® (phosphorous trichloride, reaction products with 1,1'-biphenyl and 2,4-bis(1,1-dimethylethyl) phenol from Clariant, Muttenz, Switzerland), HOSTANOX® O 16 FF (octadecanyl β-(3,5-Di-tert-butyl-4-hydroxyphenyl) propionate from Clariant, Muttenz, Switzerland), and the like.

The powder formulation for the topcoat can comprise a pigment, e.g., an organic pigment (e.g., carbon black), an inorganic pigment (e.g., titanium dioxide), an exterior pigment, or a combination of any of these. In some embodiments, the powder formulation for the topcoat comprises a pigment (e.g., an organic pigment (e.g., carbon black), an inorganic pigment (e.g., titanium dioxide), an exterior pigment, or a combination of any of these) in a total amount of about 0.1 wt % to about 50 wt % of the formulation, e.g., about 1 wt % to about 50 wt %, about 2.5 wt % to about 50 wt %, about 5 wt % to about 50 wt %, about 7.5 wt % to about 50 wt %, about 10 wt % to about 50 wt %, about 20 wt % to about 50 wt %, about 30 wt % to about 50 wt %, about 40 wt % to about 50 wt %, about 1 wt % to about 10 wt %, about 2.5 wt % to about 10 wt %, about 5 wt % to about 10 wt %, about 7.5 wt % to about 10 wt %, about 0.1 wt % to about 40 wt %, about 0.1 wt % to about 30 wt %, about 0.1 wt % to about 20 wt %, about 0.1 wt % to about 10 wt %, about 0.1 wt % to about 7.5 wt %, about 0.1 wt % to about 5 wt %, about 0.1 wt % to about 2.5 wt %, or about 0.1 wt % to about 1 wt % of the formulation. In some embodiments, the pigment is a non-conductive pigment.

In some embodiments, the powder formulation for the topcoat comprises one or more pigments (e.g., any described herein) in a total amount of at least about 0.1 wt % (e.g., at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, or at least about 1.5 wt %) and/or at most about 50 wt % (e.g., at most about 40 wt %, at most about 30 wt %, at most about 20 wt %, at most about 10 wt %, or at most about 5 wt %) of the formulation.

Non-limiting examples for pigments include TI-PURE® R-960 (rutile titanium dioxide pigment from DUPONT™, Wilmington, DE), TIOXIDE® TR93 (pigment white from Venator, Wynyard, U.K.), MONARCH® 1300 (pigment black from Cabot Corp., Billerica, MA), and the like.

The powder formulation for the topcoat can comprise a matting agent, e.g., an acrylic resin, zinc mercapto benzothiozole, micronized hydrocarbon wax (such as synthetic paraffin wax), polyethylene homopolymer or its blends, and the like. In some embodiments, the powder formulation for the topcoat comprises a matting agent (e.g., an acrylic resin) in a total amount of about 0.5 wt % to about 10 wt % of the formulation, e.g., about 1 wt % to about 10 wt %, about 2 wt % to about 10 wt %, about 4 wt % to about 10 wt %, about 6 wt % to about 10 wt %, about 8 wt % to about 10 wt %, about 0.5 wt % to about 8 wt %, about 0.5 wt % to about 6 wt %, about 0.5 wt % to about 4 wt %, about 0.5 wt % to about 2 wt %, or about 0.5 wt % to about 1 wt % of the formulation.

In some embodiments, the powder formulation for the topcoat comprises one or more matting agents (e.g., any described herein) in a total amount of at least about 0.5 wt % (e.g., at least about 0.6 wt %, at least about 0.7 wt %, at least about 0.8 wt %, at least about 0.9 wt %, at least about 1.0 wt %, at least about 1.5 wt %, at least about 2 wt %, at least about 3 wt %, at least about 4 wt %, at least about 5 wt %, at least about 6 wt %, at least about 7 wt %, at least about 8 wt %, or at least about 9 wt %) and/or at most about 10 wt % (e.g., at most about 9 wt %, at most about 8 wt %, at most about 7 wt %, at most about 6 wt %, or at most about 5 wt %) of the formulation.

Non-limiting examples for matting agents include Mild-Matte A-1 (acrylic resin from Guangzhou ZEHM Functional Materials R&D Co., Ltd., Guangzhou, China), AHA 2148 (zinc mercapto complex in acrylic resin from A.H.A. International Co., Ltd., Anhui, China), MA469 (zinc mercapto complex in polyethylene wax from Longchem Co., Ltd., Henan China), and the like.

The powder formulation for the topcoat can comprise a crosslinking agent, e.g., an isocyanate (e.g., a polyisocyanate, an isocyanate adduct, an aliphatic polyisocyanate, a cycloaliphatic polyisocyanate, and the like), a glycidyl ester (e.g., glycidyl methacrylate, triglycidyl trimellitate, diglycidyl terephthalate, and the like), a hydroxyalkylamide (e.g., β-hydroxyalkylamide, and the like; or $R^{N1}{}_2NC(O)$-Ak-C(O)N$(R^{N1})_2$, as described herein), or a combination of any of these. In some embodiments, the powder formulation for the topcoat comprises a crosslinking agent (e.g., an isocyanate adduct) in a total amount of about 0.05 wt % to about 10 wt % of the formulation, e.g., about 0.1 wt % to about 10 wt %, about 1 wt % to about 10 wt %, about 2 wt % to about 10 wt %, about 3 wt % to about 10 wt %, about 4 wt % to about 10 wt %, about 5 wt % to about 10 wt %, about 1 wt % to about 5 wt %, about 2 wt % to about 5 wt %, about 3 wt % to about 5 wt %, about 4 wt % to about 5 wt %, about 0.05 wt % to about 10 wt %, about 0.05 wt % to about 5 wt %, about 0.05 wt % to about 4 wt %, about 0.05 wt % to about 3 wt %, about 0.05 wt % to about 2 wt %, or about 0.05 wt % to about 1 wt % of the formulation. In some embodiments, the isocyanate comprises an NCO content of about 10 wt % to about 30 wt %.

In some embodiments, the powder formulation for the topcoat comprises one or more crosslinking agents (e.g., any described herein) in a total amount of at least about 0.05 wt % (e.g., at least about 0.1 wt %, at least about 0.2 wt %, at least about 0.3 wt %, at least about 0.4 wt %, at least about 0.5 wt %, at least about 1.0 wt %, at least about 1.5 wt %, at least about 2 wt %, at least about 3 wt %, at least about 4 wt %, at least about 5 wt %, at least about 6 wt %, at least about 7 wt %, at least about 8 wt %, at least about 9 wt %, or at least about 10 wt %) and/or at most about 20 wt % (e.g., at most about 15 wt %, at most about 10 wt %, at most about 9 wt %, at most about 8 wt %, at most about 7 wt %, at most about 6 wt %, or at most about 5 wt %) of the formulation.

Depending on the resin and/or curing agent present in the formulation, a crosslinking agent can be selected based on its reactivity with the functional groups present on the resin and the reactive groups of the curing agent. In some embodiments, the amount and type of crosslinking agent can be selected to further catalyze or react remaining functional groups and reactive groups provided by the resin and curing agent. For example and without limitation, a person of ordinary skill in the art will appreciate that a crosslinking agent can be used to minimize the amount of unreacted resin or curing agent in the powder formulation for the topcoat. Accordingly, the person of ordinary skill in the art will understand how to select a suitable type and/or a suitable type amount of crosslinking agent to minimize the amount of unreacted resin and/or unreacted curing agent in the powder formulation for the topcoat.

For example and without limitation, a person of ordinary skill in the art will appreciate that a crosslinking agent may act as both a crosslinking agent and a curing agent, depending on the reactive group present on the crosslinking agent and the functional groups present on the resin. Accordingly, in some non-limiting embodiments, the powder formulation for the topcoat can comprise a crosslinking agent that acts as both a crosslinking agent and a curing agent.

Non-limiting examples for crosslinking agents include VESTAGON® crosslinking agents from Evonik Corp. Parsipanny, NJ (e.g., VESTAGON® BF 1400, a polyisocyanate adduct: VESTAGON® BF 1530, a polyisocyanate adduct, and VESTAGON® BF 1540, a polyisocyanate adduct, and the like), CRELAN® crosslinking agents (e.g., CRELAN® NW-5, a blocked cycloaliphatic polyisocyanate: CRELAN® VP LS 2256, a blocked aliphatic polyisocyanate), and the like.

The powder formulation for the topcoat can comprise a corrosion resistance filler (also referred to herein as a second corrosion resistance filler), e.g., an alkaline earth metal salt, e.g., aluminum silicate, aluminum triphosphate, aluminum zinc phosphate, barium chromate, barium metaborate, barium sulfate, calcium aluminum phosphate, calcium aluminum silicate, calcium barium phosphosilicate, calcium borosilicate, calcium carbonate, calcium chromate, calcium molybdate, calcium phosphate, calcium strontium phosphosilicate, calcium strontium zinc phosphosilicate, calcium sulfate, calcium zinc molybdate, strontium aluminum phosphate, strontium chromate, strontium phosphate, or any combination of these.

The powder formulation for the topcoat can comprise a corrosion resistance filler, e.g. a compound comprising zinc or a zinc salt, e.g., zinc aluminum phosphate, calcium strontium zinc phosphosilicate, calcium zinc molybdate, zinc aluminum calcium phosphate, zinc borate, zinc borate phosphate hydrate, zinc calcium aluminum strontium phosphate, zinc calcium phosphate, zinc calcium strontium phosphate, zinc dust, zinc flakes, zinc hydroxy phosphate, zinc molybdate, zinc oxide, zinc phosphate, zinc potassium chromate, zinc tetrahydroxy chromate, or any combination of these.

In some embodiments, the corrosion resistance filler can be an aluminate, a borate, a borosilicate, a carbonate, a chromate, a molybdate, an oxide, a phosphate, a phosphosilicate, a silicate, a sulfate, as well as forms including one or more metals or metalloids (e.g., alkali metals, alkaline earth metals, transition metals, Group 13 elements, or combinations thereof), one or more salt forms, one or more hydrate forms, or a combination of any of these.

In some embodiments, the powder formulation for the topcoat comprises a corrosion resistance filler (e.g., an alkaline earth metal salt, an aluminate, a borate, a borosilicate, a carbonate, a chromate, a molybdate, an oxide, a phosphate, a phosphosilicate, a silicate, a sulfate, zinc, a zinc salt, such as any described herein, or any combination of these) in a total amount of about 1 wt % to about 50 wt % of the formulation, e.g., about 5 wt % to about 50 wt %, about 10 wt % to about 50 wt %, about 15 wt % to about 50 wt %, about 20 wt % to about 50 wt %, about 25 wt % to about 50 wt %, about 30 wt % to about 50 wt %, about 35 wt % to about 50 wt %, about 1 wt % to about 40 wt %, about 1 wt % to about 35 wt %, about 1 wt % to about 30 wt %, about 1 wt % to about 25 wt %, about 1 wt % to about 20 wt %, about 1 wt % to about 15 wt %, about 1 wt % to about 10 wt %, or about 1 wt % to about 5 wt % of the formulation.

In some embodiments, the powder formulation for the topcoat comprises a corrosion resistance filler (e.g, a compound comprising zinc or a zinc salt, e.g., zinc aluminum phosphate, calcium strontium zinc phosphosilicate, calcium zinc molybdate, zinc aluminum calcium phosphate, zinc borate, zinc borate phosphate hydrate, zinc calcium aluminum strontium phosphate, zinc calcium phosphate, zinc calcium strontium phosphate, zinc dust, zinc flakes, zinc hydroxy phosphate, zinc molybdate, zinc oxide, zinc phosphate, zinc potassium chromate, zinc tetrahydroxy chromate, or any combination of these) in a total amount of about 1 wt % to about 50 wt % of the formulation, e.g., about 5 wt % to about 50 wt %, about 10 wt % to about 50 wt %, about 15 wt % to about 50 wt %, about 20 wt % to about 50 wt %, about 25 wt % to about 50 wt %, about 30 wt % to about 50 wt %, about 35 wt % to about 50 wt %, about 1 wt % to about 40 wt %, about 1 wt % to about 35 wt %, about 1 wt % to about 30 wt %, about 1 wt % to about 25 wt %, about 1 wt % to about 20 wt %, about 1 wt % to about 15 wt %, about 1 wt % to about 10 wt %, or about 1 wt % to about 5 wt % of the formulation.

In some embodiments, the powder formulation for the topcoat comprises one or more corrosion resistance fillers (e.g., any described herein) in a total amount of at least about 1 wt % (e.g., at least about 2 wt %, at least about 3 wt %, at least about 4 wt %, at least about 5 wt %, at least about 6 wt %, at least about 7 wt %, at least about 8 wt %, at least about 9 wt %, at least about 10 wt %, at least about 12 wt %, or at least about 15 wt %) and/or at most about 50 wt % (e.g., at most about 45 wt %, at most about 40 wt %, at most about 35 wt %, at most about 30 wt %, at most about 25 wt %, at most about 20 wt %, or at most about 15 wt %) of the formulation.

Non-limiting examples for corrosion resistance fillers include BLANC FIXE Micro® (precipitated barium sulfate from Huntsman, The Woodlands, TX), CIMBAR™ UF (barium sulfate, median particle size of 2.0 microns from Cimbar Performance Minerals, Cartersville, Georgia), CIM-BAR™ PC (barium sulfate, median particle size of 9.4 microns from Cimbar Performance Minerals, Cartersville, Georgia), and the like.

The powder formulation for the topcoat can comprise an antistatic agent, e.g., long-chain aliphatic amines, long-chain aliphatic amides, quaternary ammonium salts (e.g., behentrimonium chloride or cocamidopropyl betaine), esters of phosphoric acid, polyethylene glycol esters, polyols, and combinations thereof). In some embodiments, the topcoat comprises an antistatic agent in a total amount of about 0.05 wt % to about 5 wt % of the formulation, e.g., about 0.05 wt % to about 5 wt % of the formulation, e.g., about 1 wt % to about 5 wt %, about 2 wt % to about 5 wt %, about 3 wt % to about 5 wt %, about 4 wt % to about 5 wt %, about 0.05 wt % to about 4 wt %, about 0.05 wt % to about 3 wt %, about 0.05 wt % to about 2 wt %, or about 0.05 wt % to about 1 wt % of the formulation.

In some embodiments, the powder formulation for the topcoat comprises one or more antistatic agents (e.g., any described herein) in a total amount of at least about 0.05 wt % (e.g., at least about 0.1 wt %, at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1 wt %, at least about 1.2 wt %, or at least about 1.5 wt %) and/or at most about 5 wt % (e.g., at most about 4.5 wt %, at most about 4 wt %, at most about 3.5 wt %, at most about 3 wt %, at most about 2.5 wt %, at most about 2 wt %, or at most about 1.5 wt %) of the formulation.

Non-limiting examples for antistatic agents include LANCO™ Stats from Lubrizol, Wickliffe, OH, e.g., LANCO™ Stat 308, LANCO™ Stat LI 100, LANCO™ Stat K 100 N, LANCO™ Stat FN, LANCO™ Stat PUN, LANCO™ Stat L 80N and the like.

The powder formulation for the topcoat can comprise an adhesion promoting agent, e.g., a hybrid carboxy-functional hydroxy-functional metal organic compound. In some embodiments, the powder formulation for the topcoat comprises an adhesion promoting agent (e.g., a hybrid carboxy-functional hydroxy-functional metal organic compound) in a total amount of about 0.1 wt % to about 5 wt % of the formulation, e.g., about 0.5 wt % to about 5 wt %, about 1 wt % to about 5 wt %, about 2 wt % to about 5 wt %, about 3 wt % to about 5 wt %, about 4 wt % to about 5 wt %, about 0.1 wt % to about 4 wt %, about 0.1 wt % to about 3 wt %, about 0.1 wt % to about 2 wt %, about 0.1 wt % to about 1 wt %, or about 0.1 wt % to about 0.5 wt % of the formulation.

In some embodiments, the powder formulation for the topcoat comprises one or more adhesion promoting agent (e.g., any described herein) in a total amount of at least about 0.1 wt % (e.g., at least about 0.2 wt %, at least about 0.5 wt %, at least about 1 wt %, at least about 1.5 wt %, or at least about 2 wt %) and/or at most about 5 wt % (e.g., at most about 4.5 wt %, at most about 4 wt %, at most about 3.5 wt %, at most about 3 wt %, at most about 2.5 wt %, at most about 2 wt %, or at most about 1.5 wt %) of the formulation.

Non-limiting examples for adhesion promoting agents include Chartsil C523.2H (a hybrid carboxy/hydroxy functional metal organic adhesion promoter absorbed upon a precipitated silica carrier from Chartwell International, Inc., Attleboro Falls, MA), and the like.

The powder formulation for the topcoat can comprise a rheology modifier, e.g., silica (e.g., silane treated silica), clay (e.g., inorganic clay), talc, or other particles. In some embodiments, the powder formulation for the topcoat comprises a rheology modifier (e.g., silica) in a total amount of about 0.05 wt % to about 5 wt % of the formulation, e.g., about 0.1 wt % to about 10 wt %, about 1 wt % to about 10 wt %, about 2.5 wt % to about 10 wt %, about 5 wt % to about 10 wt %, about 7.5 wt % to about 10 wt %, about 0.05 wt % to about 7.5 wt %, about 0.05 wt % to about 5 wt %, about 0.05 wt % to about 2.5 wt %, or about 0.05 wt % to about 1 wt % of the formulation.

In some embodiments, the powder formulation for the topcoat comprises one or more rheology modifiers (e.g., any described herein) in a total amount of at least about 0.05 wt % (e.g., at least about 0.1 wt %, at least about 0.2 wt %, at least about 0.5 wt %, at least about 1 wt %, at least about 1.5 wt %, or at least about 2 wt %) and/or at most about 5 wt % (e.g., at most about 4.5 wt %, at most about 4 wt %, at most about 3.5 wt %, at most about 3 wt %, at most about 2.5 wt %, at most about 2 wt %, or at most about 1.5 wt %) of the formulation.

Non-limiting examples for rheology modifiers include SIPERNAT® 22 S (fine particle silica from Evonik Corp., Parsipanny, NJ), RESIFLOW® PH-241 (mixture of acrylic polymer and silica from Estron Chemicals, Inc., Calvert City, KY), and the like.

In some embodiments, the powder formulation for a topcoat comprises about 45 wt % to about 90 wt % of a carboxyl functional polyester resin (e.g., a carboxyl functional polyester resin comprising an acid number of about 25 to about 75 mg KOH/g of resin, e.g., about 25 to about 55 mg KOH/g resin); about 2 wt % to about 8 wt % of a curing agent (e.g., triglycidyl isocyanurate (TGIC)); about 0.05 wt % to about 5 wt % of a degassing agent (e.g., benzoin coated polyamide); about 0.05 wt % to about 5 wt % of a scratch resistance agent (e.g., polyethylene); and about 0.05 wt % to about 5 wt % of a transfer efficiency additive (e.g., barium titanate).

In some embodiments, the powder formulation for a topcoat comprises about 40 wt % to about 90 wt % of a carboxyl functional polyester resin (e.g., a carboxyl functional polyester resin comprising an acid number of about 25 to about 75 mg KOH/g of resin, e.g., about 25 to about 55 mg KOH/g resin); about 2 wt % to about 8 wt % of a curing agent (e.g., triglycidyl isocyanurate (TGIC)); about 0.05 wt % to about 5 wt % of a degassing agent (e.g., benzoin coated polyamide); about 0.05 wt % to about 5 wt % of a scratch resistance agent (e.g., polyethylene); about 0.05 wt % to about 5 wt % of a transfer efficiency additive (e.g., barium titanate); about 0.1 wt % to about 10 wt % of a wetting agent (e.g., a wax); about 0.1 wt % to about 10 wt % of a phase-transfer catalyst (e.g., a tetrabutylammonium salt such as tetrabutylammonium bromide); about 0.1 wt % to about 10 wt % of a flow modifier (e.g., an acrylic polymer); about 0.1 wt % to about 10 wt % of a pigment (e.g., carbon black, titanium dioxide, or both); and about 1 wt % to about 40 wt % of a corrosion resistance filler (e.g., zinc dust).

In some embodiments, the powder formulation for a topcoat includes one or more components described herein in a powder formulation for a primer coat, as well as amounts of such components described herein in a powder formulation for a primer coat. Non-limiting components in a powder formulation for a topcoat can include, e.g., one or more of the following: a resin (e.g., any described herein, such as a carboxy functional polyester resin), a curing agent (e.g., any described herein, such as a cyanamide, dicyanamide, dicyandiamide, guanidine, cyanoguanidine, diguanide, an acid functional acrylic resin, a diacid, a hydroxyalkylamide, or a combination thereof), a degassing agent (e.g., any described herein, benzoin, benzoin coated polyamide, polyamide, a derivative thereof, or a combination thereof), a corrosion resistance filler (e.g., any described herein), a transfer efficiency additive (e.g., any described herein, such as a ceramic), a flow modifier (e.g., any described herein, such as an acrylic polymer), a pigment (e.g., any described herein, such as titanium dioxide), a phase-transfer catalyst (e.g., any described herein, such as an ammonium salt, a phosphonium salt, or a combination thereof), an antistatic agent (e.g., any described herein), and a conductive agent (e.g., any described herein, such as conductive carbon black, graphene, or a combination thereof).

In some embodiments, the powder formulation for a topcoat is free of one or more components described herein, e.g., a resin, a curing agent, a degassing agent, a flow modifier, a scratch resistance agent, a transfer efficiency additive, a phase-transfer catalyst, an antistatic agent, a conductive agent, a wetting agent, an antioxidant, a pigment, a matting agent, a crosslinking agent, a corrosion resistance filler, an adhesion promoting agent, a rheology modifier, or a combination of any of these. For example and without limitation, the powder formulation for a topcoat can be free of a carboxyl-functional resin. For example and without limitation, the powder formulation for a topcoat can be free of a hydroxyl-functional resin. For example and without limitation, the powder formulation for a topcoat can be free of a bisphenol A (BPA)-containing resin. For example and without limitation, the powder formulation for a topcoat can be free of a polyester resin (e.g., a carboxyl functional polyester resin, a hydroxyl functional polyester resin, an acid functional polyester resin, or combinations thereof). For example and without limitation, the powder formulation for a topcoat can be free of an epoxy resin (e.g., a carboxyl functional epoxy resin, a hydroxyl functional epoxy resin, an acid functional epoxy resin, or combinations thereof). For example and without limitation, the powder formulation for a topcoat can be free of an acrylic resin (e.g., a carboxyl functional acrylic resin, a hydroxyl functional acrylic resin, an acid functional acrylic resin, or combinations thereof). For example and without limitation, the powder formulation for a topcoat can be free of an acid-containing curing agent. For example and without limitation, the powder formulation for a topcoat can be free of a diacid-containing curing agent. For example and without limitation, the powder formulation for a topcoat can be free of a dicyandiamide-containing curing agent. For example and without limitation, the powder formulation for a topcoat can be free of a cyanamide-containing curing agent. For example and without limitation, the powder formulation for a topcoat can be free of a diamide-containing curing agent. For example and without limitation, the powder formulation for a topcoat can be free of a hydroxyalkylamide-containing curing agent. For example and without limitation, the powder formulation for a topcoat can be free of a benzoin-containing degassing agent. For example and without limitation, the powder formulation for a topcoat can be free of an acrylic acid- or acrylate-containing flow modifier. For example and without limitation, the powder formulation for a topcoat can be free of a scratch resistance agent. For example and without limitation, the powder formulation for a topcoat can be free of a metal oxide-containing scratch resistance agent. For example and without limitation, the powder formulation for a topcoat can be free of a siloxane-containing scratch resistance agent. For example and without limitation, the powder formulation for a topcoat can be free of a transfer efficiency additive. For example and without limitation, the powder formulation for a topcoat can be free of a phase-transfer catalyst. For example and without limitation, the powder formulation for a topcoat can be free of an ammonium-containing phase-transfer catalyst. For example and without limitation, the powder formulation for a topcoat can be free of a phosphonium-containing phase-transfer catalyst. For example and without limitation, the powder formulation for a topcoat can be free of an antistatic agent. For example and without limitation, the powder formulation for a topcoat can be free of a conductive agent. For example and without limitation, the powder formulation for a topcoat can be free of a wetting agent. For example and without limitation, the powder formulation for a topcoat can be free of an antioxidant. For example and without limitation, the powder formulation for a topcoat can be free of a conductive pigment. For example and without limitation, the powder formulation for a topcoat can be free of a lead-containing pigment. For example and without limitation, the powder formulation for a topcoat can be free of a matting agent. For example and without limitation, the powder formulation for a primer coat can be free of a crosslinking agent. For example and without limitation, the powder formulation for a topcoat can be free of a hydroxyalkylamide-containing crosslinking agent. For example and without limitation, the powder formulation for a topcoat can be free of a corrosion resistance filler. For example and without limitation, the powder formulation for a topcoat can be free of an adhesion promoting agent. For example and without limitation, the powder formulation for a topcoat can be free of a rheology modifier. For any component herein, the component can be provided as a powder, particle, granule, or a free flowing form. In some embodiments, the component can be provided as being adsorbed on a surface of a solid carrier (e.g., a particle such as a microparticle, a granule, a bead such as a microbead, a pellet, and the like).

Powder Formulation for a Primer Coat

Provided herein is a powder formulation for a primer coat comprising an epoxy resin, a curing agent, a degassing agent, a corrosion resistance filler, a transfer efficiency additive, and/or a flow modifier.

The powder formulation for the primer coat can further comprise one or more of the following: a pigment, a phase-transfer catalyst, an antistatic agent, a conductive agent, a wetting agent, and/or a crosslinking agent.

The powder formulation for the primer coat can comprise an epoxy resin, e.g., an epoxy resin having an epoxy equivalent weight (EEW) of about 500 to about 1250 g/eq, e.g., about 750 to about 1250, about 1000 to about 1250, about 500 to about 1000, or about 500 to about 750 g/eq.

The powder formulation for the primer coat can comprise an epoxy resin, e.g., an epoxy resin having an epoxy equivalent weight (EEW) of about 600 to about 800 g/eq, e.g., about 650 to about 800, about 700 to about 800, about 750 to about 800, about 600 to about 750, about 600 to about 700, or about 600 to about 650 g/eq.

In some embodiments, the primer coat comprises an epoxy resin comprising bisphenol A (BPA), diglycidyl ether of bisphenol A (DGEBA), glycidyl end-capped poly(bisphenol A-co-DGEBA), glycidyl end-capped poly(bisphenol A-co-epichlorohydrin), glycidyl end-capped poly(bisphenol F-co-epichlorohydrin), glycidyl end-capped poly(bisphenol F-co-epichlorohydrin)-co-(bisphenol A-co-epichlorohydrin), poly(alkylene glycol) diglycidyl ether, poly(tetrahydrofuran) diglycidyl ether, or a combination thereof. In some embodiments, the primer coat comprises an epoxy resin that is free of BPA.

In some embodiments, the powder formulation for the primer coat comprises an epoxy resin in a total amount of about 20 wt % to about 70 wt % of the formulation, e.g., about 30 wt % to about 70 wt %, about 40 wt % to about 70 wt %, about 50 wt % to about 70 wt %, about 60 wt % to about 70 wt %, about 20 wt % to about 60 wt %, about 20 wt % to about 50 wt %, about 20 wt % to about 40 wt %, or about 20 wt % to about 30 wt % of the formulation.

In some embodiments, the powder formulation for the primer coat comprises an epoxy resin in a total amount of about 5 wt % to about 40 wt % of the formulation, e.g., about 10 wt % to about 40 wt %, 15 wt % to about 40 wt %, 20 wt % to about 40 wt %, about 20 wt % to about 35 wt %, 25 wt % to about 40 wt %, 30 wt % to about 40 wt %, 35 wt % to about 40 wt %, 5 wt % to about 35 wt %, 5 wt % to about 30 wt %, 5 wt % to about 25 wt %, 5 wt % to about 20 wt %, 5 wt % to about 15 wt %, or 5 wt % to about 10 wt % of the formulation.

In some embodiments, the powder formulation for the primer coat comprises one or more resins (e.g., any described herein) in a total amount of at least about 15 wt % (e.g., at least about 20 wt %, at least about 25 wt %, or at least about 30 wt %) and/or at most about 70 wt % (e.g., at most about 65 wt %, at most about 60 wt %, at most about 55 wt %, at most about 50 wt %, at most about 45 wt %, at most about 40 wt %, at most about 35 wt %, or at most about 30 wt %) of the formulation.

In some embodiments, the powder formulation for the primer coat comprises one or more epoxy resins in a total amount of about 5 wt % to about 40 wt % of the formulation, e.g., about 10 wt % to about 40 wt %, 15 wt % to about 40 wt %, 20 wt % to about 40 wt %, 25 wt % to about 40 wt %, 30 wt % to about 40 wt %, 35 wt % to about 40 wt %, 5 wt % to about 35 wt %, 5 wt % to about 30 wt %, 5 wt % to about 25 wt %, 5 wt % to about 20 wt %, 5 wt % to about 15 wt %, or 5 wt % to about 10 wt % of the formulation.

In some embodiments, the resin (e.g., for the primer coat) is characterized by a viscosity of about 1,000 to 10,000 mPa s at 200° C., e.g., about 2,500 to 10,000; about 5,000 to 10,000; about 7,500 to 10,000; about 1,000 to 7,500; about 1,000 to 5,000; or about 1,000 to 2,500; mPa s at 200° C. In some embodiments, viscosity may be determined in accordance with ASTM test method D4287.

Non-limiting examples for resins include D.E.R.™ resins from Dow Chemicals, Midland, MI (e.g., D.E.R.™ 663U, solid epoxy resin that is a reaction product of epichlorohydrin and bisphenol A; D.E.R.™ 672U, polymer of epoxy resin and bisphenol A. and polymer of epichlorohydrin and phenol formaldehyde novolac); KD-242G (epoxy resin and bisphenol A from Kukdo Chemicals, Seoul, South Korea); KD-6812 (epoxy resin, BPA free, from Kukdo Chemicals, Seoul, South Korea); ARALDITE® resins from Huntsman, The Woodlands, TX (e.g., ARALDITE® GT 7013, unmodified bis A "Type 3" epoxy; ARALDITE® GT 7014, unmodified bis A "Type 3" epoxy); and NPES resins from Nan Ya Plastics Corp., Taipei, Taiwan (e.g., NPES-902, epoxy resin having an EEW of 600-650 g/eq; NPES-902H, epoxy resin having an EEW of 680-710 g/eq; NPES-903K, epoxy resin having an EEW of 670-700 g/eq; NPES-903, epoxy resin having an EEW of 700-750 g/eq; NPES-903H, epoxy resin having an EEW of 740-780 g/eq); CRYLCOAT® 1721-0) (a carboxyl functional polyester resin having an acid value from 20 to 35 from Allnex, Frankfurt, Germany); RUCOTE® resins from Stepan Company, Northfield, IL (e.g., RUCOTE® 560, carboxyl functional polyester resin having an acid value of 55; RUCOTE® 562, carboxyl functional polyester resin having an acid value of 55); YDF-2004, bisphenol-F type taffy process solid resin from Kukdo Chemicals, Seoul South Korea; and the like.

The powder formulation for the primer coat can comprise a curing agent (also referred to herein as a second curing agent). In some embodiments, the curing agent comprises cyanamide, dicyanamide, dicyandiamide, guanidine, cyanoguanidine, diguanide (e.g., o-tolyldiguanide), resin (e.g., acid functional acrylic resin, carboxyl function polyester resin, phenolic resin, novolac phenolic resin, or any combination thereof), diacid, hydroxyalkylamide (e.g., $(R^{N1})_2NC(O)$-Ak-$C(O)N(R^{N1})_2$, as described herein), imidazole-based curing agents (e.g., optionally substituted imidazole), or a combination thereof.

In some embodiments, cyanamide includes one or more-N(CN) $R^{N1}$ groups, in which $R^{N1}$ is hydrogen (H) or an optionally substituted $C_{1-18}$ hydrocarbyl group (e.g., alkyl, haloalkyl, aryl, alkaryl, aralkyl, etc.). In some embodiments, cyanamide is $R^{N2}N(CN)R^{N1}$ groups, in which each of $R^{N1}$ and $R^{N2}$ is, independently, hydrogen (H) or an optionally substituted $C_{1-18}$ hydrocarbyl group (e.g., alkyl, haloalkyl, aryl, alkaryl, aralkyl, etc.).

In some embodiments, dicyanamide includes one or more —N(CN)$_2$ groups. In some embodiments, dicyanamide is $(CN)NR^{N1}(CN)$, in which $R^{N1}$ is hydrogen (H) or an optionally substituted $C_{1-18}$ hydrocarbyl group (e.g., alkyl, haloalkyl, aryl, alkaryl, aralkyl, etc.). In some embodiments, $R^{N1}$ is H.

In some embodiments, dicyandiamide includes one or more-$NR^{N1}C[NR^{N1}]NR^{N1}(CN)$ or —$NR^{N1}C[NCN]N(R^{N1})_2$ groups, in which each $R^{N1}$ is, independently, hydrogen (H) or an optionally substituted $C_{1-18}$ hydrocarbyl group (e.g., alkyl, haloalkyl, aryl, alkaryl, aralkyl, etc.). In some embodiments, dicyandiamide is $R^{N2}R^{N1}NC[NR^{N1}]NR^{N1}(CN)$, in which each $R^{N1}$ and $R^{N2}$ is, independently, hydrogen (H) or an optionally substituted $C_{1-18}$ hydrocarbyl group. In some embodiments, $R^{N1}$ is H.

In some embodiments, the guanidine includes one or more —$NR^{N1}C[NR^{N1}]N(R^{N1})_2$ groups, in which each $R^{N1}$ is, independently, hydrogen (H) or an optionally substituted $C_{1-18}$ hydrocarbyl group (e.g., alkyl, haloalkyl, aryl, alkaryl, aralkyl, etc.). In some embodiments, the guanidine is $R^{N2}R^{N1}NC[NR^{N1}]N(R^{N1})_2$, in which each $R^{N1}$ and $R^{N2}$ is, independently, hydrogen (H) or an optionally substituted $C_{1-18}$ hydrocarbyl group (e.g., alkyl, haloalkyl, aryl, alkaryl, aralkyl, etc.). In some embodiments, $R^{N1}$ is H.

In some embodiments, the cyanoguanidine includes one or more —$NR^{N1}C[NR^{N1}]N(R^{N1})_2$ groups, in which each $R^{N1}$ is, independently, hydrogen (H) or an optionally substituted $C_{1-18}$ hydrocarbyl group (e.g., alkyl, haloalkyl, aryl, alkaryl, aralkyl, etc.), and in which at least one $R^{N1}$ is cyano (e.g., —CN). In some embodiments, cyanoguanidine is $R^{N2}R^{N1}NC[NR^{N1}]N(R^{N1})_2$, in which each $R^{N1}$ and $R^{N2}$ is, independently, hydrogen (H) or an optionally substituted $C_{1-18}$ hydrocarbyl group (e.g., alkyl, haloalkyl, aryl, alkaryl, aralkyl, etc.), and at least one $R^{N1}$ or $R^{N2}$ is cyano (e.g., —CN). In some embodiments, at least one $R^{N1}$ is cyano, and/or $R^{N2}$ is optionally substituted $C_{1-18}$ hydrocarbyl.

In some embodiments, diguanide includes $R^{N2}R^{N1}NC(NR^{N1})NR^{N1}C(NR^{N1})N(R^{N1})_2$, in which each $R^{N1}$ and $R^{N2}$ is, independently, hydrogen (H) or an optionally substituted $C_{1-18}$ hydrocarbyl group (e.g., alkyl, haloalkyl, aryl, alkaryl, aralkyl, etc.). In some embodiments, $R^{N2}$ is optionally substituted hydrocarbyl (e.g., optionally substituted aryl).

In some embodiments, diacid is $HO_2C$-Ak-$CO_2H$, in which Ak is an optionally substituted multivalent (e.g., divalent) substituted $C_{1-18}$ hydrocarbyl group (e.g., alkylene, alkenylene, alkynylene, etc.). The acid groups (—$CO_2H$ groups) can be provided at the terminal end of Ak or within an internal position of Ak. Furthermore, Ak can be linear or branched.

In some embodiments, hydroxyalkylamide is $(R^{N1})_2NC(O)$-Ak-$C(O)N(R^{N1})_2$, in which each $R^{N1}$ is, independently, hydrogen (H) or an optionally substituted $C_{1-18}$ hydrocarbyl group (e.g., alkyl, haloalkyl, hydroxyalkyl, aryl, alkaryl, aralkyl, etc.); Ak is an optionally substituted multivalent (e.g., divalent) substituted $C_{1-18}$ hydrocarbyl group (e.g., alkylene, alkenylene, alkynylene, etc.); and at least one $R^{N1}$ is an optionally substituted hydroxyalkyl. The amido groups (—$C(O)N(R^{N1})_2$ groups) can be provided at the terminal end of Ak or within an internal position of Ak. Furthermore, Ak can be linear or branched. In some embodiments, the hydroxyalkyl is an alkyl group (e.g., as described herein) with one, two, three, or more hydroxyl groups (e.g., —OH). In some embodiments, the hydroxyalkyl is optionally substituted with one or more substituents described herein for hydrocarbyl or alkyl. In some embodiments, the hydroxyalkyl is -Ak-OH, in which Ak is alkylene optionally substituted with one or more substituents described herein for hydrocarbyl or alkyl.

In some embodiments (e.g., of a diacid or hydroxyalkylamide), Ak is optionally substituted with one or more substituents described herein for hydrocarbyl or alkyl.

In some embodiments, the optionally substituted imidazole is imidazole, 1-$R^{im}$-imidazole, 2-$R^{im}$-imidazole, 2,4-$(R^{im})_2$-imidazole, 2,5-$(R^{im})_2$-imidazole, 1,2,4-$(R^{im})_3$-imidazole, or 1,2,5-$(R^{im})_3$-imidazole, in which each $R^{im}$ is, independently, H or optionally substituted $C_{1-6}$ hydrocarbyl (e.g., alkyl, aryl, alkaryl, aralkyl, etc.). Non-limiting examples of imidazole-based curing agents can include, e.g., 2-methyl imidazole, 2-ethylimidazole, 2-ethyl-4 (5)-methylimidazole, 2-phenylimidazole and the like.

In some embodiments, the curing agent comprises a resin, e.g., an acid functional acrylic resin, a carboxyl function polyester resin, or combination thereof.

In some embodiments, the acid functional acrylic resin comprises acrylic monomers, acrylic acid derivatives, methacrylic acid derivatives, or a combination thereof. In some embodiments, the acid functional acrylic resin comprises an acid number of about 30 to 70 mg KOH/g of resin, e.g., about 40 to 70, about 50 to 70, about 60 to 70, about 30 to 60, about 30 to 50, or about 30 to 40, mg KOH/g of resin.

In some embodiments, the curing agent comprises a carboxyl functional polyester resin, e.g., a carboxyl functional polyester resin comprising an acid number of about 30 to 70 mg KOH/g of resin; and/or a hydroxyl number of about 3 to 10 mg KOH/g of resin. In some embodiments, the carboxyl functional polyester resin comprising an acid number of about 55 mg KOH/g of resin; and/or a hydroxyl number of about 8 mg KOH/g of resin. In some embodiments, the carboxyl functional polyester resin comprising an acid number of about 52-58 mg KOH/g of resin.

In some embodiments, the curing agent comprises a diacid, e.g., dodecanediolic acid. In some embodiments, the curing agent comprises a hydroxyalkylamide (e.g., as described herein).

In some embodiments, the powder formulation for the primer coat comprises a curing agent (e.g., cyanamide, dicyanamide, dicyandiamide, guanidine, cyanoguanidine, diguanide, resin (e.g., acid functional acrylic resin, carboxyl function polyester resin, phenolic resin, novolac phenol resin, or a combination thereof), diacid, hydroxyalkylamide (e.g., as described herein), imidazole-based curing agents (e.g., 2-methylimidazole, 2-ethylimidazole, 2-ethyl-4 (5)-methylimidazole, 2-phenylimidazole and the like, as well as any described herein), or any combination thereof) in a total amount of about 0.1 wt % to about 30 wt % of the formulation, e.g., about 0.5 wt % to about 30 wt %, about 1 wt % to about 30 wt %, about 2.5 wt % to about 30 wt %, about 5 wt % to about 30 wt %, about 7.5 wt % to about 30 wt %, about 10 wt % to about 30 wt %, about 15 wt % to about 30 wt %, about 20 wt % to about 30 wt %, about 25 wt % to about 30 wt %, about 0.1 wt % to about 25 wt %, about 0.1 wt % to about 20 wt %, about 0.1 wt % to about 10 wt %, about 0.1 wt % to about 7.5 wt %, about 0.1 wt % to about 5 wt %, about 0.1 wt % to about 2.5 wt %, or about 0.1 wt % to about 1 wt % of the formulation.

In some embodiments, the powder formulation for the primer coat comprises one or more curing agents (e.g., any described herein) in a total amount of at least about 0.1 wt % to about 2.0 wt %, e.g., about 0.5 wt % to about 2.0 wt %, about 1.0 wt % to about 2.0 wt %, about 1.5 wt % to about 2.0 wt %, about 0.1 wt % to about 1.5 wt %, about 0.1 wt % to about 1.0 wt %, or about 0.1 wt % to about 0.5 wt % of the formulation.

In some embodiments, the powder formulation for the primer coat comprises one or more curing agents (e.g., any described herein) in a total amount of at least about 0.1 wt % (e.g., at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1 wt %, or at least about 1.5 wt %) and/or at most about 30 wt % (e.g., at most about 25 wt %, at most about 20 wt %, at most about 15 wt %, at most about 10 wt %, at most about 5 wt %, at most about 3 wt %, or at most about 1 wt %) of the formulation.

In some embodiments, the powder formulation for the primer coat comprises a curing agent (e.g., cyanamide, dicyanamide, dicyandiamide, guanidine, cyanoguanidine, o-diguanide, resin (e.g., acid functional acrylic resin, carboxyl function polyester resin, phenolic resin, novolac phenol resin, or a combination thereof), diacid, hydroxyalkylamide (e.g., as described herein), imidazole-based curing agents (e.g., 2-methyl imidazole or any described herein), or any combination thereof) in a total amount of about 0.1 wt % to about 6 wt % of the formulation, e.g., about 0.5 wt % to about 6 wt %, about 1 wt % to about 6 wt %, about 2 wt % to about 6 wt %, about 3 wt % to about 6 wt %, about 4 wt % to about 6 wt %, about 5 wt % to about 6 wt %, about 0.1 wt % to about 5 wt %, about 0.1 wt % to about 4 wt %, about 0.1 wt % to about 3 wt %, about 0.1 wt % to about 2 wt %, about 0.1 wt % to about 1 wt %, or about 0.1 wt % to about 0.5 wt % of the formulation.

A person of ordinary skill in the art will appreciate that the amount of curing agent can vary depending on the type of resin and/or curing agent included in the powder formulation. For example and without limitation, when the powder formulation for the primer coat comprises an epoxy resin and a carboxyl functional polyester resin, the powder formulation can comprise a curing agent in a total amount of about 0.1 wt % to about 30 wt % of the formulation. In another non-limiting example, when the powder formulation for the primer coat comprises an epoxy resin and an epoxy specific curing agent, the powder formulation can comprise a curing agent in a total amount of about 0.1 wt % to about 6 wt % of the formulation.

For example and without limitation, a person of ordinary skill in the art will recognize which curing agent or curing agents are suitable for use with which resin or resins. For example, the person of ordinary skill in the art will recognize that a polyepoxide may be suitable for use as a curing agent with a carboxyl functional polyester resin. In another example, the person of ordinary skill in the art will recognize that dicyanamide may be suitable for use as a curing agent with an epoxy resin.

Non-limiting examples for curing agents include AA-1600SF (an acid functional acrylic resin comprising an acid value of about 33 to 37 mg KOH/g resin from Sun Polymers International, Inc., Mooresville, IN), CASA-MID™ 780 (accelerated dicyandiamide from Thomas Swan, Consett, U.K.), DYHARD® 100S (dicyandiamide from Alzchem, Trostberg, Germany), RUCOTE® 560 (a carboxyl functional polyester resin comprising an acid value of 55 mg KOH/g and a hydroxyl number of 8 mg KOH/g from Stepan Company, Northfield, IL), URALAC® P 5042 (a carboxyl functional polyester resin comprising an acid value of about 52 to 58 from Covestro Resins, Shanghai, China), KD-404J (a phenol curing agent from Kukdo Chemicals, Seoul, South Korea), VESTAGON® B 68 (a mono-salt of a polycarboxylic acid and a cycle amidine curing agent from Evonik Corp., Parsippany, NJ), and the like.

The powder formulation for the primer coat can comprise a degassing agent (also referred to herein as a second degassing agent), e.g., benzoin, benzoin coated polyamide, or both. In some embodiments, the powder formulation for the primer coat comprises a degassing agent (e.g., benzoin, benzoin coated polyamide, polyamide, polyethylene, a derivative form or a modified form of any of these, or a combination of any of these) in a total amount of about 0.05 wt % to about 5 wt % of the formulation, e.g., about 0.5 wt % to about 5 wt %, about 1 wt % to about 5 wt %, about 2 wt % to about 5 wt %, about 3 wt % to about 5 wt %, about 4 wt % to about 5 wt %, about 0.05 wt % to about 4 wt %, about 0.05 wt % to about 3 wt %, about 0.05 wt % to about 2 wt %, about 0.05 wt % to about 1 wt %, or about 0.05 wt % to about 0.5 wt % of the formulation. In some embodiments, the polyamide is an amide modified phenolated urea surfactant. In some embodiments, the modified polyethylene is polyethylene modified with polyamide.

The powder formulation for the primer coat can comprise a degassing agent in a total amount of about 0.1 wt % to about 2.0 wt % of the formulation, e.g., about 0.5 wt % to about 2.0 wt %, about 1.0 wt % to about 2.0 wt %, about 1.5 wt % to about 2.0 wt %, about 0.1 wt % to about 1.5 wt %, about 0.1 wt % to about 1.0 wt %, or about 0.1 wt % to about 0.5 wt % of the formulation.

In some embodiments, the powder formulation for the primer coat comprises one or more degassing agents (e.g., any described herein) in a total amount of at least about 0.05 wt % (e.g., at least about 0.1 wt %, at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, at least about 1.5 wt %, at least about 2 wt %, at least about 2.5 wt %, at least about 3 wt %, at least about 3.5 wt %, at least about 4 wt %, at least about 4.5 wt %, or at least about 5 wt %) and/or at most about 10 wt % (e.g., at most about 8.5 wt %, at most about 8 wt %, at most about 7.5 wt %, at most about 7 wt %, at most about 6.5 wt %, at most about 6 wt %, at most about 5.5 wt %, or at most about 5 wt %) of the formulation.

Non-limiting examples for degassing agents include CERETAN® MAB7055 (micronized Amide wax, coated with benzoin from Münzing Micro Technologies GmbH, Abstatt, Germany), POWDERMATE® 542DG (a polyamide- or amide-modified phenolated urea surfactant from Arxada—Troy Corp., Florham Park, NJ), CERAFLOUR® 962 (a micronized modified polyethylene wax from BYK- Chemie GmbH, Wesel, Germany), (MPP-620VF, a micronized polyethylene wax from Micro Powders Inc., Tarrytown, NY), and the like.

The powder formulation for the primer coat can comprise a corrosion resistance filler, e.g., an alkaline earth metal salt, e.g., aluminum silicate, aluminum triphosphate, aluminum zinc phosphate, barium chromate, barium metaborate, barium sulfate, calcium aluminum phosphate, calcium aluminum silicate, calcium barium phosphosilicate, calcium borosilicate, calcium carbonate, calcium chromate, calcium molybdate, calcium phosphate, calcium strontium phosphosilicate, calcium strontium zinc phosphosilicate, calcium sulfate, calcium zinc molybdate, strontium aluminum phosphate, strontium chromate, strontium phosphate, or any combination of these.

The powder formulation for the primer coat can comprise a corrosion resistance filler, e.g, a compound comprising zinc or a zinc salt, e.g., zinc aluminum phosphate, calcium strontium zinc phosphosilicate, calcium zinc molybdate, zinc aluminum calcium phosphate, zinc borate, zinc borate phosphate hydrate, zinc calcium aluminum strontium phosphate, zinc calcium phosphate, zinc calcium strontium phosphate, zinc dust, zinc flakes, zinc hydroxy phosphate, zinc molybdate, zinc oxide, zinc phosphate, zinc potassium chromate, zinc tetrahydroxy chromate, or any combination of these.

In some embodiments, the corrosion resistance filler can be an aluminate, a borate, a borosilicate, a carbonate, a chromate, a molybdate, an oxide, a phosphate, a phosphosilicate, a silicate, a sulfate, as well as forms including one or more metals or metalloids (e.g., alkali metals, alkaline earth metals, transition metals, Group 13 elements, or combinations thereof), one or more salt forms, one or more hydrate forms, or a combination of any of these.

In some embodiments, the powder formulation for the primer coat comprises a corrosion resistance filler (e.g., an alkaline earth metal salt, an aluminate, a borate, a borosilicate, a carbonate, a chromate, a molybdate, an oxide, a phosphate, a phosphosilicate, a silicate, a sulfate, zinc, a zinc salt, such as any described herein, or any combination of these) in a total amount of about 1 wt % to about 80 wt % of the formulation, e.g., about 10 wt % to about 80 wt %, about 20 wt % to about 80 wt %, about 30 wt % to about 80 wt %, about 40 wt % to about 80 wt %, about 50 wt % to about 80 wt %, about 60 wt % to about 80 wt %, about 70 wt % to about 80 wt %, about 1 wt % to about 70 wt %, about 1 wt % to about 60 wt %, about 1 wt % to about 50 wt %, about 1 wt % to about 40 wt %, about 1 wt % to about 30 wt %, about 1 wt % to about 20 wt %, or about 1 wt % to about 10 wt % of the formulation.

In some embodiments, the powder formulation for the primer coat comprises a corrosion resistance filler in a total amount of about 50 wt % to about 90 wt % of the formulation, e.g., about 60 wt % to about 90 wt %, about 70 wt % to about 90 wt %, about 80 wt % to about 90 wt %, about 50 wt % to about 80 wt %, about 50 wt % to about 70 wt %, about 45 wt % to about 75 wt %, or about 50 wt % to about 60 wt % of the formulation.

In some embodiments, the powder formulation for the primer coat comprises a corrosion resistance filler (e.g, a compound comprising zinc or a zinc salt, e.g., zinc aluminum phosphate, calcium strontium zinc phosphosilicate, calcium zinc molybdate, zinc aluminum calcium phosphate, zinc borate, zinc borate phosphate hydrate, zinc calcium aluminum strontium phosphate, zinc calcium phosphate, zinc calcium strontium phosphate, zinc dust, zinc flakes, zinc hydroxy phosphate, zinc molybdate, zinc oxide, zinc phosphate, zinc potassium chromate, zinc tetrahydroxy chromate, or any combination of these) in a total amount of about 1 wt % to about 80 wt % of the formulation, e.g., about 10 wt % to about 80 wt %, about 20 wt % to about 80 wt %, about 30 wt % to about 80 wt %, about 40 wt % to about 80 wt %, about 50 wt % to about 80 wt %, about 60 wt % to about 80 wt %, about 70 wt % to about 80 wt %, about 1 wt % to about 70 wt %, about 1 wt % to about 60 wt %, about 1 wt % to about 50 wt %, about 1 wt % to about 40 wt %, about 1 wt % to about 30 wt %, about 1 wt % to about 20 wt %, or about 1 wt % to about 10 wt % of the formulation.

In some embodiments, the powder formulation for the primer coat comprises one or more corrosion resistance fillers (e.g., any described herein) in a total amount of at least about 1 wt % (e.g., at least about 2 wt %, at least about 3 wt %, at least about 4 wt %, at least about 5 wt %, at least about 6 wt %, at least about 7 wt %, at least about 8 wt %, at least about 9 wt %, at least about 10 wt %, at least about 12 wt %, at least about 15 wt %, at least about 20 wt %, at least about 25 wt %, at least about 30 wt %, or at least about 35 wt %) and/or at most about 80 wt % (e.g., at most about 75 wt %, at most about 70 wt %, at most about 65 wt %, at most about 60 wt %, at most about 55 wt %, at most about 50 wt %, at most about 45 wt %, at most about 40 wt %, at most about 35 wt %, at most about 30 wt %, at most about 25 wt %, at most about 20 wt %, at most about 15 wt %, or at most about 10 wt %) of the formulation.

Non-limiting examples for corrosion resistance fillers include BLANC FIXE Micro® (precipitated barium sulfate from Huntsman, The Woodlands, TX), CIMBAR™ UF (barium sulfate, median particle size of 2.0 microns from Cimbar Performance Minerals, Cartersville, Georgia), CIMBAR™ PC (barium sulfate, median particle size of 9.4 microns from Cimbar Performance Minerals, Cartersville, Georgia), and the like.

The powder formulation for the primer coat can comprise a transfer efficiency additive (also referred to herein as a second transfer efficiency additive), e.g., a ceramic, such as barium titanate, zirconium titanate, strontium titanate, barium strontium titanate, potassium niobate, sodium niobate, or a combination of any of these. In some embodiments, the powder formulation for the primer coat comprises a transfer efficiency additive (e.g., barium titanate) in a total amount of about 0.05 wt % to about 5 wt % of the formulation, e.g., about 1 wt % to about 5 wt %, about 2 wt % to about 5 wt %, about 3 wt % to about 5 wt %, about 4 wt % to about 5 wt %, about 0.05 wt % to about 4 wt %, about 0.05 wt % to about 3 wt %, about 0.05 wt % to about 2 wt %, or about 0.05 wt % to about 1 wt % of the formulation.

The powder formulation for the primer coat can comprise a transfer efficiency additive in a total amount of about 0.1 wt % to about 2.0 wt % of the formulation, e.g., about 0.5 wt % to about 2.0 wt %, about 1.0 wt % to about 2.0 wt %, about 1.5 wt % to about 2.0 wt %, about 0.1 wt % to about 1.5 wt %, about 0.1 wt % to about 1.0 wt %, or about 0.1 wt % to about 0.5 wt % of the formulation.

In some embodiments, the powder formulation for the primer coat comprises one or more transfer efficiency additives (e.g., any described herein) in a total amount of at least about 0.05 wt % (e.g., at least about 0.1 wt %, at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, at least about 1.5 wt %, at least about 2 wt %, at least about 2.5 wt %, at least about 3 wt %, at least about 3.5 wt %, at least about 4 wt %, or at least about 4.5 wt %) and/or at most about 10 wt % (e.g., at most about 5.5 wt %, at most about 5 wt %, at most about 4.5 wt %, at most about 4 wt %, at most about 3.5 wt %, at most about 3 wt %, at most about 2.5 wt %, at most about 2 wt %, at most about 1.5 wt %, or at most about 1 wt %) of the formulation.

The powder formulation for the primer coat can comprise a flow modifier (also referred to herein as a second flow modifier), e.g., an acrylic polymer such as an absorbed acrylic polymer on a particle, polysiloxane, a fluorocarbon, and the like. In some embodiments, the powder formulation for the primer coat comprises a flow modifier (e.g., an acrylic polymer such as an absorbed acrylic polymer on a particle, polysiloxane, a fluorocarbon, and the like) in a total amount of about 0.05 wt % to about 5 wt % of the formulation, e.g., about 0.5 wt % to about 5 wt %, about 1 wt % to about 5 wt %, about 2 wt % to about 5 wt %, about 3 wt % to about 5 wt %, about 4 wt % to about 5 wt %, about 0.05 wt % to about 4 wt %, about 0.05 wt % to about 3 wt %, about 0.05 wt % to about 2 wt %, about 0.05 wt % to about 1 wt %, or about 0.05 wt % to about 0.5 wt % of the formulation.

The powder formulation for the primer coat can comprise a flow modifier in a total amount of about 0.1 wt % to about 2.0 wt % of the formulation, e.g., about 0.5 wt % to about 2.0 wt %, about 1.0 wt % to about 2.0 wt %, about 1.5 wt % to about 2.0 wt %, about 0.1 wt % to about 1.5 wt %, about 0.1 wt % to about 1.0 wt %, or about 0.1 wt % to about 0.5 wt % of the formulation.

In some embodiments, the powder formulation for the primer coat comprises one or more flow modifiers (e.g., any described herein) in a total amount of at least about 0.1 wt % (e.g., at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, at least about 1.5 wt %, at least about 2 wt %, at least about 2.5 wt %, at least about 3 wt %, at least about 3.5 wt %, at least about 4 wt %, or at least about 4.5 wt %) and/or at most about 10 wt % (e.g., at most about 5 wt %, at most about 4.5 wt %, at most about 4 wt %, at most about 3.5 wt %, at most about 3 wt %, at most about 2.5 wt %, or at most about 2 wt %) of the formulation.

Non-limiting examples for flow modifiers include RESI-FLOW® PH-241 (mixture of acrylic polymer and silica from Estron Chemicals, Inc., Calvert City, KY), RESI-FLOW® PL-200 (mixture of acrylic polymer and silica from Estron Chemicals, Inc., Calvert City, KY), RESI-FLOW® PL-200A (mixture of acrylic polymer and silica from Estron Chemicals, Inc., Calvert City, KY), RESI-FLOW® PL-230 (mixture of acrylic polymer and silica from Estron Chemicals, Inc., Calvert City, KY), RESI-FLOW® PL-330 (mixture of acrylic polymer and silica from Estron Chemicals, Inc., Calvert City, KY), MODA-FLOW® Powder III (silicone free resin from Allnex, Frankfurt, Germany), Floaid MAPS-P (60% polysiloxane from Danick Specialties & Support, Inc., Niceville, FL), Floaid FC-4 (70% fluorochemical surfactant from Danick Specialties & Support, Inc., Niceville, FL), and the like.

The powder formulation for the primer coat can comprise a pigment, e.g., carbon black, titanium dioxide, or both. In some embodiments, the powder formulation for the primer coat comprises a pigment (e.g., carbon black, titanium dioxide, or both) in a total amount of about 1 wt % to about 10 wt % of the formulation, e.g., about 2.5 wt % to about 10 wt %, about 5 wt % to about 10 wt %, about 7.5 wt % to about 10 wt %, about 1 wt % to about 7.5 wt %, about 1 wt % to about 5 wt %, or about 1 wt % to about 2.5 wt % of the formulation. In some embodiments, the pigment is a non-conductive pigment.

In some embodiments, the powder formulation for the primer coat comprises one or more pigments (e.g., any described herein) in a total amount of at least about 0.1 wt % (e.g., at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, at least about 1.5 wt %, or at least about 2 wt %) and/or at most about 50 wt % (e.g., at most about 40 wt %, at most about 30 wt %, at most about 20 wt %, at most about 10 wt %, at most about 5 wt %, or at most about 2.5 wt %) of the formulation.

Non-limiting examples for pigments include TI-PURE® R-960 (rutile titanium dioxide pigment from DUPONT™, Wilmington, DE), TIOXIDE® TR93 (pigment white from Venator, Wynyard, U.K.), MONARCH® 1300 (pigment black from Cabot Corp., Billerica, MA), and the like.

The powder formulation for the primer coat can comprise a phase-transfer catalyst, e.g., an ammonium salt, a phosphonium salt (e.g., optionally adsorbed on a solid carrier), or a combination thereof. In some embodiments, the ammonium salt is $N^+(R^{N1})_4 X^-$, and wherein each $R^{N1}$ is, independently, hydrogen (H) or an optionally substituted $C_{1-18}$ hydrocarbyl group (e.g., alkyl, haloalkyl, aryl, alkaryl, aralkyl, etc.) and X is an anion. In some embodiments, the phosphonium salt is $P^+(R^{P1})_4 X^-$, and wherein each $R^{P1}$ is, independently, hydrogen (H) or an optionally substituted $C_{1-18}$ hydrocarbyl group (e.g., alkyl, haloalkyl, aryl, alkaryl, aralkyl, etc.) and X is an anion.

Non-limiting hydrocarbyl groups include alkyl, alkenyl, alkynyl, aryl, alkaryl (e.g., —Ar-Ak, in which Ar is a multivalent aryl group and Ak is an alkyl group), aralkyl (e.g., -Ak-Ar, in which Ak is a multivalent alkyl group and Ar is an aryl group), and the like. Non-limiting examples of alkyl include methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic (e.g., $C_{3-24}$ cycloalkyl) or acyclic. The alkyl group can be a primary, secondary, or tertiary alkyl group substituted with one or more substituents (e.g., one or more halo, alkoxy, acyl, and the like). In some embodiments, the unsubstituted alkyl group is a $C_{1-3}$, $C_{1-6}$, $C_{1-12}$, $C_{1-16}$, $C_{1-18}$, $C_{1-20}$, or $C_{1-24}$ alkyl group. Non-limiting examples of aryl include benzyl, naphthalene, phenyl, biphenyl, phenoxy benzene, and the like. The aryl group can optionally include one or more heteroatoms. The aryl group can be substituted with one or more substituents (e.g., one or more halo, alkyl, alkoxy, acyl, and the like). In particular embodiments, an unsubstituted aryl group is a $C_{4-18}$, $C_{4-14}$, $C_{4-12}$, $C_{4-10}$, $C_{6-18}$, $C_{6-14}$, $C_{6-12}$, or $C_{6-10}$ aryl group.

Non-limiting anions include halide (e.g., chloride, bromide, iodide, or fluoride), sulfate, bisulfate, sulfite, bisulfite, carbonate, bicarbonate, hypochlorite, perchlorate, chlorate, phosphate, monohydrogen phosphate, acetate, formate, oxalate, etc.), and the like.

In some embodiments, the ammonium salt includes a tetraalkylammonium halide (e.g., $N^+(R^{N1})_4 X^-$, and wherein each $R^{N1}$ is, independently, an optionally substituted $C_{1-18}$ alkyl and X is an anion). Non-limiting examples include benzyltriethylammonium chloride, benzyltrimethylammonium chloride, tetrabutylammonium bromide, tetrabutylammonium chloride, tetrabutylammonium iodide, tetradecylammonium bromide, tetradecylammonium chloride, tetradecylammonium iodide, butyl triethyl ammonium bromide, butyl triethyl ammonium chloride, or a combination thereof.

In some embodiments, the phosphonium salt comprises a phosphonium halide (e.g., $P^+(R^{P1})_4X^-$, in which each $R^{P1}$ is H and X is an anion, such as phosphonium bromide, phosphonium chloride, phosphonium iodide, and the like), an aryl phosphonium halide (e.g., $P^+(R^{P1})_4X^-$, in which at least one $R^{P1}$ is optionally substituted aryl and X is an anion, such as triphenyl phosphonium bromide, triphenyl phosphonium chloride, triphenyl phosphonium iodide, and the like), or an alkyl phosphonium halide (e.g., $P^+(R^{P1})_4X^-$, in which at least one $R^{P1}$ is optionally substituted alkyl and X is an anion, such as tetrabutyl phosphonium bromide, tetrabutyl phosphonium chloride, tetrabutyl phosphonium iodide, and the like), or a combination thereof.

In some embodiments, the powder formulation for the primer coat comprises a phase-transfer catalyst (e.g., an ammonium salt, a phosphonium salt, or combinations thereof) in a total amount of about 0.01 wt % to about 10 wt % of the formulation, e.g., about 0.05 wt % to about 10 wt %, about 0.1 wt % to about 10 wt %, about 1 wt % to about 10 wt %, about 2.5 wt % to about 10 wt %, about 5 wt % to about 10 wt %, about 7.5 wt % to about 10 wt %, about 0.01 wt % to about 7.5 wt %, about 0.01 wt % to about 5 wt %, about 0.01 wt % to about 2.5 wt %, about 0.01 wt % to about 1 wt %, about 0.01 wt % to about 0.5 wt %, about 0.05 wt % to about 7.5 wt %, about 0.05 wt % to about 5 wt %, about 0.05 wt % to about 2.5 wt %, about 0.05 wt % to about 1 wt %, about 0.05 wt % to about 0.5 wt %, about 0.05 wt % to about 0.1 wt %, about 0.1 wt % to about 7.5 wt %, about 0.1 wt % to about 5 wt %, about 0.1 wt % to about 2.5 wt %, or about 0.1 wt % to about 1 wt % of the formulation.

In some embodiments, the powder formulation for the primer coat comprises one or more phase-transfer catalysts (e.g., any described herein) in a total amount of at least about 0.01 wt % (e.g., at least about 0.05 wt %, at least about 0.1 wt %, at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, at least about 1.5 wt %, at least about 2 wt %, at least about 2.5 wt %, at least about 3 wt %, at least about 3.5 wt %, at least about 4 wt %, or at least about 4.5 wt %) and/or at most about 10 wt % (e.g., at most about 8 wt %, at most about 5 wt %, at most about 4.5 wt %, at most about 4 wt %, at most about 3.5 wt %, at most about 3 wt %, at most about 2.5 wt %, at most about 2 wt %, at most about 1.5 wt %, at most about 1 wt %, or at most about 0.5 wt %) of the formulation.

Non-limiting examples for phase-transfer catalysts include ACTIRON® 43-65 (tetabutylammonium bromide adsorbed on silica from Synthron, Essex, U.K.), ARADUR® DT 3126-2 (curing accelerator from Huntsman, The Woodlands, TX), and the like.

The powder formulation for the primer coat can comprise an antistatic agent, e.g., long-chain aliphatic amines, long-chain aliphatic amides, quaternary ammonium salts (e.g., behentrimonium chloride or cocamidopropyl betaine), esters of phosphoric acid, polyethylene glycol esters, polyols, and combinations thereof). In some embodiments, the primer coat comprises an antistatic agent in a total amount of about 0.05 wt % to about 5 wt % of the formulation, e.g., about 0.05 wt % to about 5 wt % of the formulation, about 1 wt % to about 5 wt %, about 2 wt % to about 5 wt %, about 3 wt % to about 5 wt %, about 4 wt % to about 5 wt %, about 0.05 wt % to about 4 wt %, about 0.05 wt % to about 3 wt %, about 0.05 wt % to about 2 wt %, or about 0.05 wt % to about 1 wt % of the formulation.

Non-limiting examples for antistatic agents include LANCO™ Stats from Lubrizol, Wickliffe, OH, e.g., LANCO™ Stat 308, LANCO™ Stat LI 100, LANCO™ Stat K 100 N, LANCO™ Stat FN, LANCO™ Stat PUN, LANCO™ Stat L 80N and the like.

The powder formulation for the primer coat can comprise a conductive agent, e.g., conductive carbon black, graphene, graphite fibers, carbon fibers, metal coated carbon fibers, carbon nanotubes, or a combination of any of these. In some embodiment, the powder formulation for the primer coat comprises conductive carbon black beads. In some embodiments, the powder formulation for the primer coat comprises a conductive agent (e.g., conductive carbon black, graphene, graphite fibers, carbon fibers, metal coated carbon fibers, carbon nanotubes, or a combination of any of these) in a total amount of about 0.01 wt % to about 0.8 wt % of the formulation, e.g., about 0.05 wt % to about 0.8 wt %, about 0.1 wt % to about 0.8 wt %, about 0.2 wt % to about 0.8 wt %, about 0.3 wt % to about 0.8 wt %, about 0.4 wt % to about 0.8 wt %, about 0.5 wt % to about 0.8 wt %, about 0.6 wt % to about 0.8 wt %, about 0.7 wt % to about 0.8 wt %, about 0.01 wt % to about 0.7 wt %, about 0.01 wt % to about 0.6 wt %, about 0.01 wt % to about 0.5 wt %, about 0.01 wt % to about 0.4 wt %, about 0.01 wt % to about 0.3 wt %, about 0.01 wt % to about 0.2 wt %, about 0.01 wt % to about 0.1 wt %, or about 0.01 wt % to about 0.05 wt % of the formulation.

In some embodiments, the powder formulation for the primer coat comprises one or more conductive agents (e.g., any described herein) in a total amount of at least about 0.01 wt % (e.g., at least about 0.05 wt %, at least about 0.1 wt %, at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, at least about 1.5 wt %, at least about 2 wt %, at least about 2.5 wt %, at least about 3 wt %, at least about 3.5 wt %, at least about 4 wt %, or at least about 4.5 wt %) and/or at most about 1 wt % (e.g., at most about 0.8 wt %, or at most about 0.5 wt %) of the formulation.

Non-limiting examples for conductive agents include TUBALL™ Matrix 809 (conductive graphene nanotubes from OCSiAl, Luxembourg, Luxembourg), BLACK PEARLS® 2000 (very fine particle sized, conductive grade carbon black from Cabot Corp., Billerica, MA), and the like.

The powder formulation for the primer coat can comprise a wetting agent, e.g., a wax, a modified wax, a way based wetting agent with pigment affinic groups, a silicone based wetting agent, or a combination of any of these. In some embodiments, the powder formulation for the primer coat comprises a wetting agent (e.g., a wax, a modified wax, a wax based wetting agent with pigment affinic groups, a silicone based wetting agent, or a combination of any of these) in a total amount of about 0.05 wt % to about 10 wt % of the formulation, e.g., about 0.1 wt % to about 10 wt %, about 1 wt % to about 10 wt %, about 2.5 wt % to about 10 wt %, about 5 wt % to about 10 wt %, about 7.5 wt % to about 10 wt %, about 0.05 wt % to about 7.5 wt %, about 0.05 wt % to about 5 wt %, about 0.05 wt % to about 2.5 wt %, or about 0.05 wt % to about 1 wt % of the formulation.

In some embodiments, the powder formulation for the primer coat comprises one or more wetting agents (e.g., any described herein) in a total amount of at least about 0.05 wt % (e.g., at least about 0.1 wt %, at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1.0 wt %, at least about 1.5 wt %, at least about 2 wt %, at least about 2.5 wt %, at least about 3 wt %, at least about 3.5 wt %, at least about 4 wt %, or at least about 4.5 wt %) and/or at most about 10 wt % (e.g., at most about 8 wt %, at most about 5 wt %, at most about 4.5 wt %, at most about 4 wt %, at most about 3.5 wt %, at most about 3 wt %, at most about 2.5 wt %, at most about 2 wt %, at most about 1.5 wt %, at most about 1 wt %, or at most about 0.5 wt %) of the formulation.

Non-limiting examples for wetting agents include BYK®-3950 (modified wax from BYK-Chemie GmbH, Wesel, Germany), BYK®-3933 (modified polyacrylate, adsorbed on silicon dioxide from BYK-Chemie GmbH, Wesel, Germany), and the like.

The powder formulation for the primer coat can comprise a crosslinking agent, e.g., a hydroxyalkylamide (e.g., $(R^{N1})_2NC(O)\text{-Ak-}C(O)N(R^{N1})_2$, as described herein). In some embodiments, the powder formulation for the primer coat comprises a crosslinking agent (e.g., a hydroxyalkylamide) in a total amount of about 0.05 wt % to about 10 wt % of the formulation, e.g., about 0.1 wt % to about 10 wt %, about 1 wt % to about 10 wt %, about 2 wt % to about 10 wt %, about 3 wt % to about 10 wt %, about 4 wt % to about 10 wt %, about 5 wt % to about 10 wt %, about 1 wt % to about 5 wt %, about 2 wt % to about 5 wt %, about 3 wt % to about 5 wt %, about 4 wt % to about 5 wt %, about 0.05 wt % to about 10 wt %, about 0.05 wt % to about 5 wt %, about 0.05 wt % to about 4 wt %, about 0.05 wt % to about 3 wt %, about 0.05 wt % to about 2 wt %, or about 0.05 wt % to about 1 wt % of the formulation. In some embodiments, the isocyanate comprises an NCO content of about 10 wt. % to about 30 wt. %. For example and without limitation, a person of ordinary skill in the art will appreciate that a crosslinking agent may act as both a crosslinking agent and a curing agent, depending on the reactive group present on the crosslinking agent and the functional groups present on the resin. Accordingly, in some non-limiting embodiments, the powder formulation for the primer coat can comprise a crosslinking agent that acts as both a crosslinking agent and a curing agent.

In some embodiments, the powder formulation for the primer coat comprises one or more crosslinking agents (e.g., any described herein) in a total amount of at least about 0.05 wt % (e.g., at least about 0.1 wt %, at least about 0.2 wt %, at least about 0.3 wt %, at least about 0.4 wt %, at least about 0.5 wt %, at least about 1.0 wt %, at least about 1.5 wt %, at least about 2 wt %, at least about 3 wt %, at least about 4 wt %, at least about 5 wt %, at least about 6 wt %, at least about 7 wt %, at least about 8 wt %, at least about 9 wt %, or at least about 10 wt %) and/or at most about 20 wt % (e.g., at most about 15 wt %, at most about 10 wt %, at most about 9 wt %, at most about 8 wt %, at most about 7 wt %, at most about 6 wt %, or at most about 5 wt %) of the formulation.

For example and without limitation, a person of ordinary skill in the art will appreciate that a crosslinking agent can be used to minimize the amount of unreacted resin or curing agent in the powder formulation for the primer coat. Accordingly, the person of ordinary skill in the art will understand how to select a suitable amount of crosslinking agent to minimize the amount of unreacted resin or curing agent in the powder formulation for the primer coat.

Non-limiting examples for crosslinking agents include PRIMID® XL-552 (a hydroxyalkylamide from Ems-Chemie, Domat/EMS, Switzerland), PRIMID® SF-4510 (a hydroxy alkylamide from Ems-Chemie, Domat/EMS, Switzerland), and the like.

The powder formulation for the primer coat can comprise a rheology modifier. In some embodiments, the powder formulation for the primer coat comprises hydroxyalkylamide as a rheology modifier. In such instances, the powder formulation for the primer coat comprises hydroxyalkylamide in a total amount of about 0.05 wt % to about 5 wt % of the formulation, e.g., about 0.1 wt % to about 10 wt %, about 1 wt % to about 10 wt %, about 2.5 wt % to about 10 wt %, about 5 wt % to about 10 wt %, about 7.5 wt % to about 10 wt %, about 0.05 wt % to about 7.5 wt %, about 0.05 wt % to about 5 wt %, about 0.05 wt % to about 2.5 wt %, or about 0.05 wt % to about 1 wt % of the formulation. For example and without limitation, a person of ordinary skill in the art will understand how to select a suitable amount of hydroxyalkylamide to be suitable as a rheology modifier.

In some embodiments, the powder formulation for the primer coat comprises a rheology modifier, e.g., silica (e.g., silane treated silica), clay (e.g., inorganic clay), talc, or other particles. In some embodiments, the powder formulation for the primer coat comprises a rheology modifier (e.g., silica) in a total amount of about 0.05 wt % to about 5 wt % of the formulation, e.g., about 0.1 wt % to about 10 wt %, about 1 wt % to about 10 wt %, about 2.5 wt % to about 10 wt %, about 5 wt % to about 10 wt %, about 7.5 wt % to about 10 wt %, about 0.05 wt % to about 7.5 wt %, about 0.05 wt % to about 5 wt %, about 0.05 wt % to about 2.5 wt %, or about 0.05 wt % to about 1 wt % of the formulation.

In some embodiments, the powder formulation for the primer coat comprises one or more rheology modifiers (e.g., any described herein) in a total amount of at least about 0.05 wt % (e.g., at least about 0.1 wt %, at least about 0.2 wt %, at least about 0.5 wt %, at least about 1 wt %, at least about 1.5 wt %, or at least about 2 wt %) and/or at most about 10 wt % (e.g., at most about 7 wt %, at most about 5 wt %, at most about 4.5 wt %, at most about 4 wt %, at most about 3.5 wt %, at most about 3 wt %, at most about 2.5 wt %, at most about 2 wt %, or at most about 1.5 wt %) of the formulation.

Non-limiting examples for rheology modifiers include SIPERNAT® 22 S (fine particle silica from Evonik Corp., Parsipanny, NJ), RESIFLOW® PH-241 (mixture of acrylic polymer and silica from Estron Chemicals, Inc., Calvert City, KY), hydroxyalkylamide, and the like.

In some embodiments, a powder formulation for a primer coat comprises about 20 wt % to about 70 wt % of an epoxy resin (e.g., KD-242G); about 0.1 wt % to about 30 wt % of a curing agent (e.g., a resin, e.g., carboxyl functional polyester resin, acid functional acrylic resin) or about 0.1 wt % to about 6 wt % of a curing agent (e.g., dicyandiamide); about 0.05 wt % to about 5 wt % of a degassing agent (e.g., benzoin coated polyamide); about 1 wt % to about 80 wt % of a corrosion resistance filler (e.g., zinc dust and/or barium sulfate); and about 0.05 wt % to about 5 wt % of a transfer efficiency additive (e.g., barium titanate).

In some embodiments, the powder formulation for a primer coat includes one or more components described herein in a powder formulation for a topcoat, as well as amounts of such components described herein in a powder formulation for a topcoat. Non-limiting components in a powder formulation for a primer coat can include, e.g., one or more of the following: a resin (e.g., any described herein, such as a carboxyl functional polyester resin, a hydroxyl functional polyester resin, or a combination thereof), a curing agent (e.g., any described herein, such as an epoxy curing agent), a degassing agent (e.g., any described herein, such as benzoin, benzoin coated polyamide, polyamide, a derivative form thereof, or a combination thereof), a scratch resistance agent (e.g., any described herein, such as polyethylene, wax, polysiloxane, metal oxide, or a combination thereof), a transfer efficiency additive (e.g., any described herein, such as a ceramic), a phase-transfer catalyst (e.g., any described herein, such as an ammonium salt or a phosphonium salt), a wetting agent (e.g., any described herein, such as wax or a modified wax), a flow modifier (e.g., any described herein, such as an acrylic polymer), an antioxidant (e.g., any described herein, such as a phenolic ester, an organophosphorous compound, or a combination thereof), a pigment (e.g., any described herein, such as a conductive pigment, a non-conductive pigment, carbon black, titanium dioxide, or a combination thereof), a matting agent (e.g., any described herein, such as an acrylic resin), a crosslinking agent (e.g., any described herein, such as an isocyanate), a corrosion resistance filler (e.g., any described herein), an adhesion promoting agent (e.g., any described herein, such as a hybrid carboxy-functional hydroxy-functional metal organic compound), a rheology modifier (e.g., any described herein, such as silica), or a combination of any of these.

In some embodiments, the powder formulation for a primer coat is free of one or more components described herein, e.g., a resin, a curing agent, a degassing agent, a corrosion resistance filler, a scratch resistance agent, a transfer efficiency additive, a flow modifier, a pigment, a phase-transfer catalyst, an antistatic agent, a conductive agent, a wetting agent, an antioxidant, a pigment, a matting agent, a crosslinking agent, an adhesion promoting agent, a rheology modifier, or a combination of any of these. For example and without limitation, the powder formulation for a primer coat can be free of a carboxyl-functional resin. For example and without limitation, the powder formulation for a primer coat can be free of a hydroxyl-functional resin. For example and without limitation, the powder formulation for a primer coat can be free of a bisphenol A (BPA)-containing resin. For example and without limitation, the powder formulation for a primer coat can be free of polyester resin (e.g., a carboxyl functional polyester resin, a hydroxyl functional polyester resin, an acid functional polyester resin, or combinations thereof). For example and without limitation, the powder formulation for a primer coat can be free of an epoxy resin (e.g., a carboxyl functional epoxy resin, a hydroxyl functional epoxy resin, an acid functional epoxy resin, or combinations thereof). For example and without limitation, the powder formulation for a primer coat can be free of an acrylic resin (e.g., a carboxyl functional acrylic resin, a hydroxyl functional acrylic resin, an acid functional acrylic resin, or combinations thereof). For example and without limitation, the powder formulation for a primer coat can be free of an acid-containing curing agent. For example and without limitation, the powder formulation for a primer coat can be free of a diacid-containing curing agent. For example and without limitation, the powder formulation for a primer coat can be free of a dicyandiamide-containing curing agent. For example and without limitation, the powder formulation for a primer coat can be free of a cyanamide-containing curing agent. For example and without limitation, the powder formulation for a primer coat can be free of a diamide-containing curing agent. For example and without limitation, the powder formulation for a primer coat can be free of a hydroxyalkylamide-containing curing agent. For example and without limitation, the powder formulation for a primer coat can be free of a benzoin-containing degassing agent. For example and without limitation, the powder formulation for a primer coat can be free of a corrosion resistance filler. For example and without limitation, the powder formulation for a primer coat can be free of a scratch resistance agent. For example and without limitation, the powder formulation for a primer coat can be free of a transfer efficiency additive. For example and without limitation, the powder formulation for a primer coat can be free of an acrylic acid- or acrylate-containing flow modifier. For example and without limitation, the powder formulation for a primer coat can be free of a conductive pigment. For example and without limitation, the powder formulation for a primer coat can be free of a lead-containing pigment. For example and without limitation, the powder formulation for a primer coat can be free of a phase-transfer catalyst. For example and without limitation, the powder formulation for a primer coat can be free of an ammonium-containing phase-transfer catalyst. For example and without limitation, the powder formulation for a primer coat can be free of a phosphonium-containing phase-transfer catalyst. For example and without limitation, the powder formulation for a primer coat can be free of an antistatic agent. For example and without limitation, the powder formulation for a primer coat can be free of a conductive agent. For example and without limitation, the powder formulation for a primer coat can be free of a wetting agent. For example and without limitation, the powder formulation for a primer coat can be free of an antioxidant. For example and without limitation, the powder formulation for a primer coat can be free of a pigment. For example and without limitation, the powder formulation for a primer coat can be free of a conductive pigment. For example and without limitation, the powder formulation for a primer coat can be free of a lead-containing pigment. For example and without limitation, the powder formulation for a primer coat can be free of a matting agent. For example and without limitation, the powder formulation for a primer coat can be free of a crosslinking agent. For example and without limitation, the powder formulation for a primer coat can be free of a hydroxyalkylamide-containing crosslinking agent. For example and without limitation, the powder formulation for a primer coat can be free of an adhesion promoting agent. For example and without limitation, the powder formulation for a primer coat can be free of a rheology modifier.

For any component herein, the component can be provided as a powder, particle, granule, or a free flowing form. In some embodiments, the component can be provided as being adsorbed on a surface of a solid carrier (e.g., a particle such as a microparticle, a granule, a bead such as a microbead, a pellet, and the like).

Further Additives

The powder formulations herein (e.g., a powder formulation for a topcoat or primer coat) can include further additives. Non-limiting examples of additives include one or more of the following: fillers, curing catalysts, rheology modifiers, surfactants (e.g., nonionic, anionic, cationic, or zwitterionic surfactants), and the like.

In some embodiments, the additive can include a filler. Non-limiting examples of fillers include aluminum flakes, aluminum oxide, aluminum silicate, amphibole, barium sulfate, calcium carbonate, calcium feldspar, calcium metasilicate, ceramic micro spheres, chlorite, cristobalite, diatomaceous earth, feldspar, glass powder, glass beads, ground pumice, kaolin (including metakaolin), kieselguhr, magnesium aluminum silicate, magnesium hydroxide, magnesium silicate, mica, perlite, pyrophyllite, quartz, silica, talcum, titanium dioxide, wollastonite, zinc oxide, and the like, as well as combinations thereof and derivatives thereof (e.g., hydrated forms). The filler can have any useful shape (e.g., acicular, cubical, granular, lamellar, spherical, tabular, and the like) or size (e.g., an average particle size of 0.5 microns to 50 microns).

In some embodiments, the powder formulation comprises one or more fillers (e.g., any described herein) in a total amount of at least about 0.05 wt % (e.g., at least about 0.1 wt %, at least about 0.2 wt %, at least about 0.3 wt %, at least about 0.4 wt %, at least about 0.5 wt %, at least about 1.0 wt %, at least about 1.5 wt %, at least about 2 wt %, at least about 3 wt %, at least about 4 wt %, at least about 5 wt %, at least about 6 wt %, at least about 7 wt %, at least about 8 wt %, at least about 9 wt %, or at least about 10 wt %) and/or at most about 50 wt % (e.g., at most about 40 wt %, at most about 30 wt %, at most about 20 wt %, at most about 15 wt %, at most about 10 wt %, at most about 9 wt %, at most about 8 wt %, at most about 7 wt %, at most about 6 wt %, or at most about 5 wt %) of the formulation.

The powder formulation (e.g., for the topcoat and/or the primer) can comprise one or more curing catalysts, e.g., metal carboxylates (e.g., bismuth carboxylates such as bismuth octoate, stannous carboxylates such as stannous octoate, zinc carboxylates such as zinc octoate or zinc acetate, including those having other metals or other carboxylates, as well as a combination of any of these), ammonium compounds (e.g., dodecyltrimethylammonium bromide (DTMAB), benzyltrimethylammonium bromide, or any others described herein, such as an ammonium salt), phosphonium compounds (e.g., ethyl triphenyl phosphonium bromide, or any others described herein, such as a phosphonium salt), Lewis acids (e.g., boron trifluoride, trimethoxy boroxine, or a combination of any of these; or $B(R^{B1})_3$, wherein each $R^{B1}$ is, independently, hydrogen (H), halo (e.g., F, Cl, Br, or I), hydroxyl (e.g., OH), an optionally substituted $C_{1-18}$ hydrocarbyl group (e.g., alkyl, haloalkyl, aryl, alkaryl, aralkyl, etc.), or an optionally substituted $C_{1-18}$ hydrocarbyloxy group (e.g., alkoxy, aryloxy, etc.)), tertiary amines (e.g., 1-ethylimidazole, 2-ethylimidazole, octyldimethylamine, N,N-dimethylbenzylamine, dodecyl dimethylbenzylamine, tetramethyl guanidine, choline chloride, or a combination of any of these; or $N(R^{N1})_3$, wherein each $R^{N1}$ is, independently, an optionally substituted $C_{1-18}$ hydrocarbyl group (e.g., alkyl, haloalkyl, aryl, alkaryl, aralkyl, etc.), an optionally substituted imino group (e.g., —$CN(R^{N2})N(R^{N2})_2$, each $R^{N2}$ is, independently, H or an optionally substituted $C_{1-18}$ hydrocarbyl group), or two $R^{N1}$, taken together with the N to which each is attached, form an optionally substituted heterocyclyl), imidazole-based compounds (e.g., 2-methyl imidazole, 2-ethylimidazole, 2-ethyl-4 (5)-methylimidazole, 2-phenylimidazole, and the like), or a combination of any of these.

Non-limiting hydrocarbyloxy groups includes-OR groups, in which R is an optionally substituted hydrocarbyl (e.g., any described herein). Non-limiting hydrocarbyloxy groups include alkoxy, alkenyloxy, alkynyloxy, aryloxy, alkaryloxy (e.g., —O—Ar-Ak, in which Ar is a multivalent aryl group and Ak is an alkyl group), aralkyloxy (e.g., —O-Ak-Ar, in which Ak is a multivalent alkyl group and Ar is an aryl group), and the like. The hydrocarbyloxy group can be substituted with one or more substituents (e.g., any described herein for hydrocarbyl).

In some embodiments, the powder formulation (e.g., for the topcoat and/or the primer) can comprise a curing catalyst (e.g., metal salts and chelates (e.g., bismuth octoate, stannous octoate, zinc octoate, zinc acetate, or a combination of any of these), ammonium and phosphonium compounds (e.g., dodecyltrimethylammonium bromide (DTMAB), benzyltrimethylammonium bromide, ethyl triphenyl phosphonium bromide, or a combination of any of these), lewis acids (e.g., boron trifluoride, trimethoxy boroxine, or a combination of any of these), tertiary amines (e.g., 1-ethylimidazole, 2-ethylimidazole, octyldimethylamine, N,N-dimethylbenzylamine, dodecyl dimethylbenzylamine, tetramethyl guanidine, or a combination of any of these), or a combination of any of these) in a total amount of about 0.05 wt % to about 5 wt % of the formulation, e.g., about 0.1 wt % to about 10 wt %, about 1 wt % to about 10 wt %, about 2.5 wt % to about 10 wt %, about 5 wt % to about 10 wt %, about 7.5 wt % to about 10 wt %, about 0.05 wt % to about 7.5 wt %, about 0.05 wt % to about 5 wt %, about 0.05 wt % to about 2.5 wt %, or about 0.05 wt % to about 1 wt % of the formulation.

In some embodiments, the powder formulation comprises one or more curing catalysts (e.g., any described herein) in a total amount of at least about 0.05 wt % (e.g., at least about 0.1 wt %, at least about 0.2 wt %, at least about 0.3 wt %, at least about 0.4 wt %, at least about 0.5 wt %, at least about 1.0 wt %, at least about 1.5 wt %, at least about 2 wt %, at least about 3 wt %, at least about 4 wt %, at least about 5 wt %, at least about 6 wt %, at least about 7 wt %, at least about 8 wt %, at least about 9 wt %, or at least about 10 wt %) and/or at most about 10 wt % (e.g., at most about 9 wt %, at most about 8 wt %, at most about 7 wt %, at most about 6 wt %, at most about 5 wt %, or at most about 3 wt %) of the formulation.

For any additive herein, the additive can be provided as a powder, particle, granule, or a free flowing form. In some embodiments, the additive can be provided as being adsorbed on a surface of a solid carrier (e.g., a particle such as a microparticle, a granule, a bead such as a microbead, and the like).

Powder Coating System

The present document also relates to a powder coating system including a first powder formulation for a primer coat and a second powder formulation for a topcoat. The first and second powder formulation can be any powder formulation described herein.

In some embodiments, the powder coating system comprises:
 a powder formulation for a topcoat comprising:
  about 40 wt % to about 90 wt % of a carboxyl functional polyester resin, a hydroxyl functional polyester resin, or both;
  about 0.1 wt % to about 10 wt % of a first curing agent;
  about 0.05 wt % to about 5 wt % of a degassing agent;
  about 0.1 wt % to about 5 wt % of a first flow modifier; and
  one or more of about 0.05 wt % to about 5 wt % of a scratch resistance agent, about 0.05 wt % to about 5 wt % of a first transfer efficiency additive, and about 0.05 wt % to about 5 wt % of a phase-transfer catalyst;
 a powder formulation for a primer coat comprising:
  about 20 wt % to about 70 wt % of an epoxy resin;
  about 0.1 wt % to about 30 wt % of a second curing agent;
  about 1 wt % to about 80 wt % of a corrosion resistance filler; and
  about 0.05 wt % to about 5 wt % of a second flow modifier.

In some embodiments, the powder coating system comprises:
a powder formulation for a topcoat comprising:
about 65 wt % to about 90 wt % of a carboxyl functional polyester resin, a hydroxyl functional polyester resin, or both;
about 0.1 wt % to about 10 wt % of a first curing agent;
about 0.05 wt % to about 5 wt % of a degassing agent;
about 0.5 wt % to about 3 wt % of a first flow modifier; and
one or more of about 0.05 wt % to about 1 wt % of a scratch resistance agent, about 0.05 wt % to about 1 wt % of a first transfer efficiency additive, and about 0.05 wt % to about 1 wt % of a phase-transfer catalyst;
a powder formulation for a primer coat comprising:
about 20 wt % to about 35 wt % of an epoxy resin;
about 0.1 wt % to about 3 wt % of a second curing agent;
about 45 wt % to about 75 wt % of a corrosion resistance filler; and
about 0.1 wt % to about 3 wt % of a second flow modifier.

In some embodiments, the powder formulation for the primer coat further comprises:
about 0.05 wt % to about 5 wt % of a second degassing agent, about 0.05 wt % to about 5 wt % of a second transfer efficiency additive, or both.

In some embodiments, the powder formulation for the primer coat further comprises:
about 0.05 wt % to about 1 wt % of a second degassing agent, about 0.05 wt % to about 1.5 wt % of a second transfer efficiency additive, or both.

Non-Limiting Characteristics

The powder formulations (e.g., for the topcoat and/or the primer coat) can be assessed for particle size, flow, scratch resistance, edge coverage, sealant coverage, and other characteristics using methods known in the art or described herein. See Examples below.

In some embodiments, the powder formulation (e.g., for the topcoat) has an average particle size of about 30 to about 80 microns, e.g., about 30 to about 75 microns, about 30 to about 70 microns, about 30 to about 65 microns, about 30 to about 60 microns, about 30 to about 55 microns, about 30 to about 50 microns, about 30 to about 45 microns, about 30 to about 40 microns, about 35 to about 80 microns, about 35 to about 75 microns, about 35 to about 70 microns, about 35 to about 65 microns, about 35 to about 60 microns, about 35 to about 55 microns, about 35 to about 50 microns, about 35 to about 45 microns, about 35 to about 40 microns, about 40 to about 80 microns, about 40 to about 75 microns, about 40 to about 70 microns, about 40 to about 65 microns, about 40 to about 60 microns, about 40 to about 55 microns, about 40 to about 50 microns, about 40 to about 45 microns, about 45 to about 80 microns, about 45 to about 75 microns, about 45 to about 70 microns, about 45 to about 65 microns, about 45 to about 60 microns, about 45 to about 55 microns, about 50 to about 80 microns, about 50 to about 75 microns, about 50 to about 70 microns, about 50 to about 65 microns, about 55 to about 80 microns, about 55 to about 75 microns, about 55 to about 70 microns, about 55 to about 65 microns, about 55 to about 60 microns, about 60 to about 80 microns, about 60 to about 75 microns, or about 60 to about 70 microns.

In some embodiments, the powder formulation (e.g., for the primer coat) has an average particle size of about 20 to about 50 microns, e.g., about 20 to about 40 microns, about 20 to about 30 microns, about 25 to about 50 microns, about 25 to about 40 microns, or about 30 to about 50 microns.

Flow may be determined in any manner, such as described herein. In some embodiments, flow may be determined in accordance with ASTM test method D4242, which provides flow characteristics of a fused thermosetting coating powder (e.g., as a pellet) down an inclined plane (e.g., inclined at 65±1° to the horizontal) at a recommended cure temperature for a testing time period. In some embodiments, inclined plane is inclined at 45° to the horizontal. The testing time period can include any useful time period to obtain a total length of flow for the fused thermosetting coating powder down the included plane. In some embodiments, the time period is at least about 1 minute (e.g., at least about 5 minutes or at least about 10 minutes) to at most about 15 minutes. In some embodiments, the recommended cure temperature can be any temperature to sufficiently chemically crosslink a powder formulation to provide one or more coating properties. Non-limiting coating properties can include any described herein (e.g., outgassing, edge coverage, etc.). Non-limiting cure temperatures include from about 340° F. to about 400° F. In some embodiments, flow is determined for a fused thermosetting coating powder (e.g., as a pellet having a dimension of about 12.5±0.05 mm in diameter and about 6.5±0.2 mm in thickness) down an inclined plane (e.g., inclined at 65±1° to the horizontal) at a recommended cure temperature (e.g., 340° F.) for a testing time period (e.g., at least 10 minutes, such as about 10 minutes or about 15 minutes). In some embodiments, flow is determined for a fused thermosetting coating powder (e.g., as a pellet having a dimension of about 12.5±0.05 mm in diameter and about 6.5±0.2 mm in thickness) down an inclined plane (e.g., inclined at 65±1° to the horizontal) at a recommended cure temperature (e.g., 400° F.) for a testing time period (e.g., at least 10 minutes, such as about 10 minutes or about 15 minutes).

In some embodiments, the powder formulation for the topcoat has a flow of about 10 to about 95 mm at 340° F., e.g., about 20 to about 95 mm, about 30 to about 95 mm, about 40 to about 95 mm, about 50 to about 95 mm, about 60 to about 95 mm, about 70 to about 95 mm, about 80 to about 95 mm, about 90 to about 95 mm, about 10 to about 90 mm, about 10 to about 80 mm, about 10 to about 70 mm, about 10 to about 60 mm, about 10 to about 50 mm, about 10 to about 40 mm, about 10 to about 30 mm, about 10 to about 20 mm, or about 10 to about 15 mm at 340° F. (e.g., down an inclined plane that is inclined at 65±1° to the horizontal and for a testing time period that is at least 10 minutes, such as about 10 minutes or about 15 minutes). In some embodiments, the powder formulation for the topcoat has a flow of about 13 mm at 340° F. (e.g., down an inclined plane that is inclined at 65±1° to the horizontal and for a testing time period that is at least 10 minutes, such as about 10 minutes or about 15 minutes).

In some embodiments, the powder formulation for the topcoat has a flow of at least about 10 mm (e.g., at least about 10 mm, at least about 15 mm, at least about 20 mm, at least about 25 mm, at least about 30 mm, at least about 35 mm, at least about 40 mm, at least about 45 mm, at least about 50 mm, at least about 55 mm, at least about 60 mm, at least about 65 mm, at least about 70 mm, or at least about 75 mm) to at most about 95 mm (e.g., at most about 45 mm, at most about 50 mm, at most about 55 mm, at most about 60 mm, at most about 65 mm, at most about 70 mm, at most about 75 mm, at most about 80 mm, or at most about 85 mm) at 340° F. (e.g., down an inclined plane that is inclined at 65±1° to the horizontal and for a testing time period that is at least 10 minutes, such as about 10) minutes or about 15 minutes).

In some embodiments, the powder formulation for the primer coat has a flow of about 10 to about 80 mm at 340° F., e.g., about 15 to about 80 mm, about 20 to about 80 mm, about 25 to about 80) mm, about 30) to about 80 mm, about 35 to about 80 mm, about 40) to about 80) mm, about 45 to about 80) mm, about 50 to about 80 mm, about 55 to about 80) mm, about 60) to about 80 mm, about 65 to about 80 mm, about 70) to about 80 mm, about 75 to about 80) mm, about 15 to about 70) mm, about 20 to about 70 mm, about 25 to about 70) mm, about 30 to about 70) mm, about 35 to about 70 mm, about 40) to about 70 mm, about 45 to about 70) mm, about 50) to about 70 mm, about 55 to about 70 mm, about 60) to about 70) mm, about 65 to about 70 mm, about 15 to about 60 mm, about 20 to about 60) mm, about 25 to about 60 mm, about 30) to about 60 mm, about 35 to about 60 mm, about 40) to about 60 mm, about 45 to about 60 mm, about 50) to about 60 mm, about 55 to about 60 mm, about 10 to about 65 mm, about 10) to about 60 mm, about 10 to about 50 mm, about 10 to about 45 mm, about 10 to about 40) mm, about 10 to about 35 mm, or about 10 to about 30 mm at 340° F. In some embodiments, the powder formulation for the primer coat has a flow of about 50 to about 80) mm at 340° F. (e.g., down an inclined plane that is inclined at 65±1° to the horizontal and for a testing time period that is at least 10 minutes, such as about 10) minutes or about 15 minutes).

In some embodiments, the powder formulation for the primer coat has a flow of at least about 10 mm (e.g., at least about 15 mm, at least about 20 mm, at least about 25 mm, at least about 30 mm, at least about 35 mm, at least about 40 mm, at least about 45 mm, at least about 50 mm, at least about 55 mm, or at least about 60 mm) to at most about 80 mm (e.g., at most about 45 mm, at most about 50 mm, at most about 55 mm, at most about 60 mm, at most about 65 mm, at most about 70 mm, or at most about 75 mm) at 340° F. (e.g., down an inclined plane that is inclined at 65±1° to the horizontal and for a testing time period that is at least 10 minutes, such as about 10 minutes or about 15 minutes).

Flow may be determined at other temperatures. In some embodiments, the powder formulation for the topcoat has a flow of at least about 30 mm (e.g., at least about 35 mm, at least about 40 mm, at least about 45 mm, at least about 50 mm, at least about 55 mm, at least about 60) mm, or at least about 65 mm, at least about 70 mm, at least about 75 mm, at least about 80) mm, or at least about 85 mm) to at most about 100 mm (e.g., at most about 45 mm, at most about 50 mm, at most about 55 mm, at most about 60 mm, at most about 65 mm, at most about 70 mm, at most about 75 mm, at most about 80 mm, at most about 85 mm, at most about 90 mm, or at most about 95 mm) at 400° F. (e.g., down an inclined plane that is inclined at 65±1° to the horizontal and for a testing time period that is at least 10 minutes, such as about 10 minutes or about 15 minutes). In some embodiments, the powder formulation for the primer coat has a flow of at least about 10 mm (e.g., at least about 15 mm, at least about 20 mm, at least about 25 mm, at least about 30 mm, at least about 35 mm, at least about 40 mm, at least about 45 mm, at least about 50 mm, at least about 55 mm, at least about 60 mm, at least about 65 mm, or at least about 70 mm) to at most about 90 mm (e.g., at most about 45 mm, at most about 50 mm, at most about 55 mm, at most about 60 mm, at most about 65 mm, at most about 70 mm, at most about 75 mm, at most about 80 mm, or at most about 85 mm) at 400° F. (e.g., down an inclined plane that is inclined at 65±1° to the horizontal and for a testing time period that is at least 10 minutes, such as about 10 minutes or about 15 minutes).

Scratch resistance (also referred to as abrasion resistance) may be determined in any manner, such as described herein. In some embodiments, scratch resistance can refer to the scratch resistance of the topcoat and primer, or of the topcoat without the primer. In some embodiments, scratch resistance may be determined in accordance with ASTM test method D4060, which provides abrasion resistance by the Taber Abraser, or ASTM test method D7187, which provides scratch/mar resistance by nanoscratching. In some embodiments, the powder formulation for the topcoat is characterized by a scratch resistance of about 15 to about 45 mg loss of weight, e.g., about 20 to about 45 mg, about 25 to about 45 mg, about 30 to about 45 mg, about 35 to about 45 mg, about 40 to about 45 mg, about 15 to about 40 mg, about 15 to about 35 mg, about 15 to about 30 mg, about 15 to about 25 mg, or about 15 to about 20 mg loss of weight.

In some embodiments, the cured coating has a scratch resistance of about 0.5 to about 5 N, e.g., about 1 to about 5 N, about 1.5 to about 5 N, about 2 to about 5 N, about 2.5 to about 5 N, about 3 to about 5 N, about 3.5 to about 5 N, about 4 to about 5 N, about 4.5 to about 5 N, about 0.5 to about 4.5 N, about 0.5 to about 4 N, about 0.5 to about 3.5 N, about 0.5 to about 3 N, about 0.5 to about 2.5 N, about 0.5 to about 2 N, or about 0.5 to about 1 N. In some embodiments, the cured coating has a scratch resistance of at least about 0.5 N, at least about 1 N, at least about 1.5 N, at least about 2 N, at least about 2.5 N, at least about 3 N, or more.

In some embodiments, a surface of a substrate can include a sealant disposed thereon. The sealant, itself, may be characterized by a surface and an edge. The extent of coverage for any edge or surface of the sealant can be determined in any useful manner. Coverage can be determined for the sealant itself (e.g., an edge and/or surface of the sealant) or a substrate having a sealant disposed thereon (e.g., a substrate having a certain amount of sealant, in which coverage can be determined for a portion of the substrate including at least a portion of the sealant, a portion of the substrate including the entirety of the sealant, or the entirety of the substrate).

In some embodiments, a sealant coverage can be determined by a thickness (e.g., an average or mean thickness, which can optionally be measured in a z-direction that is generally orthogonal to a surface of the substrate) of a powder coating (e.g., after curing the powder formulation on a surface including a sealant). The powder coating may be disposed on a surface of the substrate, a surface of the sealant, and/or an edge of the sealant; and thickness can be measured on any of these areas. In some embodiments, the thickness can be determined for the powder formulation (e.g., before curing the powder formulation on a surface including the sealant).

The thickness of the powder formulation or coating on the edge of the sealant and/or on the sealant itself, may be determined in any manner, such as described herein. In some embodiments, the powder formulation for the primer coat is characterized by a sealant coverage of about 12.5 to about 125 microns in thickness (e.g., an average or mean thickness, such as for a primer coat provided as a single application of the powder formulation). In some embodiments, the powder formulation for the topcoat is characterized by a sealant coverage of about 25 to about 250 microns in thickness (e.g., an average or mean thickness, such as for a topcoat provided as a single application of the powder formulation). In some embodiments, the powder formulation for the topcoat in combination with the primer coat is characterized by a sealant coverage of about 12.5 to about 375 microns in thickness (e.g., an average or mean thickness, such as for a primer coat and a topcoat, in which each is provided as a single application of the respective powder formulation).

Any measurements herein (e.g., for sealant coverage, feature coverage, or any other measurement herein) can be multiplied to provide values for a plurality of coatings. As would have been understood by a skilled artisan, any values described herein for a single coating or a single application of a powdered formulation can be multiplied by the final number of coatings of final applications that are provided to a substrate. As would have been also understood by a skilled artisan, such values (and ranges) may be modified with any loss or reduction factors that may be implicated when forming a plurality of coatings.

In some embodiments, a sealant coverage can be determined by a percentage coverage of a powder coating (e.g., after curing the powder formulation on a surface including a sealant). The powder coating may be disposed on a surface of the substrate, a surface of the sealant, and/or an edge of the sealant; and percentage coverage can be measured on any of these areas. For example and without limitation, a percentage coverage can include a percentage of a surface area (e.g., an average or mean percentage coverage, which can optionally be measured in an x-y plane this is generally parallel to a surface of the substrate) that is covered by the powder coating of a certain minimum thickness (e.g., at least about 10, 11, 12, 13, 14, 15, 20, 25, 30 µm, or greater) or a certain range of thickness (e.g., from about 10 to 250 µm or other ranges described herein). The surface area (or a portion of the surface area) can include an edge and/or a surface provided by the sealant. In some embodiments, a percent coverage can be determined for the powder formulation (e.g., before curing the powder formulation on a surface including the sealant). In some embodiments, the powder formulation (e.g., for the topcoat or primer coat) is characterized by a percentage coverage of at least 60%, at least 65%, at least 70%, at least 75%, at least 80%, at least 85%, at least 90%, at least 95%, at least 99%, or more. In some embodiments, sealant coverage can determinations of both thickness and percentage coverage.

Edge coverage may be determined in any manner, such as described herein. In some embodiments, edge coverage may be determined in accordance with ASTM test method D2967-96 or an Edge Coverage Test described herein, which provides the degree of edge coverage of powder coatings. The term "Edge Coverage Test" refers to a modified version of ASTM test method D2967-96 in which flat 3×6 inch steel and aluminum panels (e.g., Q-Panels manufactured by Q-Lab) are used as the substrate. In some embodiments, such edge coverage (e.g., as determined by average thickness of the powder coating at an edge of the coating, such as at a sharp edge measured at a certain angle to the flat surfaces) can be compared to face coverage (e.g., as determined by average thickness of the powder coating on a generally flat or planar surface). In some embodiments, the sharp edge can include a 90°, 60°, 45°, 30°, and the like. Measurements for thickness can be at any useful angle to a flat surface (e.g., at an angle of 30°, 45°, 60°, 90°, and the like). In some embodiments, the powder formulation (e.g., for the topcoat or primer coat) is characterized by an edge coverage of at least 12%, at least 13%, at least 14%, at least 15%, at least 16%, at least 17%, at least 18%, at least 19%, at least 20%, at least 21%, at least 22%, at least 23%, at least 24%, at least 25%, or more.

Corner coverage may be determined in any manner, such as described herein. In some embodiments, corner coverage may be determined in accordance with ASTM test method D2967-07, which provides the degree of corner coverage of powder coatings. In some embodiments, such corner coverage (e.g., as determined by average thickness of the powder coating at a corner, such as at a sharp corner measured at a certain angle to the flat surfaces) can be compared to face coverage (e.g., as determined by average thickness of the powder coating on a generally flat or planar surface). In some embodiments, the sharp corner can include a corner at 90°, 60°, 45°, 30°, and the like. Measurements for thickness can be at any useful angle to a flat surface (e.g., at an angle of 30°, 45°, 60°, 90°, and the like). In some embodiments, the powder formulation (e.g., for the topcoat or primer coat) is characterized by a corner coverage of at least 12%, at least 13%, at least 14%, at least 15%, at least 16%, at least 17%, at least 18%, at least 19%, at least 20%, at least 21%, at least 22%, at least 23%, at least 24%, at least 25%, or more. In some embodiments, a surface of a substrate can include a weld, a seam, or other feature disposed thereon. The feature, itself, may be characterized by a surface and an edge. The extent of coverage for any edge or surface of the feature can be determined in any useful manner. Coverage can be determined for the feature itself (e.g., an edge and/or surface of the feature) or a substrate having a feature disposed thereon (e.g., a substrate having a certain number or types of features, in which coverage can be determined for a portion of the substrate including at least a portion of the feature, a portion of the substrate including the entirety of the feature, or the entirety of the substrate).

As discussed herein regarding sealant coverage, coverage of a feature (e.g., weld coverage, seam coverage, and the like) can be determined by a thickness (e.g., an average or mean thickness, which can optionally be measured in a z-direction that is generally orthogonal to a surface of the substrate) and/or by percent coverage of a powder coating (e.g., after curing the powder formulation on a surface including a feature). The powder coating may be disposed on a surface of the substrate, a surface of the feature, and/or an edge of the feature. Thickness and/or percent coverage can be measured on any of these areas. Thickness may be determined in any manner, such as described herein. In some embodiments, thickness may be determined in accordance with ASTM test method D4138. In some embodiments, the thickness and/or percent coverage can be determined for the powder formulation (e.g., before curing the powder formulation on a surface including the feature).

Weld coverage, for a thickness of the powder formulation or coating on the weld, may be determined in any manner, such as described herein. Weld coverage can apply to a weld in an absence or a presence of a sealant. In some embodiments, the powder formulation for the primer coat is characterized by a weld coverage of about 12.5 to about 125 microns in thickness (e.g., an average or mean thickness, such as for a primer coat provided as a single application of the powder formulation). In some embodiments, the powder formulation for the topcoat is characterized by a weld coverage of about 25 to about 250 microns in thickness (e.g., an average or mean thickness, such as for a topcoat provided as a single application of the powder formulation). In some embodiments, the powder formulation for the topcoat in combination with the primer coat is characterized by a weld coverage of about 12.5 to about 375 microns in thickness (e.g., an average or mean thickness, such as for a primer coat and a topcoat, in which each is provided as a single application of the respective powder formulation). Seam coverage, for a thickness of the powder formulation or coating on the seam, may be determined in any manner, such as described herein. Seam coverage can apply to a seam in an absence or a presence of a sealant. In some embodiments, the powder formulation for the primer coat is characterized by a seam coverage of about 12.5 to about 125 microns in thickness (e.g., an average or mean thickness, such as for a primer coat provided as a single application of the powder formulation). In some embodiments, the powder formulation for the topcoat is characterized by a seam coverage of about 25 to about 250 microns in thickness (e.g., an average or mean thickness, such as for a topcoat provided as a single application of the powder formulation). In some embodiments, the powder formulation for the topcoat in combination with the primer coat is characterized by a seam coverage of about 12.5 to about 375 microns in thickness (e.g., an average or mean thickness, such as for a primer coat and a topcoat, in which each is provided as a single application of the respective powder formulation).

In some embodiments, feature coverage (e.g., weld coverage, seam coverage, or other feature coverage) is determined for a percent coverage of the powder formulation or coating on the feature. For example and without limitation, a percentage coverage can include a percentage of a surface area (e.g., an average or mean percentage coverage, which can optionally be measured in an x-y plane this is generally parallel to a surface of the substrate) that is covered by the powder coating of a certain minimum thickness (e.g., at least about 2, 3, 4, 5, 6, 7, 8, 9, 10, 11, 12, 13, 14, 15, 20 µm, or greater) or a certain range of thickness (e.g., from about 10 to 250 µm or other ranges described herein). The surface area (or a portion of the surface area) can include an edge and/or a surface provided by the feature (e.g., an edge and/or a surface provided by a weld, seam, or other feature). In some embodiments, a percent coverage can be determined for the powder formulation (e.g., before curing the powder formulation on a surface including the feature). In some embodiments, the powder formulation (e.g., for the topcoat or primer coat) is characterized by a percentage coverage of at least 60%, at least 65%, at least 70%, at least 75%, at least 80%, at least 85%, at least 90%, at least 95%, at least 99%, or more. In some embodiments, feature coverage can determinations of both thickness and percentage coverage.

Transfer efficiency, which is the ratio of the amount of powder deposited on the substrate to the amount of powder applied to the substrate, may be determined in any manner, such as described herein. In some embodiments, the amount can be determined as a weight of the powder, and the ratio can be expressed as a percentage. In some embodiments, the percent transfer efficiency can be calculated using the following formula:

$$\text{Transfer Efficency (\%)} = \left(\frac{\text{weight of substrate with powder} - \text{weight of substrate}}{\text{weight of powder applied to substrate}}\right) \times 100$$

In some embodiments, transfer efficiency may be determined in accordance with ASTM test method D5286-20, which provides transfer efficiency under general production conditions for spray application of paints, or with ASTM test method D5066, which provides transfer efficiency under production conditions for spray application of automotive paints using a weight method. In some embodiments, the powder formulation (e.g., for the topcoat or the primer coat) is characterized by a transfer efficiency of at least 60%, at least 65%, at least 70%, at least 75%, at least 80%, at least 85%, at least 90%, at least 95%, at least 96%, at least 97%, at least 98%, at least 99%, or more.

In some embodiments, transfer efficiency may be supplemented by comparing measurements regarding powder that applied to the substrate and that ultimately is provided within the cured coating. Without wishing to be limited by mechanism, the amount of powder deposited on a substrate may change during the deposition period. For example and without limitation, powder may fall away from the surface of the substrate during extended deposition periods. Thus, in some embodiments, thickness of the powder formulation (prior to curing and after deposition) may be compared to thickness of the cured coating. In other embodiments, an amount (or weight) of the powder formulation (prior to curing and after deposition) may be compared to an amount (or weight) of the cured coating.

In some embodiments, transfer efficiency for a powder formulation (e.g., powder formulation for a topcoat or a primer coat) applied using a spray application (e.g., a spray gun) may be determined using one or more of the following settings:

a distance from the tip of the spray applicator (e.g., spray gun) to the substrate of about 6 to about 12 inches (e.g., about 6 inches, about 7 inches, about 8 inches, about 9 inches, about 10 inches, about 11 inches, or about 12 inches);
  a voltage of about 40 to about 90 kV (e.g., about 40 kV, about 50 kV, about 60 kV, about 70 KV, about 80 kV, or about 90 kV); and
  an amperage of about 5 to about 15 µA (e.g., about 5 µA, about 6 µA, about 7 µA, about 8 µA, about 9 µA, about 10 µA, about 11 µA, about 12 µA, about 13 µA, about 14 µA, or about 15 µA).

In some embodiments, transfer efficiency for a powder formulation a primer coat applied using a spray application (e.g., a spray gun) may be determined using one or more of the following settings:

a distance from the tip of the spray applicator (e.g., spray gun) to the substrate of about 8 inches;
  a voltage of about 50 kV; and
  an amperage of about 10 µA.

In some embodiments, transfer efficiency for a powder formulation a topcoat applied using a spray application (e.g., a spray gun) may be determined using one or more of the following settings:

a distance from the tip of the spray applicator (e.g., spray gun) to the substrate of about 8 inches;
  a voltage of about 80 kV; and
  an amperage of about 10 µA.

Thickness of the applied powder formulation in the pre-cured state may be determined in any manner, such as described herein. In some embodiments, thickness of the applied powder formulation in the pre-cured state may be determined in accordance with ASTM test method D7378-16, which predicts cured thickness based on measurement of thickness of the applied powder. In some embodiments, the applied powder formulation in the pre-cured state (e.g., for the topcoat, the primer coat, or both) is characterized by a thickness of about 25 to about 250 microns.

In some embodiments, the thickness of the applied powder formulation in the pre-cured state remains substantially similar over a given period of time, e.g., a lag in production when the applied powder formulation is waiting to be cured. In some embodiments, the thickness of the applied powder formulation (e.g., for the topcoat, the primer coat, or both) in the pre-cured state remains substantially similar for about 10 minutes, about 15 minutes, about 20 minutes, about 25 minutes, about 30 minutes, about 35 minutes, about 40 minutes, about 45 minutes, about 50 minutes, about 55 minutes, about 60 minutes, or more.

Cured thickness, which is the thickness of the cured coating, may be determined in any manner, such as described herein. In some embodiments, cured thickness may be determined in accordance with ASTM test method D7378-16, which predicts cured thickness based on measurement of thickness of the applied powder. In some embodiments, the powder formulation for the topcoat in an absence of the primer coat is characterized by a cured thickness of about 25 to about 250 microns. In some embodiments, the powder formulation for the topcoat in combination with the primer coat is characterized by a cured thickness of about 50 microns to about 1 mm.

Gloss consistency, which measures gloss values over the surface of the cured coating, may be determined in any manner, such as described herein. In some embodiments, gloss may be determined in accordance with ASTM test method D523, which provides a standard test method for specular gloss. In some embodiments, the cured coating formed from the powder formulation (e.g., for the topcoat alone or in combination with the primer coat) is characterized by gloss values (e.g., 0.5 to 50 at 60° for a matte coating or 1 to 99 at 60° for a glossy coating). Color differences may be determined in any manner, such as described herein. In some embodiments, color differences may be determined in accordance with ASTM test method D2244, which provides a method for calculating color differences from instrumentally measured color coordinates.

Bleed through may be determined in any manner, such as described herein. In some embodiments, extent of bleed through may be determined by gloss consistency, gloss reduction, color difference measurements, color inconsistencies in the topcoat, and/or appearance of the primer in the topcoat, e.g., appearance of the primer as specs or flakes in the topcoat. In some embodiments, bleed through may be determined by visual inspection, e.g., visual inspection with the naked eye and/or with magnification, e.g., using a magnifying glass.

In some embodiments, the cured coating formed from the powder formulation (e.g., for the topcoat alone or in combination with the primer coat) is characterized by gloss values (e.g., 0.5 to 50 at 60° for a matte coating or 1 to 99 at 60° for a glossy coating) and/or by color values. Methods of determining gloss consistency and/or color difference can include any described herein.

Gassing defects may be determined in any manner, such as described herein. In some embodiments, gassing defects are determined by visual inspection of the cured coating. In some embodiments, the cured coating formed from the powder formulation (e.g., for the topcoat alone or in combination with the primer coat) is characterized as having a cured coating that is substantially free of visible gassing defects, e.g., visible gassing defects such as pinholes, blisters, micro-wrinkles, micro-pores, gloss defects, or a combination of any of these. In some embodiments, visible defects can be determined by assessing a surface profile of the coating.

Visible defects may be determined in any manner, such as described herein. In some embodiments, visible defects are determined by visual inspection of the cured coating. e.g., visual inspection using the naked eye and/or using a magnifying glass. In some embodiments, the cured coating formed from the powder formulation (e.g., for the topcoat alone or in combination with the primer coat) is characterized as having a cured coating that is substantially free of visible defects, e.g., visible defects such as loss of gloss, sagging, blistering, discoloration (e.g., discoloration between different substrates, e.g., discoloration between metal and sealant), striations, loss of adhesion, microcracks, bleed through, or a combination of any of these.

Further non-limiting characteristics include transition temperature, specific gravity, and the like for the powder formulation. In some embodiments, the powder formulation for the topcoat has a specific gravity of about 1.2 to 1.9. In some embodiments, the powder formulation for the primer coat has a specific gravity of about 1.25 to 3.5. In some embodiments, specific gravity may be determined in accordance with ASTM test method D5965.

Further non-limiting characteristics include film thickness (e.g., from 50 microns to 1 mm taking the topcoat and primer coat together), surface smoothness (e.g., PCI scale of 6 to 9, which may be determined in any manner, such as in accordance with ASTM test method D523), scratch resistance (e.g., from about 0.5 N to about 20 N), abrasion resistance (e.g., which may be determined in any manner, such as by using a Taber abraser in accordance with ASTM test method D4060), mar resistance (e.g., which may be determined in any manner, such as in accordance with ASTM test method D5178), impact resistance (e.g., which may be determined in any manner, such as in accordance with ASTM test method D2794), crosshatch adhesion (e.g., from 4B to 5B), tape adhesion (e.g., which may be determined in any manner, such as in accordance with ASTM test method D3359), hardness (e.g., H to 5H, which may be determined in any manner, such as by using a pencil test in accordance with ASTM test method D3363 or by using a Knoop indentation test in accordance with ASTM test method D1474), gloss (e.g., 0.5 to 50 at 60 angle for a matte coating; or 1 to 99 at 60 angle for a glossy coating, which may be determined in any manner, such as in accordance with ASTM test method D523), crack rating (e.g., which may be determined in any manner, such as for a coated edge of a substrate in accordance with ASTM test methods D661 and/or D2065) and the like for the coating (e.g., for the topcoat or primer coat).

The powder formulation (e.g., for the topcoat and/or the primer coat) can be any color, e.g., red, orange, yellow, green, blue, purple, white, black, or a combination of any of these. Accordingly, in some embodiments, the powder formulation can comprise any color of pigment, e.g., a red pigment, a orange pigment, a yellow pigment, a green pigment, a blue pigment, a purple pigment, a white pigment, a black pigment, or a combination of any of these.

Methods

Aspects of the present disclosure provide methods comprising applying a powder formulation described herein as a topcoat to a substrate, and heating the substrate, thereby forming a cured topcoat on the substrate.

The powder formulation applied as a topcoat can be applied alone or in combination with another powder formulation, which can be a powder formulation known in the art or described herein, applied as a primer coat. Accordingly, methods described herein encompass applying a powder formulation as a topcoat with or without applying a powder formulation as a primer coat.

For example, when applying a powder formulation described herein as a topcoat without applying a powder formulation as a primer coat, methods described herein comprise applying a powder formulation as a topcoat to at least a portion of a surface of a substrate; and heating the substrate, thereby forming a cured topcoat on the substrate.

In such instances, heating can be conducted once, in a single cure step, to provide the curing coating.

In another example, when applying a powder formulation described herein as a topcoat in combination with another powder formulation described herein as a primer coat, methods described herein comprise applying a first powder formulation described herein to a substrate to form a primer coat on at least a portion of a surface of the substrate; applying a second powder formulation described herein to at least a portion of a surface of the primer coat to form a topcoat disposed on the primer coat, wherein the primer coat has not been heated prior to forming the topcoat; and heating the substrate with the primer coat and the topcoat applied thereon, thereby forming a cured coating on at least a portion of the surface of the substrate. In such instances, heating can be conducted once, in a single cure step, to provide the curing coating.

In yet another example, when applying a powder formulation described herein as a topcoat in combination with another powder formulation known in the art as a primer coat, methods described herein comprise applying a first powder formulation known in the art to a substrate to form a primer coat on at least a portion of a surface of the substrate; applying a second powder formulation described herein to at least a portion of a surface of the primer coat to form a topcoat disposed on the undercoat, wherein the primer coat has not been heated prior to forming the topcoat; and heating the substrate with the primer coat and the topcoat applied thereon, thereby forming a cured coating on at least a portion of the surface of the substrate. In such instances, heating can be conducted once, in a single cure step, to provide the curing coating.

Any substrate can be used in application methods described herein. Non-limiting examples of a substrate include a metal substrate, a plastic substrate, a wood substrate, a glass substrate, a ceramic substrate, or a combination thereof. In some embodiments, the substrate is a metal substrate (e.g., aluminum, steel). In some embodiments, the substrate includes a seam, a ridge, a weld, a corner, an edge, or a combination thereof. Accordingly, in some embodiments, methods described herein encompass applying one or more powder formulations to a seam, a well, a corner, an edge, or a combination thereof of a substrate.

In some embodiments, the substrate comprises a seam, which comprises a sealant. In such instances, the seam can include any sealant known in the art or described herein. For example, the sealant comprises one or more polymers, such as a silicone, acrylic plastisol, or both.

Methods described herein encompass use of any application method for applying a powder formulation including application methods known in the art or described herein, e.g., fluidized bed, electrostatic spray deposition, and the like. Any fluidized bed application and/or any electrostatic spray deposition system can be used to apply a powder formulation to a substrate in methods described herein. In some embodiments, a powder formulation can be applied to a substrate using a corona charging system or a tribo charging system.

In some embodiments, when applying a first and a second powder formulation, the powder formulations can be applied using the same electrostatic spray deposition system or a different electrostatic spray deposition system. For example, the first powder formulation can be applied using a corona charging system and the second powder formulation can be applied using a tribo charging system, or vice versa.

Methods described herein encompass use of a negative corona voltage to impart a negative charge to the powder particles or a positive corona voltage to impart a positive charge to the powder particles. In some embodiments, when applying a first and a second powder formulation, the powder formulations can be applied using the same charge corona voltage or a different charge corona voltage. For example, the first powder formulation can be applied using a negative corona voltage and the second powder formulation can be applied using a positive corona voltage, or vice versa.

Methods described herein comprise use of any voltage suitable for applying the powder formulation to a substrate. In some embodiments, methods described herein comprise applying an electrical voltage of about 30 to about 100 kV and an amperage of about 5 to about 75 µA to the powder formulation. In such instances, methods described herein can comprise using a corona spray gun or a tribo spray gun that is charged to about 30 to about 100 kV and an amperage of about 5 to about 75 µA when the powder formulation is applied.

Depending on conditions during application of the powder formulation, a person of skill in the art would have understood that voltage, amperage, and other process conditions can be modified to provide and cure a powder formulation to a substrate. Furthermore, optimization may include one or modifications to a powder formulation, as well as to methods of depositing such a powder formulation to provide a desired cured coating. Such optimized formulations and methods are also encompassed by the present document. Methods described herein comprise heating the substrate comprising a powder formulation applied thereon to form a cured coating. In some embodiments, methods described herein comprise heating the substrate to a temperature and for a time sufficient to form a cured coating on the substrate. For example, methods described herein comprise heating the substrate to a temperature between about 300° F., and about 425° F. for between about 30 seconds and about 40 minutes, e.g., heating the substrate in an oven at a temperature between about 300° F., and about 425° F. for between about 30 seconds and about 40 minutes. In another example, when the substrate comprises metal, methods described herein comprise heating the substrate to a peak metal temperature between about 300° F., and about 425° F. for between about 30 seconds and about 40 minutes.

In some embodiments, methods described herein comprise heating the substrate to a temperature between about 320° F., and about 375° F. e.g., between about 330° F., and about 375° F., between about 340° F., and about 375° F., between about 350° F., and about 375° F. between about 360° F., and about 375° F., between about 370° F., and about 375° F., between about 320° F., and about 370° F., between about 320° F., and about 360° F., between about 320° F., and about 350° F., between about 320° F., and about 340° F., between about 320° F., and about 330° F.

In some embodiments, methods described herein comprise heating the substrate for between about 20 and about 40 minutes, e.g., between about 25 and about 40 minutes, between about 30 and about 40 minutes, between about 35 and about 40 minutes, between about 20 and about 35 minutes, between about 20 and about 30 minutes, or between about 20 and about 25 minutes.

Methods described herein are characterized by rapid curing of the powder formulations, which can be assessed by gel time, curing time, and other characteristics using methods known in the art or described herein. In some embodiments, methods described herein comprise a powder formulation for a primer coat having a gel time of about 20 to about 120 seconds (e.g., about 25 to about 90 seconds) at a temperature of 400° F., which can be determined in any manner, such as in accordance with ASTM test method D4217. In some embodiments, methods described herein comprise a powder formulation for a topcoat having a gel time of about 30 to about 300 seconds (e.g., about 40 to about 180 seconds) at a temperature of 400° F., which can be determined in any manner, such as in accordance with ASTM test method D4217. In some embodiments, methods described herein comprise a curing time of about 8 to about 45 minutes at a temperature of 300 to 425° F., which can be determined in any manner, such as in accordance with ASTM test method D1640. In some embodiments, methods described herein comprise a curing time of up to 45 minutes at a peak substrate temperature of 300° F., a curing time of up to 30 minutes at a peak substrate temperature of 325° F., a curing time of up to 20 minutes at a peak substrate temperature of 350° F., a curing time of up to 15 minutes at a peak substrate temperature of 375° F., a curing time of up to 10 minutes at a peak substrate temperature of 400° F., or a curing time of up to 8 minutes at a peak substrate temperature of 425° F. Peak substrate temperature (e.g., peak metal temperature when the substrate comprises metal) can be determined in any manner, e.g., infrared (IR) technologies.

EXAMPLES

In order that the disclosure described may be more fully understood, the following examples are set forth. The examples described in this application are offered to illustrate the formulations and the methods provided herein and are not to be construed in any way as limiting their scope.

Example 1: Preparation of Non-Limiting Powder Formulations

The powder formulations herein were prepared by mixing the components in an extruder at a temperature above the softening temperature of the resin but below the curing temperature. The formulations were then extruded and cooled to solidify and then pulverized into a powder. A dry flow additive (e.g., aluminum oxide, silica, or any other herein) was added to the formulations during pulverization. Dry flow additives for use in powder formulations described herein can have a hydrophilic surface or a hydrophobic surface. After sieving, the average particle size of the powder was between about 20 and about 30 microns for the primer formulation and between about 40 and about 55 microns for the topcoat formulation.

Example 2: Non-Limiting Primer Formulations

Powder formulations for a primer coat were prepared as described in Example 1. Non-limiting examples of powder formulations for the primer coat are provided in Tables 1A-1L.

TABLE 1A

Non-limiting example of a primer formulation

| Component | Use | Amount (wt %) |
|---|---|---|
| Epoxy resin, EEW (g/eq) 650-725 | Epoxy resin | 20-50 |
| Accelerated dicyandiamide curing agent | Curing agent | 0-2.0 |
| Dicyandiamide | Curing agent | 0-2.0 |
| Hydroxyalkylamide crosslinker | Crosslinking agent | 0-3.0 |

TABLE 1A-continued

Non-limiting example of a primer formulation

| Component | Use | Amount (wt %) |
|---|---|---|
| Micronized amide wax coated with benzoin | Degassing agent | 0-2.0 |
| Zinc dust | Corrosion resistance filler | 0-70.0 |
| Barium sulfate | Corrosion resistance filler | 0-30.0 |
| Mixture of acrylic polymer and silica | Flow modifier | 0.2-2.0 |
| Titanium dioxide | Pigment | 0-10.0 |
| Barium titanate | Transfer efficiency additive | 0-3.0 |
| Wax-based processing additive with pigment-affinic groups | Wetting agent | 0-2.0 |
| Total (wt %) | | 100 |

TABLE 1B

Non-limiting example of a primer formulation

| Component | Use | Amount (wt %) |
|---|---|---|
| Bisphenol-F type taffy process solid resin | Epoxy resin | 20-50 |
| Phenol curing agent | Curing agent | 0-8.0 |
| 2-methyl imidazole | Curing agent | 0-2.0 |
| Micronized amide wax coated with benzoin | Degassing agent | 0-2.0 |
| Zinc dust | Corrosion resistance filler | 0-70.0 |
| Wollastonite | Filler | 0-30.0 |
| Mixture of acrylic polymer and silica | Flow modifier | 0.2-4.0 |
| Titanium dioxide | Pigment | 0-10.0 |
| Barium titanate | Transfer efficiency additive | 0-3.0 |
| Wax-based processing additive with pigment-affinic groups | Wetting agent | 0-2.0 |
| Total (wt %) | | 100 |

TABLE 1C

Non-limiting example of a primer formulation

| Component | Use | Amount (wt %) |
|---|---|---|
| Epoxy resin, BPA free, EEW (g/eq) 600-700 | Epoxy resin | 20-50 |
| Salt of a polycarboxylic acid and a cycle amidine | Curing agent | 0-8.0 |
| Benzyltriethylammonium chloride (BTEAC) | Phase-transfer catalyst | 0-3.0 |
| Micronized amide wax coated with benzoin | Degassing agent | 0-2.0 |
| Zinc dust | Corrosion resistance filler | 0-70.0 |
| Barium sulfate | Corrosion resistance filler | 0-30.0 |
| Flow modifier on silica carrier | Flow modifier | 0.2-4.0 |
| Titanium dioxide | Pigment | 0-10.0 |
| Barium titanate | Transfer efficiency additive | 0-3.0 |
| Wax-based processing additive with pigment-affinic groups | Wetting agent | 0-2.0 |
| Total (wt %) | | 100 |

TABLE 1D

Non-limiting example of a primer formulation

| Component | Use | Amount (wt %) |
|---|---|---|
| Epoxy resin, EEW (g/eq) 650-725 | Epoxy resin | 20-50 |
| Epoxy resin, EEW (g/eg) 872-975 | Epoxy resin | 20-50 |
| Accelerated dicyandiamide curing agent | Curing agent | 0-2.0 |
| Zinc dust | Corrosion resistance filler | 0-70.0 |
| Barium sulfate | Corrosion resistance filler | 0-30.0 |
| Silicone free resin | Flow modifier | 0.2-2.0 |
| Titanium dioxide | Pigment | 0-10.0 |
| Iron oxide | Pigment | 0-10.0 |
| Total (wt %) | | 100 |

TABLE 1E

Non-limiting example of a primer formulation

| Component | Use | Amount (wt %) |
|---|---|---|
| Epoxy resin, EEW (g/eq) 650-725 | Epoxy resin | 25-35 |
| Accelerated dicyandiamide curing agent | Curing agent | 0.1-1 |
| Zinc dust | Corrosion resistance filler | 50-60 |
| Barium sulfate | Corrosion resistance filler | 5-15 |
| Silicone free resin | Flow modifier | 0.1-1 |
| Titanium dioxide | Pigment | 2.5-7.5 |
| Iron oxide | Pigment | 0.01-0.1 |
| Total (wt %) | | 100 |

TABLE 1F

Non-limiting example of a primer formulation

| Component | Use | Amount (wt %) |
|---|---|---|
| Epoxy resin, EEW (g/eq) 650-725 | Epoxy resin | 10-20 |
| Epoxy resin, EEW (g/eg) 872-975 | Epoxy resin | 10-20 |
| Accelerated dicyandiamide curing agent | Curing agent | 0.1-1 |
| Zinc dust | Corrosion resistance filler | 50-60 |
| Barium sulfate | Corrosion resistance filler | 10-20 |
| Silicone free resin | Flow modifier | 0.1-1 |
| Iron oxide | Pigment | 1-2 |
| Total (wt %) | | 100 |

TABLE 1G

Non-limiting example of a primer formulation

| Component | Use | Amount (wt %) |
|---|---|---|
| Epoxy resin, EEW (g/eq) 650-725 | Epoxy resin | 25-35 |
| Accelerated dicyandiamide curing agent | Curing agent | 0.1-1 |
| Zinc dust | Corrosion resistance filler | 50-60 |
| Barium sulfate | Corrosion resistance filler | 10-20 |
| Silicone free resin | Flow modifier | 0.1-1 |
| Iron oxide | Pigment | 1-2 |
| Bentonite clay | Additive | 0.1-1 |
| Total (wt %) | | 100 |

TABLE H

Non-limiting examples of primer formulations

| Component | Use | Amount (wt %) | Amount (wt %) | Amount (wt %) |
|---|---|---|---|---|
| Epoxy resin, EEW (g/eq) 650-725 | Epoxy resin | 25.0 | 0 | 31.8 |
| Bisphenol-F type taffy process solid resin | Epoxy resin | 0 | 24.0 | 0 |
| Accelerated dicyandiamide curing agent | Curing agent | 0.70 | 0 | 0 |
| Dicyandiamide | Curing agent | 0.50 | 0 | 0 |
| Salt of a polycarboxylic acid and a cycle amidine | Curing agent | 0 | 0 | 3.0 |
| 2-methyl imidazole | Curing agent | 0 | 0.2 | 0 |
| Phenol curing agent | Curing agent | 0 | 6.0 | 0 |
| Hydroxyalkylamide crosslinker | Crosslinking agent | 0.5 | 0 | 0 |
| Benzyltriethylammonium chloride (BTEAC) | Phase-transfer catalyst | 0 | 0 | 0.4 |
| Micronized amide wax coated with benzoin | Degassing agent | 0.5 | 0.5 | 0.5 |
| Zinc dust | Corrosion resistance filler | 55.0 | 50.0 | 50.0 |
| Barium sulfate | Corrosion resistance filler | 9.9 | 0 | 5.35 |
| Wollastonite | Filler | 0 | 10.55 | 0 |
| Mixture of acrylic polymer and silica | Flow modifier | 1.0 | 2.0 | 2.0 |
| Titanium dioxide | Pigment | 5.0 | 5.0 | 5.0 |
| Barium titanate | Transfer efficiency additive | 1.0 | 0.75 | 0.75 |
| Wax-based processing additive with pigment-affinic groups | Wetting agent | 1.0 | 1.0 | 1.0 |
| Total (wt %) | | 100 | 100 | 100 |

TABLE I

Non-limiting examples of primer formulations

| Component | Use | A (wt %) | B (wt %) | C (wt %) | D (wt %) | E (wt %) |
|---|---|---|---|---|---|---|
| Epoxy resin, EEW (g/eq) 650-725 | Epoxy resin | 25 | 28 | 25 | 14 | 28 |
| Epoxy resin, EEW (g/eg) 872-975 | Epoxy resin | 0 | 0 | 0 | 14 | 0 |
| Accelerated dicyandiamide curing agent | Curing agent | 1.1 | 0.5 | 1.1 | 0.5 | 0.52 |
| Hydroxyalkylamide crosslinker | Crosslinking agent | 0.5 | 0 | 0.5 | 0 | 0 |
| Zinc dust | Corrosion resistance filler | 55 | 55 | 55 | 55 | 55 |
| Barium sulfate | Corrosion resistance filler | 9.9 | 10 | 13.73 | 14.58 | 14.46 |
| Silicone free resin | Flow modifier | 0 | 0.5 | 0 | 0.5 | 0.3 |
| Acrylic polymer and silica - 3 | Flow modifier - 3 | 1 | 0 | 1 | 0 | 0 |
| Micronized amide wax with benzoin | Degassing agent | 0.5 | 0 | 0.5 | 0 | 0 |
| Wax-based processing additive with pigment-affinic groups | Wetting agent | 1 | 0 | 1 | 0 | 0 |
| Barium titanate | Transfer efficiency additive | 0.75 | 0 | 0.75 | 0 | 0 |
| Titanium dioxide | Pigment | 5.25 | 5.98 | 0 | 0 | 0 |
| Iron oxide | Pigment | 0.0 | 0.02 | 1.42 | 1.42 | 1.32 |
| Bentonite clay | Additive | 0 | 0 | 0 | 0 | 0.4 |
| Total (wt %) | | 100 | 100 | 100 | 100 | 100 |

TABLE 1J

Non-limiting examples of primer formulations

| Component | Use | A (wt %) | B (wt %) | C (wt %) | D (wt %) | E (wt %) | F (wt %) | G (wt %) | H (wt %) | I (wt %) | J (wt %) |
|---|---|---|---|---|---|---|---|---|---|---|---|
| Epoxy resin, EEW (g/eq) 650-725 | Epoxy resin | 14.0 | 14.0 | 14.0 | 14.0 | 10.5 | 10.5 | 29.7 | 28.6 | 30.0 | 30.0 |
| Carboxyl functional polyester resin, acid value (mg KOH/g resin) 52-58 | Carboxyl functional polyester resin | 20.5 | 20.5 | 20.5 | 20.5 | 0 | 0 | 0 | 0 | 0 | 0 |
| Acid functional acrylic resin, acid value (mg KOH/g resin) 33-37 | Curing agent | 0 | 0 | 0 | 0 | 24.0 | 24.0 | 0 | 0 | 0 | 0 |
| Dodecanedioic acid | Curing agent | 0 | 0 | 0 | 0 | 0 | 0 | 4.8 | 4.7 | 0 | 0 |
| Accelerated dicyandiamide curing agent | Curing agent | 0 | 0 | 0 | 0 | 0 | 0 | 0 | 0 | 1.2 | 1.2 |
| Micronized amide wax with benzoin | Degassing agent | 0.5 | 0.5 | 0.5 | 0.5 | 0.5 | 0.5 | 0.5 | 0.5 | 0.5 | 0.5 |
| Acrylic polymer and silica - 2 | Flow modifier - 2 | 5.0 | 5.0 | 5.0 | 5.0 | 5.0 | 5.0 | 5.0 | 5.0 | 0.5 | 0 |
| Acrylic polymer and silica - 5 | Flow modifier - 5 | 4.5 | 4.5 | 4.5 | 4.5 | 4.5 | 4.5 | 4.5 | 4.5 | 0.0 | 3.5 |
| Zinc dust | Corrosion resistance filler | 50.0 | 48.9 | 48.8 | 49.9 | 48.8 | 49.9 | 50.0 | 50.0 | 61.7 | 58.7 |
| Titanium dioxide | Pigment | 5.0 | 5.0 | 5.0 | 5.0 | 5.0 | 5.0 | 5.0 | 5.0 | 5.0 | 5.0 |
| Barium titanate | Transfer efficiency additive | 0 | 0.8 | 0.7 | 0 | 0.7 | 0 | 0 | 0.8 | 0.8 | 0.8 |
| Graphene | Conductive agent | 0 | 0 | 0.1 | 0.1 | 0.1 | 0.1 | 0 | 0.1 | 0 | 0 |
| Fatty acid antistatic | Antistatic agent | 0 | 0.4 | 0.4 | 0 | 0.4 | 0 | 0 | 0.4 | 0.4 | 0.4 |
| Brominated catalyst adsorbed on silica | Phase-transfer catalyst | 0.5 | 0.5 | 0.5 | 0.5 | 0.5 | 0.5 | 0.5 | 0.5 | 0 | 0 |
| Total (%) | | 100 | 100 | 100 | 100 | 100 | 100 | 100 | 100 | 100 | 100 |

TABLE 1K

Non-limiting examples of primer formulations

| Component | Use | A* | B* | C* | D* | E* | F* | G* | H* | I* |
|---|---|---|---|---|---|---|---|---|---|---|
| Epoxy resin, EEW (g/eq) 650-725 | Epoxy resin | 25 | 25 | 25 | 28 | 25 | 25 | 25 | 25 | 28 |
| Accelerated dicyandiamide curing agent | Curing agent | 1 | 1 | 1 | 0.6 | 0.8 | 0.5 | 0.6 | 0.6 | 0.6 |
| Micronized dicyandiamide | Curing agent | 0 | 0 | 0 | 0.5 | 0 | 0.5 | 0.5 | 0.5 | 0.5 |
| Hydroxyalkylamide crosslinker - 1 | Crosslinking agent - 1 | 0 | 0 | 0 | 0 | 0 | 0 | 0 | 1 | 0 |
| Hydroxyalkylamide crosslinker - 2 | Crosslinking agent - 2 | 0 | 0 | 0 | 0 | 0 | 0 | 0 | 0 | 0 |
| Micronized amide wax coated with benzoin | Degassing agent | 0 | 0 | 0 | 0 | 0 | 0 | 0.5 | 0.5 | 0.5 |
| Acrylic polymer and silica - 1 | Flow modifier - 1 | 0 | 0 | 0 | 0 | 0 | 0 | 0 | 0 | 0 |
| Acrylic polymer and silica - 3 | Flow modifier - 3 | 0 | 0 | 0 | 0 | 0 | 1 | 1 | 1 | |
| Acrylic polymer and silica - 4 | Flow modifier - 4 | 1 | 1 | 0 | 1.5 | 0 | 1.5 | 0 | 0 | 0 |

TABLE 1K-continued

Non-limiting examples of primer formulations

| | | | | | | | | | | |
|---|---|---|---|---|---|---|---|---|---|---|
| Acrylic polymer and silica - 5 | Flow modifier - 5 | 3 | 3 | 3 | 1.5 | 2 | 1 | 0 | 0 | 0 |
| Wax-based processing additive with pigment-affinic groups | Wetting agent | 0 | 0 | 1 | 0 | 1.5 | 0 | 1 | 1 | 0 |
| Zinc dust | Corrosion resistance filler | 60 | 65 | 60 | 62 | 65 | 52 | 55 | 55 | 62.4 |
| Barium sulfate | Corrosion resistance filler | 4.25 | 0 | 4.25 | 0 | 0 | 13.5 | 10.4 | 9.4 | 0 |
| Titanium dioxide | Pigment | 5 | 4.25 | 5 | 4.9 | 4.7 | 5 | 5 | 5 | 6 |
| Barium titanate | Transfer efficiency additive | 0.75 | 0.75 | 0.75 | 1 | 1 | 1 | 1 | 1 | 1 |
| Total (%) | | 100 | 100 | 100 | 100 | 100 | 100 | 100 | 100 | 100 |

| Component | J* | K* | L* | M* | N* | O* | P* | Q* | R* | S* |
|---|---|---|---|---|---|---|---|---|---|---|
| Epoxy resin, EEW (g/eq) 650-725 | 25 | 28 | 25 | 25 | 25 | 25 | 25 | 25 | 25 | 25 |
| Accelerated dicyandiamide curing agent | 0.6 | 0.55 | 0.55 | 0.6 | 0.6 | 0.6 | 0.6 | 0.6 | 0.6 | 0.6 |
| Micronized dicyandiamide | 0.5 | 0.55 | 0.55 | 0.5 | 0.5 | 0.5 | 0.5 | 0.5 | 0.5 | 0.5 |
| Hydroxyalkylamide crosslinker - 1 | 0 | 0 | 0 | 0 | 0 | 0 | 0 | 0.5 | 0 | 0 |
| Hydroxyalkylamide crosslinker - 2 | 0 | 0 | 0 | 0 | 0 | 0 | 0 | 0 | 0 | 1 |
| Micronized amide wax coated with benzoin | 0.5 | 0.5 | 0.5 | 0.5 | 0.5 | 0.5 | 0.5 | 0.5 | 0.5 | 0.5 |
| Acrylic polymer and silica - 1 | 0 | 0 | 0 | 0 | 0 | 1 | 1 | 0 | 0 | 0 |
| Acrylic polymer and silica - 3 | 1 | 1 | 1 | 1 | 1 | 0 | 0 | 1 | 1 | 1 |
| Acrylic polymer and silica - 4 | 0 | 0 | 0 | 0 | 0 | 0 | 0 | 0 | 0 | 0 |
| Acrylic polymer and silica - 5 | 0 | 0 | 0.5 | 1 | 1.5 | 1 | 1.5 | 0 | 0 | 0 |
| Wax-based processing additive with pigment-affinic groups | 0 | 0 | 0 | 0 | 0 | 0 | 0 | 1 | 1 | 1 |
| Zinc dust | 55 | 62.4 | 55 | 55 | 55 | 55 | 55 | 55 | 55 | 55 |
| Barium sulfate | 11.4 | 0 | 10.9 | 10.4 | 9.9 | 10.4 | 9.9 | 9.9 | 10.4 | 9.4 |
| Titanium dioxide | 5 | 6 | 5 | 5 | 5 | 5 | 5 | 5 | 5 | 5 |
| Barium titanate | 1 | 1 | 1 | 1 | 1 | 1 | 1 | 1 | 1 | 1 |
| Total (%) | 100 | 100 | 100 | 100 | 100 | 100 | 100 | 100 | 100 | 100 |

*wt %

TABLE 1L

Primer formulations (Primer III)

| Component | Use | A (wt %) | B (wt %) | C (wt %) | D (wt %) | E (wt %) | F (wt %) | G (wt %) |
|---|---|---|---|---|---|---|---|---|
| Epoxy resin, EEW (g/eq) 650-725 | Epoxy resin | 28 | 28 | 28 | 28 | 28 | 28 | 28 |
| Accelerated dicyandiamide curing agent | Curing agent | 0.6 | 0.6 | 0.6 | 0.6 | 0.6 | 0.5 | 0.6 |
| Micronized dicyandiamide | Curing agent | 0.5 | 0.5 | 0.5 | 0.5 | 0.5 | 0.6 | 0.5 |
| Micronized amide wax with benzoin | Degassing agent | 0.5 | 0.5 | 0.5 | 0.5 | 0.5 | 0.5 | 0.5 |
| Acrylic polymer and silica - 1 | Flow modifier - 1 | 0 | 0 | 0.8 | 0 | 0 | 0.8 | 0.5 |
| Acrylic polymer and silica - 3 | Flow modifier - 3 | 0 | 0.8 | 0 | 0 | 0 | 0 | 0 |
| Acrylic polymer and silica - 4 | Flow modifier - 4 | 0.8 | 0 | 0 | 0 | 0 | 0 | 0 |
| Acrylic polymer and silica - 5 | Flow modifier - 5 | 2 | 2 | 2 | 2 | 2 | 2 | 1.8 |
| Wax-based processing additive with pigment-affinic groups - 1 | Wetting agent | 0 | 0 | 0 | 0.8 | 0 | 0 | 0.5 |
| Wax-based processing additive with pigment-affinic groups - 2 | Wetting agent | 0 | 0 | 0 | 0 | 0.8 | 0 | 0 |
| Zinc dust | Corrosion resistance filler | 60 | 60 | 60 | 60 | 60 | 60 | 60.2 |
| Titanium dioxide | Pigment | 6.6 | 6.6 | 6.6 | 6.6 | 6.6 | 6.6 | 6.6 |
| Barium titanate | Transfer efficiency additive | 1 | 1 | 1 | 1 | 1 | 1 | 0.8 |
| Total (%) | | 100 | 100 | 100 | 100 | 100 | 100 | 100 |

Example 3: Non-limiting Topcoat Formulations

Powder formulations for a topcoat were prepared as described in Example 1. Non-limiting examples of powder formulations for the topcoat are provided in Table 2A-2L.

TABLE 2A

Non-limiting example of a topcoat formulation

| Component | Use | Amount (wt %) |
|---|---|---|
| Carboxyl functional polyester resin (acid value: 28-36) | Carboxyl functional polyester resin | 40-90 |
| Triglycidyl isocyanurate (TGIC) | Curing agent | 3.0-6.6 |
| Micronized amide wax coated with benzoin | Degassing agent | 0-2.0 |
| Low-density polyethylene/ aluminum oxide nanocomposite | Scratch resistance agent | 0-1.5 |
| Barium titanate | Transfer efficiency additive | 0-3.0 |
| Wax-based processing additive with pigment-affinic groups | Wetting agent | 0-2.0 |
| Brominated catalyst adsorbed on silica | Phase-transfer catalyst | 0-1.0 |
| Mixture of acrylic polymer and silica | Flow modifier | 0-2.0 |
| Pigment black | Pigment | 0.5-4.0 |
| Carbon black | Pigment | 0-4.0 |
| Precipitated barium sulfate | Corrosion resistance filler | 0-40 |
| Fatty acid antistatic | Antistatic agent | 0-2 |
| Blocked aliphatic polyisocyanate | Crosslinking agent | 0-5 |
| Total (wt %) | | 100 |

TABLE 2B

Non-limiting example of a topcoat formulation

| Component | Use | Amount (wt %) |
|---|---|---|
| Carboxyl functional polyester resin (acid value (mg KOH/g): 47-53) | Carboxyl functional polyester resin | 40-90 |
| Hydroxyalkylamide crosslinker | Curing agent | 3.0-6.6 |
| Mixture of acrylic polymer and silica | Flow modifier | 0-2.0 |
| Micronized amide wax coated with benzoin | Degassing agent | 0-10.0 |
| Wax-based processing additive with pigment-affinic groups | Wetting agent | 0-2.0 |
| Pigment black | Pigment | 0-4.0 |
| Low-density polyethylene/ aluminum oxide nanocomposite | Scratch resistance agent | 0-2.0 |
| Precipitated barium sulfate | Corrosion resistance filler | 0-40 |
| Octadecanyl β-(3,5-di-tert-butyl-4-hydroxyphenyl)propionate | Antioxidant | 0-2.0 |
| Total (wt %) | | 100 |

TABLE 2C

Non-limiting example of a topcoat formulation

| Component | Use | Amount (wt %) |
|---|---|---|
| Carboxyl functional polyester resin (acid value: 28-36) | Carboxyl functional polyester resin | 40-90 |
| Tris(oxiranylmethyl) benzene-1,2,4-tricarboxylate | Curing agent | 3.0-8.0 |
| Micronized amide wax coated with benzoin | Degassing agent | 0-10.0 |
| Low-density polyethylene/ aluminum oxide nanocomposite | Scratch resistance agent | 0.1-1.5 |
| Barium titanate | Transfer efficiency additive | 0-3.0 |
| Wax-based processing additive with pigment-affinic groups | Wetting agent | 0-2.0 |
| Mixture of acrylic polymer and silica | Flow modifier | 0-2.0 |
| Pigment black | Pigment | 0.5-4.0 |
| Precipitated barium sulfate | Corrosion resistance filler | 0-40 |
| Octadecanyl β-(3,5-di-tert-butyl-4-hydroxyphenyl)propionate | Antioxidant | 0-2.0 |
| Total (wt %) | | 100 |

TABLE 2D

Non-limiting example of a topcoat formulation

| Component | Use | Amount (wt %) |
|---|---|---|
| Hydroxylated polyester (Hydroxyl value: 38-45 mg KOH/g) | Hydroxyl functional polyester resin | 40-90 |
| Blocked aliphatic polyisocyanate | Crosslinking agent | 0.5-20 |
| Mixture of acrylic polymer and silica | Flow modifier | 0-4.0 |
| Micronized amide wax coated with benzoin | Degassing agent | 0-10.0 |
| Wax-based processing additive with pigment-affinic groups | Wetting agent | 0-2.0 |
| cBismuth octoate | Curing catalyst | 0-1.0 |
| Pigment black | Pigment | 0.5-4.0 |
| Low-density polyethylene/ aluminum oxide nanocomposite | Scratch resistance agent | 0.1-1.5 |
| Precipitated barium sulfate | Corrosion resistance filler | 0-40 |
| Octadecanyl β-(3,5-di-tert-butyl-4-hydroxyphenyl)propionate | Antioxidant | 0-2.0 |
| Stannous octoate | Curing catalyst | 0-1.0 |
| Total (wt %) | | 100 |

TABLE 2E

Non-limiting example of a topcoat formulation

| Component | Use | Amount (wt %) |
|---|---|---|
| Carboxyl functional polyester resin (acid value: 28-36) | Carboxyl functional polyester resin | 40-90 |
| Triglycidyl isocyanurate (TGIC) | Curing agent | 3.0-6.6 |
| Micronized amide wax coated with benzoin | Degassing agent | 0-2.0 |
| Crystalline polyethylene | Scratch resistance agent | 0-1.5 |
| Barium titanate | Transfer efficiency additive | 0-3.0 |
| Brominated catalyst adsorbed on silica | Phase-transfer catalyst | 0-1.0 |
| Mixture of acrylic polymer and silica | Flow modifier | 0-2.0 |

TABLE 2E-continued

Non-limiting example of a topcoat formulation

| Component | Use | Amount (wt %) |
|---|---|---|
| Carbon black | Pigment | 0-4.0 |
| Precipitated barium sulfate | Corrosion resistance filler | 0-40 |
| Fatty acid antistatic | Antistatic agent | 0-2 |
| Total (wt %) | | 100 |

TABLE 2F

Non-limiting example of a topcoat formulation

| Component | Use | Amount (wt %) |
|---|---|---|
| Carboxyl functional polyester resin (acid value: 28-36) | Carboxyl functional polyester resin | 40-90 |
| Triglycidyl isocyanurate (TGIC) | Curing agent | 3.0-6.6 |
| Micronized amide wax coated with benzoin | Degassing agent | 0-2.0 |
| Low-density polyethylene/ aluminum oxide nanocomposite | Scratch resistance agent | 0-1.5 |
| Barium titanate | Transfer efficiency additive | 0-3.0 |
| Wax-based processing additive with pigment-affinic groups | Wetting agent | 0-2.0 |
| Brominated catalyst adsorbed on silica | Phase-transfer catalyst | 0-1.0 |
| Mixture of acrylic polymer and silica | Flow modifier | 0-2.0 |
| Carbon black | Pigment | 0-4.0 |
| Precipitated barium sulfate | Corrosion resistance filler | 0-40 |
| Fatty acid antistatic | Antistatic agent | 0-2 |
| Total (wt %) | | 100 |

TABLE 2G

Non-limiting example of a topcoat formulation

| Component | Use | Amount (wt %) |
|---|---|---|
| Carboxyl functional polyester resin (acid value: 33-37) | Carboxyl functional polyester resin | 40-90 |
| Triglycidyl isocyanurate (TGIC) | Curing agent | 3.0-6.6 |
| Benzoin | Degassing agent | 0-2.0 |
| Micronized amide wax coated with benzoin | Degassing agent | 0-2.0 |
| Crystalline polyethylene | Scratch resistance agent | 0-1.5 |
| Barium titanate | Transfer efficiency additive | 0-3.0 |
| Wax-based processing additive with pigment-affinic groups | Wetting agent | 0-2.0 |
| Brominated catalyst adsorbed on silica | Phase-transfer catalyst | 0-1.0 |
| Mixture of acrylic polymer and silica | Flow modifier | 0-2.0 |
| Carbon black | Pigment | 0-4.0 |
| Precipitated barium sulfate | Corrosion resistance filler | 0-40 |
| Fatty acid antistatic | Antistatic agent | 0-2 |
| Total (wt %) | | 100 |

TABLE 2H

Non-limiting example of a topcoat formulation

| Component | Use | Amount (wt %) |
|---|---|---|
| Carboxyl functional polyester resin (acid value: 33-37) | Carboxyl functional polyester resin | 40-90 |
| Triglycidyl isocyanurate (TGIC) | Curing agent | 3.0-6.6 |
| Polyamide- or amide- modified phenolated urea surfactant | Degassing agent | 0-2.0 |
| Crystalline polyethylene | Scratch resistance agent | 0-1.5 |
| Wax-based processing additive with pigment-affinic groups | Wetting agent | 0-2.0 |
| Brominated catalyst adsorbed on silica | Phase-transfer catalyst | 0-1.0 |
| Silicone free resin | Flow modifier | 0-2.0 |
| Carbon black | Pigment | 0-4.0 |
| Precipitated barium sulfate | Corrosion resistance filler | 0-40 |
| Total (wt %) | | 100 |

TABLE 2I

Non-limiting examples of topcoat formulations

| Component | Use | Amount (wt %) | Amount (wt %) | Amount (wt %) | Amount (wt %) |
|---|---|---|---|---|---|
| Carboxyl functional polyester resin (acid value: 28-36) | Carboxyl functional polyester resin | 75.0 | 0 | 79.0 | 0 |
| Carboxyl functional polyester resin (acid value (mg KOH/g): 47-53) | Carboxyl functional polyester resin | 0 | 80 | 0 | 0 |
| Hydroxylated polyester (Hydroxyl value: 38-45 mg KOH/g) | Hydroxyl functional polyester resin | 0 | 0 | 0 | 69.7 |
| Tris(oxiranylmethyl) benzene-1,2,4-tricarboxylate | Curing agent | 0 | 0 | 7.0 | 0 |
| Blocked aliphatic polyisocyanate | Crosslinking agents | 0 | 0 | 0 | 15.3 |
| Triglycidyl isocyanurate (TGIC) | Crosslinking agent | 5.5 | 5.9 | 0 | 0 |
| Micronized amide wax coated with benzoin | Degassing agent | 0.5 | 5.0 | 5.0 | 5.0 |
| Low-density polyethylene/ aluminum oxide nanocomposite | Scratch resistance agent | 0.25 | 0 | 0.3 | 0.3 |
| Barium titanate | Transfer efficiency additive | 0.75 | 0 | 0.75 | 0 |

TABLE 2I-continued

Non-limiting examples of topcoat formulations

| Component | Use | Amount (wt %) | Amount (wt %) | Amount (wt %) | Amount (wt %) |
|---|---|---|---|---|---|
| Wax-based processing additive with pigment-affinic groups | Wetting agent | 1.5 | 1.0 | 1.0 | 1.0 |
| Brominated catalyst adsorbed on silica | Phase-transfer catalyst | 0.3 | 0 | 0 | 0 |
| Mixture of acrylic polymer and silica | Flow modifier | 1.5 | 1.5 | 1.5 | 2.0 |
| Pigment black | Pigment | 0.8 | 1.0 | 1.0 | 1.0 |
| Carbon black | Pigment | 1.7 | 0 | 0 | 0 |
| Precipitated barium sulfate | Corrosion resistance filler | 12.2 | 5.8 | 5.0 | 5.2 |
| Octadecanyl β-(3,5-di-tert-butyl-4-hydroxyphenyl)propionate | Antioxidant | 0 | 0.5 | 0.45 | 0.5 |
| Bismuth octoate | Curing catalyst | 0 | 0 | 0 | 0.5 |
| Stannous octoate | Curing catalyst | 0 | 0 | 0 | 0.5 |
| Total (wt %) | | 100 | 100 | 100 | 100 |

TABLE 2J

Non-limiting examples of topcoat formulations

| Component | Use | Amount (wt %) | Amount (wt %) | Amount (wt %) | Amount (wt %) |
|---|---|---|---|---|---|
| Carboxyl functional polyester resin (acid value: 28-36) | Carboxyl functional polyester resin | 85.0 | 80.0 | 0 | 80.0 |
| Carboxyl functional polyester resin (acid value: 33-37) | Carboxyl functional polyester resin | 0 | 0 | 85.0 | 0 |
| Triglycidyl isocyanurate (TGIC) | Curing agent | 6.3 | 5.9 | 6.3 | 5.9 |
| Benzoin | Degassing agent | 0 | 0 | 0.5 | 0 |
| Micronized amide wax coated with benzoin | Degassing agent | 0.5 | 0.3 | 0.3 | 0 |
| Polyamide- or amide- modified phenolated urea surfactant | Degassing agent | 0 | 0 | 0 | 0.6 |
| Crystalline polyethylene | Scratch resistance agent | 0.2 | 0 | 0.25 | 0.2 |
| Low-density polyethylene/aluminum oxide nanocomposite | Scratch resistance agent | 0 | 0.12 | 0 | 0 |
| Wax-based processing additive with pigment-affinic groups | Wetting agent | 0 | 1.0 | 2.0 | 1.2 |
| Barium titanate | Transfer efficiency additive | 0.75 | 0.75 | 0.75 | 0 |
| Brominated catalyst adsorbed on silica | Phase-transfer catalyst | 0.2 | 0.28 | 0.11 | 0.25 |
| Silicone free resin | Flow modifier | 0 | 0 | 0 | 1.5 |
| Mixture of acrylic polymer and silica | Flow modifier | 1.5 | 1.3 | 1.5 | 0 |
| Carbon black | Pigment | 1.2 | 1.6 | 1.2 | 0.9 |
| Precipitated barium sulfate | Corrosion resistance filler | 4.1 | 8.2 | 1.8 | 9.4 |
| Fatty acid antistatic | Antistatic agent | 0.3 | 0.3 | 0.3 | 0 |
| Total (wt %) | | 100 | 100 | 100 | 100 |

TABLE 2K

Non-limiting examples of topcoat formulations

| Component | Use | A (wt. %) | B (wt. %) | C (wt. %) | D (wt. %) |
|---|---|---|---|---|---|
| Carboxyl functional polyester resin (acid value: 28-36) | Carboxyl functional polyester resin | 80.0 | 80.0 | 57.8 | 57.0 |
| Triglycidyl isocyanurate | Curing agent | 5.9 | 5.9 | 4.3 | 4.1 |
| Acrylic polymer and silica - 2 | Flow modifier - 2 | 1.5 | 0 | 0 | 0 |
| Acrylic polymer and silica - 5 | Flow modifier - 5 | 0 | 1.5 | 1.6 | 2.5 |

TABLE 2K-continued

Non-limiting examples of topcoat formulations

| Component | Use | A (wt. %) | B (wt. %) | C (wt. %) | D (wt. %) |
|---|---|---|---|---|---|
| Micronized amide wax with benzoin | Degassing agent | 0.8 | 0.8 | 0.6 | 0.6 |
| Carbon black | Pigment | 1.0 | 1.0 | 0 | 0 |
| Titanium dioxide | Pigment | 0 | 0 | 33.0 | 31.6 |
| Barium sulfate | Corrosion resistance filler | 6.9 | 6.9 | 0 | 0 |
| Low-density polyethylene/aluminum oxide nanocomposite | Scratch resistance agent | 0.5 | 0.5 | 0.1 | 0.1 |
| Barium titanate | Transfer efficiency additive | 0.75 | 0.75 | 0.75 | 0.75 |
| Fatty acid antistatic | Antistatic agent | 0.35 | 0.35 | 0.35 | 0.35 |
| Wax-based processing additive with pigment-affinic groups | Wetting agent | 1.5 | 1.5 | 1.0 | 1.0 |
| Fine particle silica | Rheology modifier | 0.3 | 0.3 | 0.3 | 0.3 |
| Brominated catalyst adsorbed on silica | Phase-transfer catalyst | 0.5 | 0.5 | 0.2 | 0.2 |
| Hybrid carboxy/hydroxy functional metal organic adhesion promoter absorbed upon a precipitated silica carrier | Adhesion promoting agent | 0 | 0 | 0 | 1.5 |
| Total (%) | | 100.00 | 100.00 | 100.00 | 100.00 |

TABLE 2L

Non-limiting examples of topcoat formulations

| Component | Use | A* | B* | C* | D* | E* | F* |
|---|---|---|---|---|---|---|---|
| Carboxyl functional polyester resin (acid value: 28-36) | Carboxyl functional polyester resin | 45 | 46.5 | 48 | 52 | 52 | 52 |
| Triglycidyl isocyanurate | Curing agent | 4.2 | 4.2 | 4.2 | 4.6 | 4.1 | 4.2 |
| Acrylic polymer and silica - 1 | Flow modifier -1 | 1.3 | 1.3 | 1.3 | 1.3 | 1.3 | 1.3 |
| Micronized amide wax coated with benzoin | Degassing agent | 0.5 | 0.5 | 0.5 | 0.5 | 0.5 | 0.5 |
| Octadecanyl β-(3,5-Di-tert-butyl-4-hydroxyphenyl)propionate | Antioxidant | 0.3 | 0.3 | 0.3 | 0.3 | 0.3 | 0.3 |
| Phosphorous trichloride | Antioxidant | 0.3 | 0.3 | 0.3 | 0.3 | 0.3 | 0.3 |
| Acrylic resin | Matting agent | 7.5 | 6 | 4.5 | 7 | 2 | 3 |
| Polyisocyanate adduct | Crosslinking agent | 2.5 | 2.5 | 2.5 | 0 | 0 | 0 |
| Barium sulfate | Corrosion resistance filler | 37.1 | 37.1 | 37.1 | 32.7 | 38.2 | 37.1 |
| Low-density polyethylene/aluminum oxide nanocomposite | Scratch resistance agent | 0.3 | 0.3 | 0.3 | 0.3 | 0.3 | 0.3 |
| Barium Titanate | Transfer efficiency additive | 1 | 1 | 1 | 1 | 1 | 1 |
| Total (%) | | 100.00 | 100.00 | 100.00 | 100.00 | 100.00 | 100.00 |

*wt. %

Example 4: Non-Limiting Characteristics of Powder Formulations

The viscosity of the resin for the primer coat and the resin for the topcoat was measured using the method described in ASTM method D4287. Each resin was characterized by a viscosity of about 1,000 to about 10,000 mPa s at 200° C.

The flow of the primer and topcoat formulations was measured by pill flow using 0.65 g pellets of the powder formulation. Pellets were pressed to a consistent thickness, placed on a panel (R-35 Q-Panel), and allowed to remain flat for 30 seconds. The panel was placed in a preheated oven at 45 degrees from horizontal. After 15 minutes, the panel was removed from the oven and allowed to cool to room temperature. The amount of flow was measured as the total length of the flow of the pellet viewed from the backside of the panel. The primer formulation was characterized by a flow of about 13 mm to about 60 mm at 340° F. The topcoat formulation was characterized by a flow of about 30 mm to about 90 mm at 340° F.

The scratch resistance of the topcoat formulation was measured by the Taber abrasion test. The topcoat formulation specimen was mounted to the Taber rotary abraser and rotated at a fixed speed under a weighted CS-10 or CS-17 abrading wheel. Scratch resistance is expressed as the weight loss per specified number of revolutions (1000 revolutions) under a specified load (500 g or 1000 g). The topcoat formulation was characterized by a scratch resistance of about 15 mg loss of weight to about 45 mg loss of weight.

The edge coverage of the primer and topcoat formulations was measured by edge coverage test using the method described in ASTM method D2967. The primer formulation was characterized by an edge coverage of at least 16%. The topcoat formulation was characterized by an edge coverage of at least 12%.

The sealant coverage of the primer and topcoat formulations were determined by measuring the amount of powder on the sealant prior to curing using a dry film thickness gauge. The sealant coverage is expressed as the thickness of the powder formulation on the sealant sharp edges and the sealant. The sealant coverage of the primer coat, the topcoat, and the primer coat in combination with the topcoat was about 12.5 to about 125 microns, about 25 to about 250 microns, and about 12.5 to about 375 microns, respectively.

Example 5: Non-Limiting Flow Characteristics of Primer Formulations

The flow of an example primer formulation was measured by pill flow using the method described in ASTM method D4242. Pellets are prepared by weighing a mass of product under test equivalent in grams to half of the density (specific gravity) of the powder coating in accordance with ASTM methods D792 or D5965. Pellets (1.3 g of primer formulation) were prepared from a small scale batch and a production batch of primer formulation. The diameter of each pellet was about 12.5 mm. A representative image of a pellet is shown in FIG. 1.

Figure 2:
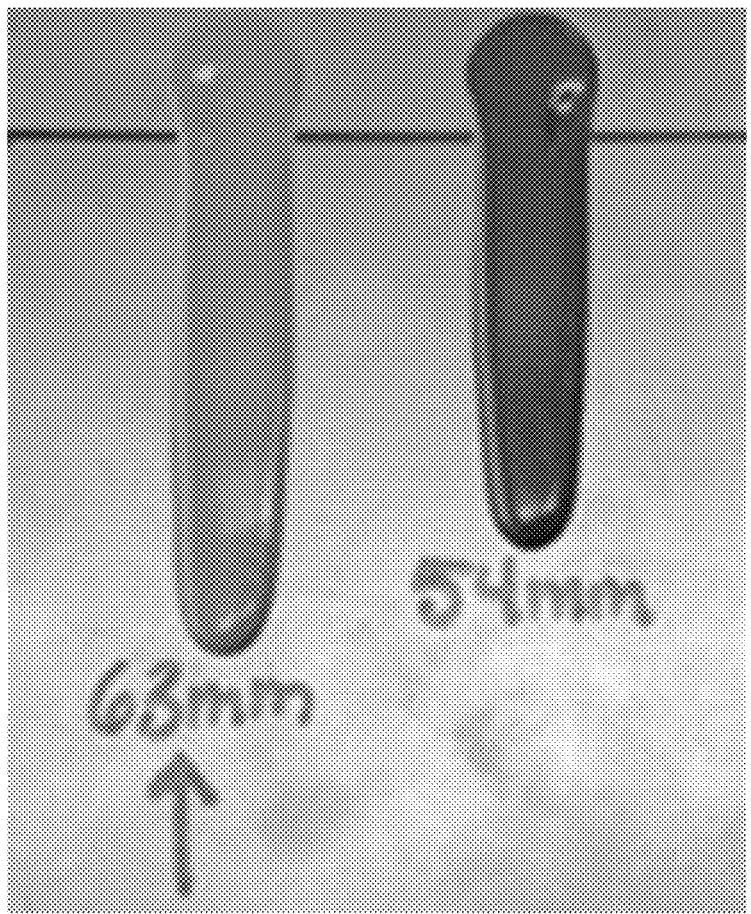
FIG. 2 is a representative image of results from a pill flow analysis of an example primer formulation prepared in a small scale batch (left) and a production batch (right).

Pellets were placed on a panel (R-35 Q-Panel) and allowed to remain flat for 30 seconds. The panel was placed in a preheated oven at 65 degrees from horizontal. Oven temperature was set to 340° F. After 10 minutes, the panel was removed from the oven and allowed to cool to room temperature. The amount of flow was measured as the total length of the flow of the pellet viewed from the backside of the panel. A representative image of a panel heated at 340° F. is shown in FIG. 2.

The small scale batch of primer formulation was characterized by a flow of about 63 mm at 340° F. (Table 3). The production batch of primer formulation was characterized by a flow of about 54 mm at 340° F. (Table 3).

TABLE 3

Non-limiting flow of a primer formulation

| Oven Temp | Small Scale Batch | Production Batch |
| --- | --- | --- |
| 340° F. | 63 mm | 54 mm |

Example 6: Comparison of Powder Formulations and Conventional Formulations

Figure 3:
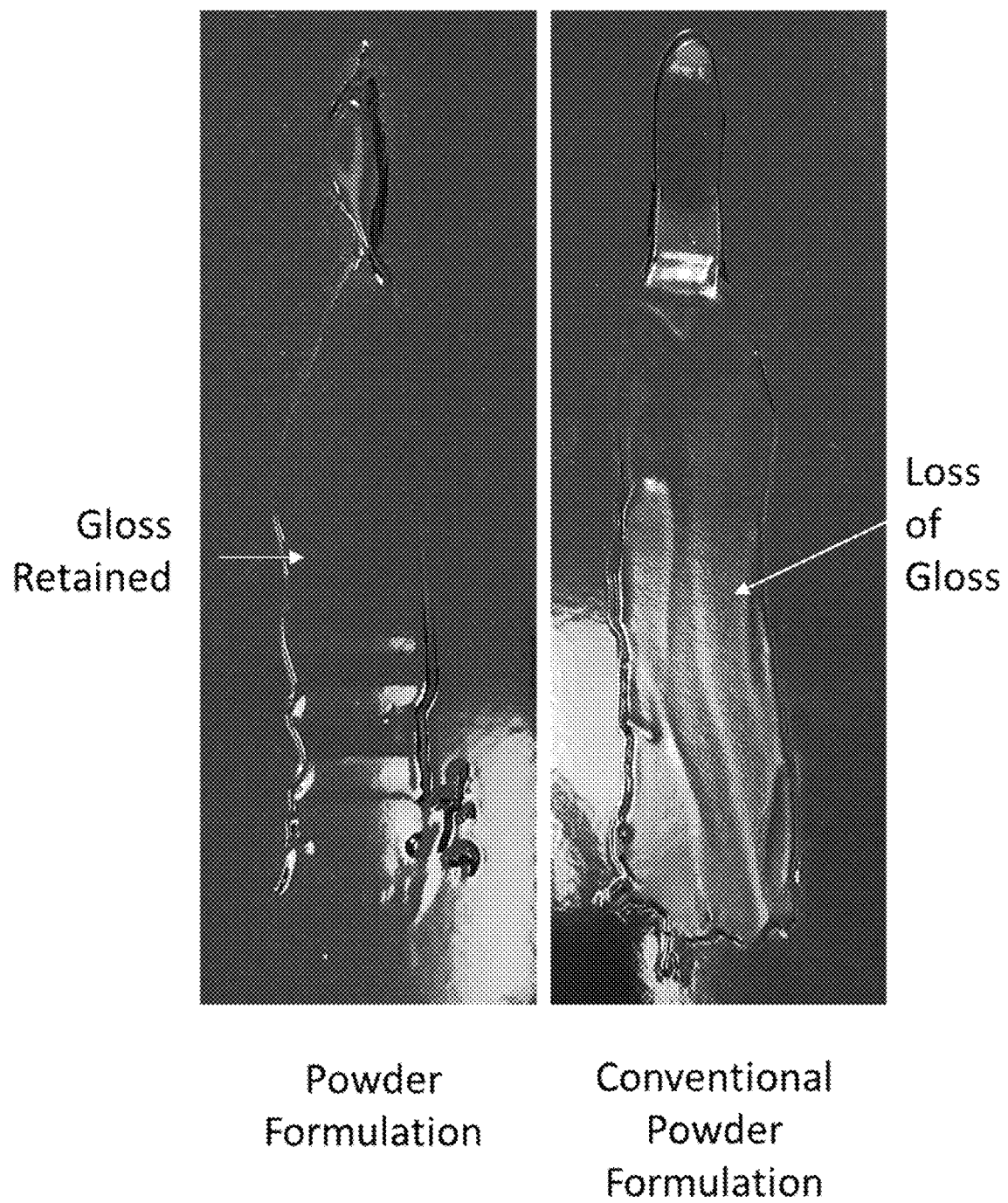
FIG. 3 are representative images showing gloss of an example powder coating formulation (left panel) and an example conventional powder coating formulation (right panel) coated on a sealant.
Figure 4:
FIG. 4 are representative images showing distinct of image (DOI) of an example powder coating formulation (left panel) and an example conventional powder coating formulation (right panel) coated on a sealant.
Figure 4:
Figure 5:
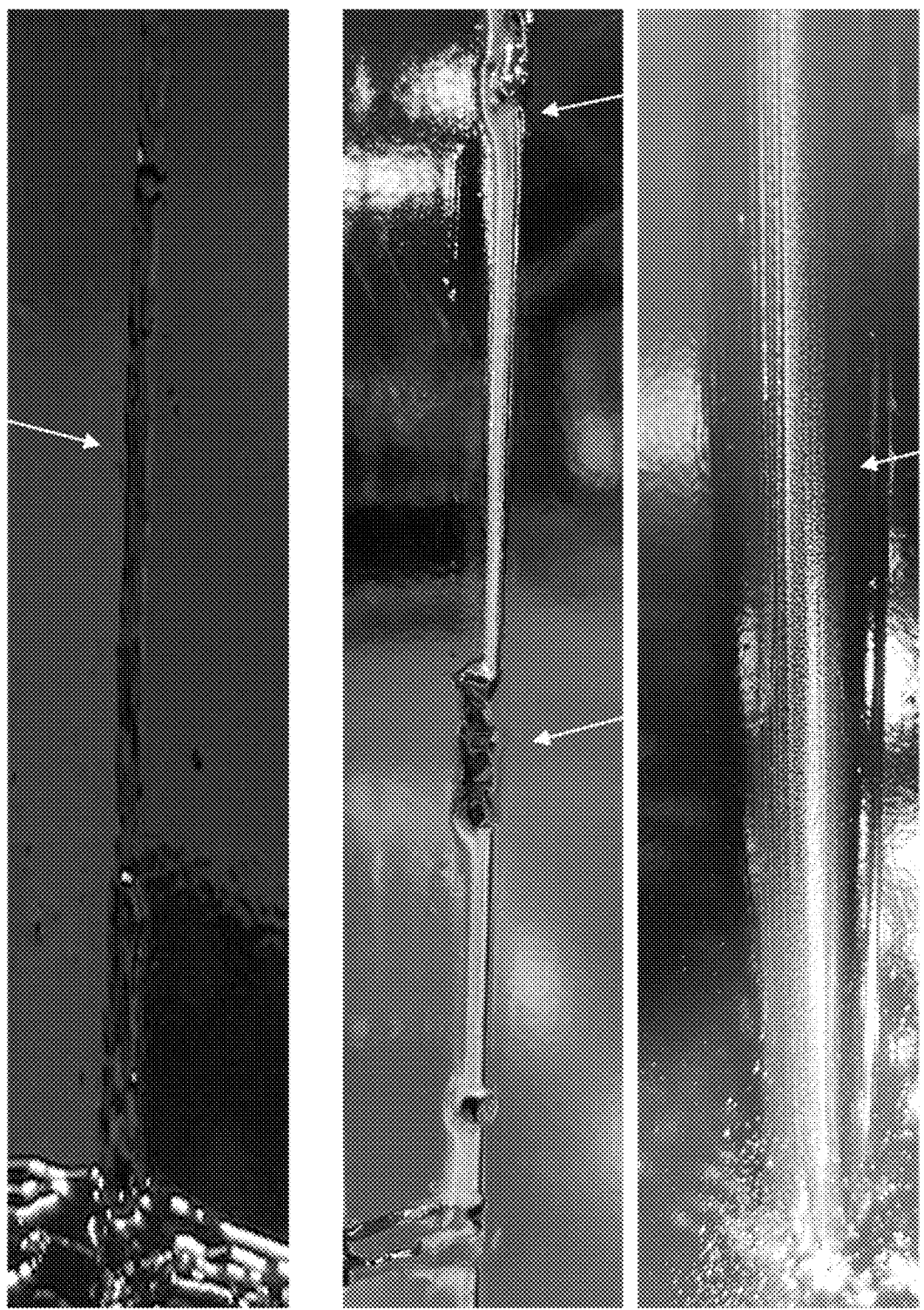
FIG. 5 are representative images showing performance of an example powder coating formulation (left panel) or an example conventional powder coating formulation (middle and right panels) coated onto a seam covered with sealant. Arrows point to color retention (left panel), sagging (middle panel, top arrow), separation of sealant from seam (middle panel, middle arrow), discoloration (middle panel, bottom arrow), and striations (right panel).
Figure 6:
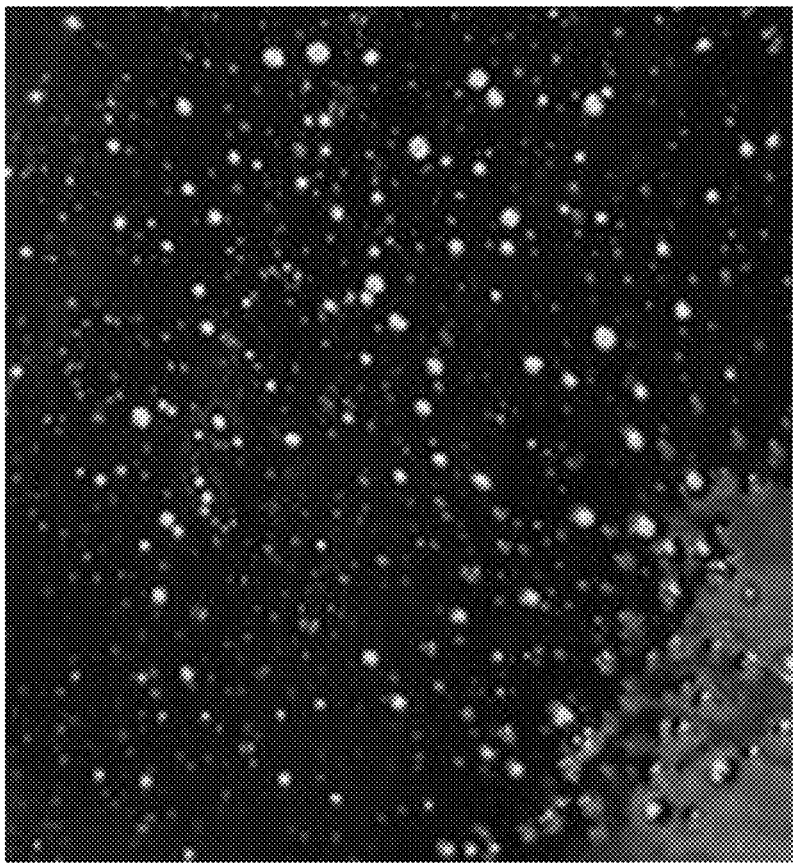
FIG. 6 are representative images showing bleed through of an example powder coating formulation (left panel) or an example conventional powder coating formulation (right panel) into an example topcoat formulation.
Figure 6:
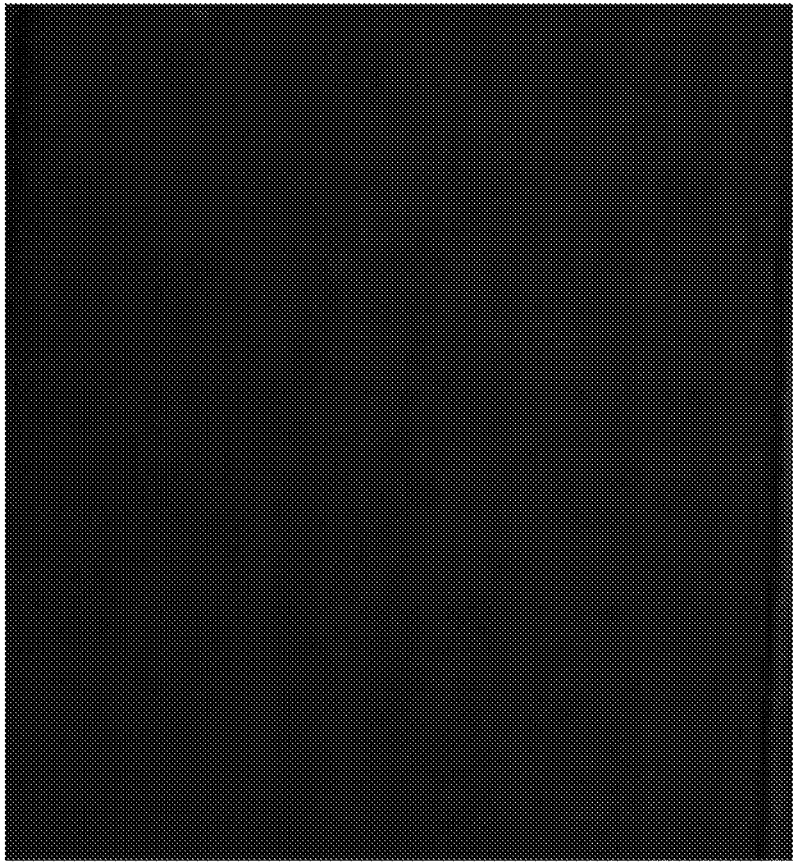

The performance of an example primer and topcoat formulation described herein and an example conventional primer and topcoat formulation was tested. Performance was tested on substrate panels with sealant (FIGS. 3-5) and without sealant (FIG. 6). For substrate panels with sealant, the sealant was applied to the substrate panels (FIG. 3-4) or to the seam between two substrate panels (FIG. 5), which were then allowed to sit for 30 minutes at room temperature. Panels were coated with either the example powder formulation or the example conventional powder formulation. Topcoat was applied over the primer formulations, and substrate panels were allowed to sit for 30 minutes at room temperature. Substrate panels were then incubated in an oven at 360° C. for 12 minutes.

The example powder formulation showed improved gloss retention (FIG. 3) and improved DOI (FIG. 4) compared to the example conventional powder formulation. The example powder formulation also showed improved performance on the seam and sealant of the substrate as indicated by less sagging, less discoloration, and less peeling of the sealant on the seam than was observed when using the conventional powder formulation (FIG. 5). The example powder formulation also showed significantly less bleed through the topcoat than the example conventional powder formulation (FIG. 6).

Example 7: Non-Limiting Scratch Test Characteristics of Topcoat Formulations The scratch test of various topcoat formulations were measured using the international standard method described in ISO 1518-1 to assess scratch resistance of the coatings. Panels were coated with topcoat formulations A-R. Panels were evaluated for force to scratch and depth of scratch. For force to scratch, force was increased in 0.5 N increments until a visible scratch was observed. Testing was terminated after a visual scratch was observed. For depth of scratch, a scratch was made in each panel using 8 N force, and the depth and width of the resulting scratch was measured using a laser microscope. Results of force to scratch and depth of scratch experiments are provided in Tables 4A-4B, respectively. Topcoat formulations A-R used for force to scratch and depth of scratch experiments are provided in Table 4C.

TABLE 4A

Results of force to scratch experiments

| Formulation on Panel | Force | | | |
| --- | --- | --- | --- | --- |
| | 0.5N | 1.0N | 1.5N | 2.0N |
| A | Y | ND | ND | ND |
| B | Y | ND | ND | ND |
| C | Y | ND | ND | ND |
| D | N | Y | ND | ND |
| E | N | Y | ND | ND |
| F | N | Y | ND | ND |
| G | N | Y | ND | ND |
| H | N | Y | ND | ND |
| I | Y | ND | ND | ND |
| J | Y | ND | ND | ND |
| K | Y | ND | ND | ND |
| L | Y | ND | ND | ND |
| M | N | Y | ND | ND |
| N | N | Y | ND | ND |
| O | N | N | N | Y |
| P | N | Y | ND | ND |
| Q | N | Y | ND | ND |
| R | N | N | N | Y |

Y, visible scratch observed; N, no visible scratch observed; ND, not determined.

TABLE 4B

Results of depth of scratch experiments

| Formulation on Panel | Width of Scratch (nm) | Depth of Scratch (nm) |
| --- | --- | --- |
| A | 210 | 4.5 |
| B | 185 | 3.5 |
| C | 197 | 3.8 |
| D | 207 | 3.7 |
| E | 205 | 4.0 |
| F | 201 | 3.5 |
| G | 195 | 3.5 |
| H | 191 | 3.9 |
| I | 210 | 2.9 |
| J | 237 | 3.1 |
| K | 197 | 3.6 |
| L | 201 | 3.2 |
| M | 204 | 4.0 |
| N | 231 | 6.0 |
| O | 214 | 5.9 |
| P | 204 | 2.5 |
| Q | 184 | 2.9 |
| R | 213 | 5.0 |

TABLE 4C

| Component | Use | A* | B* | C* | D* | E* | F* | G* | H* |
|---|---|---|---|---|---|---|---|---|---|
| Carboxyl functional polyester resin (acid value: 28-36) | Carboxyl functional polyester resin | 80 | 80 | 80 | 80 | 80 | 80 | 80 | 80 |
| Triglycidyl isocyanurate | Curing agent | 5.9 | 5.9 | 5.9 | 5.9 | 5.9 | 5.9 | 5.9 | 5.9 |
| Acrylic polymer and silica - 3 | Flow modifier - 3 | 1.5 | 1.5 | 1.5 | 1.5 | 1.5 | 1.5 | 1.5 | 1.5 |
| Micronized amide wax coated with benzoin | Degassing agent | 0.5 | 0.5 | 0.5 | 0.5 | 0.5 | 0.5 | 0.5 | 0.5 |
| Wax-based processing additive with pigment-affinic groups | Wetting agent | 1.5 | 1.5 | 1.5 | 1.5 | 1.5 | 1.5 | 1.5 | 1.5 |
| Brominated catalyst on silica | Phase-transfer catalyst | 0.3 | 0.3 | 0.3 | 0.3 | 0.3 | 0.3 | 0.3 | 0.3 |
| Pigment black | Pigment | 1.2 | 1.2 | 1.2 | 1.2 | 1.2 | 1.2 | 1.2 | 1.2 |
| Octadecanyl β-(3,5-Di-tert-butyl-4-hydroxyphenyl)propionate | Antioxidant | 0.3 | 0.3 | 0.3 | 0.3 | 0.3 | 0.3 | 0.3 | 0.3 |
| Barium titanate | Transfer efficiency additive | 0.75 | 0.75 | 0.75 | 0.75 | 0.75 | 0.75 | 0.75 | 0.75 |
| Barium sulfate | Corrosion resistance filler | 8.05 | 3.05 | 3.05 | 7.55 | 2.55 | 7.55 | 7.55 | 7.55 |
| Polyisocyanate adduct | Crosslinking agent | 0 | 5.0 | 0 | 0 | 5.0 | 0 | 0 | 0 |
| Blocked cycloaliphatic polyisocyanate | Crosslinking agent | 0 | 0 | 5.0 | 0 | 0 | 0 | 0 | 0 |
| Low-density polyethylene/aluminum oxide nanocomposite | Scratch resistance agent | 0 | 0 | 0 | 0.5 | 0.5 | 0 | 0 | 0 |
| Polytetrafluoroethylene | Scratch resistance agent | 0 | 0 | 0 | 0 | 0 | 0.5 | 0 | 0 |
| Crystalline polyethylene | Scratch resistance agent | 0 | 0 | 0 | 0 | 0 | 0 | 0.5 | 0 |
| Polyethylene and polytetrafluoroethylene -1 | Scratch resistance agent | 0 | 0 | 0 | 0 | 0 | 0 | 0 | 0.5 |
| Organosilicone polyether copolymer | Scratch resistance agent | 0 | 0 | 0 | 0 | 0 | 0 | 0 | 0 |
| Silane treated aluminum trihydroxide | Scratch resistance agent | 0 | 0 | 0 | 0 | 0 | 0 | 0 | 0 |
| Polyethylene and polytetrafluoroethylene -2 | Scratch resistance agent | 0 | 0 | 0 | 0 | 0 | 0 | 0 | 0 |
| Hybrid carboxy/hydroxy functional metal organic adhesion promoter absorbed upon a precipitated silica carrier | Adhesion promoting agent | 0 | 0 | 0 | 0 | 0 | 0 | 0 | 0 |
| Fatty acid antistatic | Antistatic agent | 0 | 0 | 0 | 0 | 0 | 0 | 0 | 0 |
| Polyethylene and polytetrafluoroethylene -3 | Scratch resistance agent | 0 | 0 | 0 | 0 | 0 | 0 | 0 | 0 |
| High-density polyethylene/aluminum oxide nanocomposite | Scratch resistance agent | 0 | 0 | 0 | 0 | 0 | 0 | 0 | 0 |
| Total (%) | | 100 | 100 | 100 | 100 | 100 | 100 | 100 | 100 |

| Component | I* | J* | K* | L* | M* | N* | O* | P* | Q* | R* |
|---|---|---|---|---|---|---|---|---|---|---|
| Carboxyl functional polyester resin (acid value: 28-36) | 80 | 80 | 80 | 80 | 80 | 80 | 80 | 80 | 80 | 80 |
| Triglycidyl isocyanurate | 5.9 | 5.9 | 5.9 | 5.9 | 5.9 | 5.9 | 5.9 | 5.9 | 5.9 | 5.9 |
| Acrylic polymer and silica - 3 | 1.5 | 1.5 | 1.5 | 1.5 | 1.5 | 1.5 | 1.5 | 1.5 | 1.5 | 1.5 |
| Micronized amide wax coated with benzoin | 0.5 | 0.5 | 0.5 | 0.5 | 0.5 | 0.5 | 0.5 | 0.5 | 0.5 | 0.5 |
| Wax-based processing additive with pigment-affinic groups | 1.5 | 1.5 | 1.5 | 1.5 | 1.5 | 1.5 | 1.5 | 1.5 | 1.5 | 1.5 |
| Brominated catalyst on silica | 0.3 | 0.3 | 0.3 | 0.3 | 0.3 | 0.3 | 0.3 | 0.3 | 0.3 | 0.3 |

TABLE 4C-continued

Non-limiting examples of topcoat formulations

| | | | | | | | | | | |
|---|---|---|---|---|---|---|---|---|---|---|
| Pigment black | 1.2 | 1.2 | 1.2 | 1.2 | 1.2 | 1.2 | 1.2 | 1.2 | 1.2 | 1.2 |
| Octadecanyl β-(3,5-Di-tert-butyl-4-hydroxyphenyl)propionate | 0.3 | 0.3 | 0.3 | 0.3 | 0.3 | 0.3 | 0.3 | 0.3 | 0.3 | 0.3 |
| Barium titanate | 0.75 | 0.75 | 0.75 | 0.75 | 0.75 | 0.75 | 0.75 | 0.75 | 0.75 | 0.75 |
| Barium sulfate | 7.55 | 0 | 7.8 | 7.3 | 7.05 | 7.55 | 5.83 | 7.05 | 7.55 | 7.55 |
| Polyisocyanate adduct | 0 | 0 | 0 | 0 | 0 | 0 | 0 | 0 | 0 | 0 |
| Blocked cycloaliphatic polyisocyanate | 0 | 0 | 0 | 0 | 0 | 0 | 0 | 0 | 0 | 0 |
| Low-density polyethylene/aluminum oxide nanocomposite | 0 | 0 | 0.25 | 0.75 | 1.0 | 0 | 0.5 | 0 | 0 | 0 |
| Polytetrafluoroethylene | 0 | 0 | 0 | 0 | 0 | 0 | 0 | 0 | 0 | 0 |
| Crystalline polyethylene | 0 | 0 | 0 | 0 | 0 | 0 | 0 | 0 | 0 | 0 |
| Polyethylene and polytetrafluoroethylene -1 | 0 | 0 | 0 | 0 | 0 | 0 | 0 | 0 | 0 | 0 |
| Organosilicone polyether copolymer | 0.5 | 0 | 0 | 0 | 0 | 0 | 0 | 0 | 0 | 0 |
| Silane treated aluminum trihydroxide | 0 | 8.05 | 0 | 0 | 0 | 0 | 0 | 0 | 0 | 0 |
| Polyethylene and polytetrafluoroethylene -2 | 0 | 0 | 0 | 0 | 0 | 0.5 | 0 | 0 | 0 | 0 |
| Hybrid carboxy/hydroxy functional metal organic adhesion promoter absorbed upon a precipitated silica carrier | 0 | 0 | 0 | 0 | 0 | 0 | 1.7 | 0 | 0 | 0 |
| Fatty acid antistatic | 0 | 0 | 0 | 0 | 0 | 0 | 0 | 1.0 | 0 | 0 |
| Polyethylene and polytetrafluoroethylene -3 | 0 | 0 | 0 | 0 | 0 | 0 | 0 | 0 | 0.5 | 0 |
| High-density polyethylene/aluminum oxide nanocomposite | 0 | 0 | 0 | 0 | 0 | 0 | 0 | 0 | 0 | 0.5 |
| Total (%) | 100 | 100 | 100 | 100 | 100 | 100 | 100 | 100 | 100 | 100 |

*wt. %

Other Embodiments

It is to be understood that while the document has been described in conjunction with the detailed description thereof, the foregoing description is intended to illustrate and not limit the scope of the document. Other aspects, advantages, and modifications are within the scope of the following claims.

Exemplary embodiments are provided below.

Embodiment 1 is a powder formulation for a topcoat, the formulation comprising:
 a carboxyl functional polyester resin, a hydroxyl functional polyester resin, or both;
 a curing agent;
 a degassing agent;
 a flow modifier; and
 one or more of the following: a scratch resistance agent, a transfer efficiency additive, or a phase-transfer catalyst,
 wherein the formulation has one or more of the following characteristics:
  improved mechanical resistance (e.g., a scratch resistance of about 15 to about 45 mg loss of weight);
  improved sealant coverage (e.g., sealant coverage characterized by a thickness of about 25 to about 250 microns and/or by a percentage coverage of at least 60%);
  improved coverage of one or more edges, corners, ridges, welds, seams, or combinations thereof (e.g., edge coverage of at least 12%, corner coverage of at least 12%, weld coverage of about 25 to about 250 microns, and/or seam coverage of about 25 to about 250 microns);
  improved transfer efficiency (e.g., transfer efficiency of at least 60%);
  improved gloss consistency;
  improved bleed through;
  reduced discoloring; and/or
  reduced gassing defects (e.g., a cured coating that is substantially free of visible gassing defects).

Embodiment 2 is the powder formulation of embodiment 1, wherein the carboxyl functional polyester resin comprises an acid number of about 25 to about 75 mg KOH/g of resin.

Embodiment 3 is the powder formulation of embodiment 1 or embodiment 2, wherein the carboxyl functional polyester resin comprises an acid number of about 25 to about 75 mg KOH/g of resin and an equivalent weight of about 1440 to about 2225.

Embodiment 4 is the powder formulation of any one of embodiments 1-3, wherein the hydroxyl functional polyester resin comprises a hydroxyl number of about 20 to about 200 mg KOH/g of resin.

Embodiment 5 is the powder formulation of any one of embodiments 1-4, wherein the hydroxyl functional polyester resin comprises a hydroxyl number of about 75 to about 150 mg KOH/g of resin.

Embodiment 6 is the powder formulation of any one of embodiments 1-5, wherein the curing agent comprises a polyepoxide, an isocyanate, a glycidyl ester, a hydroxyalkylamide, or a combination of any of these.

Embodiment 7 is the powder formulation of embodiment 6, wherein the curing agent comprises triglycidyl isocyanurate, tris(2,3-epoxypropyl) isocyanurate, glycidyl methacrylate, triglycidyl trimellitate, diglycidyl terephthalate, β-hydroxyalkylamide, or a combination of any of these.

Embodiment 8 is the powder formulation of any one of embodiments 1-7, wherein the degassing agent comprises benzoin, benzoin coated polyamide, polyamide, polyethylene, a modified or derivative form of any of these, or a combination of any of these.

Embodiment 9 is the powder formulation of embodiment 8, wherein the flow modifier comprises an acrylic polymer.

Embodiment 10 is the powder formulation of embodiment 9, wherein the acrylic polymer further comprises an adsorbed acrylic polymer on a particle.

Embodiment 11 is the powder formulation of any one of embodiments 1-10, wherein the scratch resistance agent comprises polyethylene, wax, polysiloxane, an organosilicone polyether copolymer, a surface treated filler (e.g., silane treated with aluminum trihydrate, barium sulfate, or both), or a combination of any of these.

Embodiment 12 is the powder formulation of embodiment 11, wherein the scratch resistance agent further comprises a metal oxide.

Embodiment 13 is the powder formulation of embodiment 12, wherein the metal oxide is aluminum oxide, titanium dioxide, silica dioxide, zinc oxide, copper oxide, or a combination of any of these.

Embodiment 14 is the powder formulation of any one of embodiments 1-13, wherein the transfer efficiency additive comprises a ceramic (e.g., as a powder, particle, granule, or a free flowing form).

Embodiment 15 is the powder formulation of embodiment 14, wherein the ceramic comprises barium titanate, zirconium titanate, strontium titanate, barium strontium titanate, potassium niobate, sodium niobate, or a combination of any of these.

Embodiment 16 is the powder formulation of embodiments 1-15, wherein the phase-transfer catalyst comprises an ammonium salt or a phosphonium salt (e.g., optionally adsorbed on a solid carrier).

Embodiment 17 is the powder formulation of embodiment 16, wherein the ammonium salt comprises $N^+(R^{N1})_4 X^-$, and wherein each $R^{N1}$ is, independently, hydrogen (H) or an optionally substituted $C_{1-18}$ hydrocarbyl group (e.g., alkyl, haloalkyl, aryl, alkaryl, aralkyl, etc.) and X is an anion.

Embodiment 18 is the powder formulation of embodiment 16, wherein the ammonium salt comprises a tetraalkylammonium halide (e.g., benzyltriethylammonium chloride, benzyltrimethylammonium chloride, tetrabutylammonium bromide, tetrabutylammonium chloride, tetrabutylammonium iodide, tetradecylammonium bromide, tetradecylammonium chloride, tetradecylammonium iodide, butyl triethyl ammonium bromide, butyl triethyl ammonium chloride, or a combination thereof).

Embodiment 19 is the powder formulation of embodiment 16, wherein the phosphonium salt comprises $P^+(R^{P1})_4 X^-$, and wherein each $R^{P1}$ is, independently, hydrogen (H) or an optionally substituted $C_{1-18}$ hydrocarbyl group (e.g., alkyl, haloalkyl, aryl, alkaryl, aralkyl, etc.) and X is an anion.

Embodiment 20 is the powder formulation of embodiment 16, wherein the phosphonium salt comprises a phosphonium halide (e.g., phosphonium bromide, phosphonium chloride, phosphonium iodide, and the like), an aryl phosphonium halide (e.g., triphenyl phosphonium bromide, triphenyl phosphonium chloride, triphenyl phosphonium iodide, and the like), or an alkyl phosphonium halide (e.g., tetrabutyl phosphonium bromide, tetrabutyl phosphonium chloride, tetrabutyl phosphonium iodide, and the like), or a combination thereof.

Embodiment 21 is the powder formulation of any one of embodiments 1-20, comprising a combination of the scratch resistance agent and the transfer efficiency additive; a combination of the scratch resistance agent and the phase-transfer catalyst; a combination of the transfer efficiency additive and the phase-transfer catalyst.

Embodiment 22 is the powder formulation of any one of embodiments 1-20, comprising a combination of the scratch resistance agent, the transfer efficiency additive, and the phase-transfer catalyst.

Embodiment 23 is the powder formulation of any one of embodiments 1-22, further comprising a wetting agent.

Embodiment 24 is the powder formulation of embodiment 23, wherein the wetting agent comprises a wax or a modified wax, a wax based wetting agent with pigment affinic groups, a silicone based wetting agent, or a combination of any of these.

Embodiment 25 is the powder formulation of any one of embodiments 1-24, further comprising an antioxidant.

Embodiment 26 is the powder formulation of embodiment 25, wherein the antioxidant comprises a phenolic ester and/or an organophosphorous compound (e.g., organophosphonite).

Embodiment 27 is the powder formulation of embodiment 26, wherein the phenolic ester comprises octadecyl-3-(3,5-di-tert.butyl-4-hydroxyphenyl)-propionate.

Embodiment 28 is the powder formulation of embodiment 26, wherein the organophosphorous compound comprises a diphosphonite, or an aromatic diphosphonite.

Embodiment 29 is the powder formulation of any one of embodiments 1-28, further comprising a pigment (e.g., a non-conductive pigment).

Embodiment 30 is the powder formulation of embodiment 29, wherein the pigment comprises an organic pigment (e.g., carbon black), an inorganic pigment (e.g., titanium dioxide), or a combination thereof.

Embodiment 31 is the powder formulation of any one of embodiments 1-30, further comprising a matting agent.

Embodiment 32 is the powder formulation of embodiment 31, wherein the matting agent comprises an acrylic resin.

Embodiment 33 is the powder formulation of any one of embodiments 1-32, further comprising a crosslinking agent.

Embodiment 34 is the powder formulation of embodiment 33, wherein the crosslinking agent comprises an isocyanate (e.g., a polyisocyanate, an isocyanate adduct, an aliphatic polyisocyanate, a cycloaliphatic polyisocyanate, and the like), a glycidyl ester (e.g., glycidyl methacrylate, triglycidyl trimellitate, diglycidyl terephthalate, and the like), a hydroxyalkylamide (e.g., β-hydroxyalkylamide, and the like), or a combination of any of these.

Embodiment 35 is the powder formulation of embodiment 34, wherein the isocyanate comprises an NCO content of about 10 wt % to about 30 wt %.

Embodiment 36 is the powder formulation of any one of embodiments 1-35, further comprising a corrosion resistance filler (e.g., as a powder, particle, granule, or a free flowing form).

Embodiment 37 is the powder formulation of embodiment 36, wherein the corrosion resistance filler comprises an alkaline earth metal salt (e.g., aluminum silicate, aluminum triphosphate, aluminum zinc phosphate, barium chromate, barium metaborate, barium sulfate, calcium aluminum phosphate, calcium aluminum silicate, calcium barium phosphosilicate, calcium borosilicate, calcium carbonate, calcium chromate, calcium molybdate, calcium phosphate, calcium strontium phosphosilicate, calcium strontium zinc phosphosilicate, calcium sulphate, calcium zinc molybdate, strontium aluminum phosphate, strontium chromate, strontium phosphate, or any combination of these), an aluminate, a borate, a borosilicate, a carbonate, a chromate, a molybdate, an oxide, a phosphate, a phosphosilicate, a silicate, a sulfate (e.g., including one or more metals or metalloids), and/or zinc or a zinc salt (e.g., zinc aluminum phosphate, calcium strontium zinc phosphosilicate, calcium zinc molybdate, zinc aluminum calcium phosphate, zinc borate, zinc borate phosphate hydrate, zinc calcium aluminum strontium phosphate, zinc calcium phosphate, zinc calcium strontium phosphate, zinc dust, zinc flakes, zinc hydroxy phosphate, zinc molybdate, zinc oxide, zinc phosphate, zinc potassium chromate, zinc tetrahydroxy chromate, or any combination of these).

Embodiment 38 is the powder formulation of any one of embodiments 1-37, further comprising an adhesion promoting agent.

Embodiment 39 is the powder formulation of embodiment 38, wherein the adhesion promoting agent comprises a hybrid carboxy-functional hydroxy-functional metal organic compound.

Embodiment 40 is the powder formulation of any one of embodiments 1-39, further comprising a rheology modifier (e.g., silica, (e.g., silane treated silica), clay (e.g., inorganic clay), talc, or other particles).

Embodiment 41 is the powder formulation of any one of embodiments 1-40, wherein the carboxyl functional polyester resin is present in a total amount of about 40 wt % to about 90 wt % of the formulation.

Embodiment 42 is the powder formulation of any one of embodiments 1-41, wherein the hydroxyl functional polyester resin is present in a total amount of about 40 wt % to about 90 wt % of the formulation.

Embodiment 43 is the powder formulation of any one of embodiments 1-42, wherein the powder formulation comprises the hydroxyl functional polyester resin and the carboxyl functional polyester resin, which are present in a total amount of about 40 wt % to about 90 wt % of the formulation.

Embodiment 44 is the powder formulation of any one of embodiments 1-43, wherein the curing agent is present in a total amount of about 1 wt % to about 8 wt % of the formulation.

Embodiment 45 is the powder formulation of any one of embodiments 1-44, wherein the degassing agent is present in a total amount of about 0.05 wt % to about 5 wt % of the formulation.

Embodiment 46 is the powder formulation of any one of embodiments 1-45, wherein the flow modifier present in a total amount of about 0.1 wt % to about 5 wt % of the formulation.

Embodiment 47 is the powder formulation of any one of embodiments 1-46, wherein the scratch resistance agent is present in a total amount of about 0.05 wt % to about 5 wt % of the formulation.

Embodiment 48 is the powder formulation of any one of embodiments 1-47, wherein the transfer efficiency additive is present in a total amount of about 0.05 wt % to about 5 wt % of the formulation.

Embodiment 49 is the powder formulation of any one of embodiments 1-48, wherein the phase-transfer catalyst is present in a total amount of about 0.01 wt % to about 5 wt % of the formulation.

Embodiment 50 is the powder formulation of any one of embodiments 1-49, further comprising a wetting agent present in a total amount of about 0.1 wt % to about 5 wt % of the formulation.

Embodiment 51 is the powder formulation of any one of embodiments 1-50, further comprising an antioxidant present in a total amount of about 0.05 wt % to about 2 wt % of the formulation.

Embodiment 52 is the powder formulation of any one of embodiments 1-51, further comprising a pigment present in a total amount of about 0.1 wt % to about 50 wt % of the formulation.

Embodiment 53 is the powder formulation of any one of embodiments 1-52, further comprising a matting agent present in a total amount of about 0.5 wt % to about 10 wt % of the formulation.

Embodiment 54 is the powder formulation of any one of embodiments 1-53, further comprising a crosslinking agent present in a total amount of about 0.5 wt % to about 10 wt % of the formulation.

Embodiment 55 is the powder formulation of any one of embodiments 1-54, further comprising a corrosion resistance filler is present in a total amount of about 1 wt % to about 50 wt % of the formulation.

Embodiment 56 is the powder formulation of any one of embodiments 1-55, further comprising an adhesion promoting agent present in a total amount of about 0.1 wt % to about 5 wt % of the formulation.

Embodiment 57 is the powder formulation of any one of embodiments 1-56, further comprising a rheology modifier present in a total amount of about 0.05 wt % to about 5 wt % of the formulation.

Embodiment 58 is the powder formulation of any one of embodiments 1-57, wherein the powder formulation has an average particle size of about 30 to about 80 microns.

Embodiment 59 is the powder formulation of any one of embodiments 1-58, wherein the carboxyl functional polyester resin and/or the hydroxyl functional polyester resin is characterized by a viscosity of about 1,000 to 10,000 mPa s at 200° C.

Embodiment 60 is the powder formulation of any one of embodiments 1-59, wherein the powder formulation is characterized by a flow of about 10 to about 95 mm at 340° F.

Embodiment 61 is the powder formulation of any one of embodiments 1-60, wherein the powder formulation is characterized by a scratch resistance of about 15 to about 45 mg loss of weight.

Embodiment 62 is the powder formulation of any one of embodiments 1-61, wherein the powder formulation is characterized by an edge coverage of at least 12%.

Embodiment 63 is the powder formulation of any one of embodiments 1-62, wherein the powder formulation is characterized by a sealant coverage of a thickness of about 25 to about 250 microns and/or a percentage coverage of at least 60%.

Embodiment 64 is a powder formulation for a topcoat, the formulation comprising:
  about 40 wt % to about 90 wt % of a carboxyl functional polyester resin (e.g., SP-6400);
  about 2 wt % to about 8 wt % of a curing agent (e.g., triglycidyl isocyanurate (TGIC));
  about 0.05 wt % to about 5 wt % of a degassing agent (e.g., benzoin coated polyamide);

about 0.5 wt % to about 5 wt % of a flow modifier (e.g., an acrylic polymer);
about 0 wt % to about 5 wt % of a scratch resistance agent (e.g., polyethylene);
about 0 wt % to about 10 wt % of a transfer efficiency additive (e.g., barium titanate); and
about 0 wt % to about 5 wt % of a phase-transfer catalyst (e.g., tetraalkyl ammonium halide),
wherein at least one of the scratch resistance agent, the transfer efficiency additive, or the phase-transfer catalyst is present.

Embodiment 65 is the powder formulation of embodiment 64, further comprising one or more of a filler, a pigment, or a combination thereof to provide 100 wt. %.

Embodiment 66 is a powder formulation for a primer coat, the formulation comprising:
an epoxy resin;
a curing agent;
a degassing agent;
a corrosion resistance filler;
a transfer efficiency additive; and
a flow modifier,
wherein the formulation has one or more of the following characteristics:
improved mechanical resistance (e.g., a scratch resistance of about 15 to about 45 mg loss of weight);
improved sealant coverage (e.g., sealant coverage characterized by a thickness of about 25 to about 250 microns and/or by a percentage coverage of at least 60%);
improved coverage of one or more edges, corners, ridges, welds, seams, or combinations thereof (e.g., edge coverage of at least 12%, corner coverage of at least 12%, weld coverage of about 25 to about 250 microns, and/or seam coverage of about 25 to about 250 microns);
improved transfer efficiency (e.g., transfer efficiency of at least 60%);
improved gloss consistency;
reduced discoloring; and/or
reduced gassing defects (e.g., a cured coating that is substantially free of visible gassing defects).

Embodiment 67 is the powder formulation of embodiment 66, wherein the epoxy resin has an epoxy equivalent weight (EEW) of about 500 to about 1250 g/eq.

Embodiment 68 is the powder formulation of embodiment 66 or embodiment 67, wherein the epoxy resin comprises bisphenol A (BPA), diglycidyl ether of bisphenol A (DGEBA), glycidyl end-capped poly(bisphenol A-co-DGEBA), glycidyl end-capped poly(bisphenol A-co-epichlorohydrin), glycidyl end-capped poly(bisphenol F-co-epichlorohydrin), glycidyl end-capped poly(bisphenol F-co-epichlorohydrin)-co-(bisphenol A-co-epichlorohydrin), poly(alkylene glycol) diglycidyl ether, poly(tetrahydrofuran) diglycidyl ether, or a combination thereof.

Embodiment 69 is the powder formulation of any one of embodiments 66-68, wherein the curing agent comprises cyanamide, dicyanamide, dicyandiamide, guanidine, cyanoguanidine, diguanide, resin (e.g., acid functional acrylic resin, carboxyl functional polyester resin, phenolic resin, novolac phenolic resin, or any combination thereof), diacid, hydroxyalkylamide, or a combination thereof.

Embodiment 70 is the powder formulation of any one of embodiments 66-69, wherein the curing agent comprises an acid functional acrylic resin.

Embodiment 71 is the powder formulation of embodiment 70, wherein the acid functional acrylic resin comprises acrylic monomers, acrylic acid derivatives, methacrylic acid derivatives, or a combination thereof.

Embodiment 72 is the powder formulation of embodiment 70 or embodiment 71, wherein the acid functional acrylic resin comprises an acid number of about 30 to 70 mg KOH/g of resin.

Embodiment 73 is the powder formulation of any one of embodiments 66-72, wherein the curing agent comprises a diacid.

Embodiment 74 is the powder formulation of embodiment 73, wherein the diacid comprises dodecanediolic acid.

Embodiment 75 is the powder formulation of any one of embodiments 66-74, wherein the curing agent comprises a hydroxyalkylamide.

Embodiment 76 is the powder formulation of any one of embodiments 66-75, wherein the degassing agent comprises benzoin, benzoin coated polyamide, polyamide, a derivative form of any of these, or a combination of any of these.

Embodiment 77 is the powder formulation of any one of embodiments 66-76, wherein the corrosion resistance filler comprises alkaline earth metal salt (e.g., aluminum silicate, aluminum triphosphate, aluminum zinc phosphate, barium chromate, barium metaborate, barium sulfate, calcium aluminum phosphate, calcium aluminum silicate, calcium barium phosphosilicate, calcium borosilicate, calcium carbonate, calcium chromate, calcium molybdate, calcium phosphate, calcium strontium phosphosilicate, calcium strontium zinc phosphosilicate, calcium sulphate, calcium zinc molybdate, strontium aluminum phosphate, strontium chromate, strontium phosphate, or any combination of these), an aluminate, a borate, a borosilicate, a carbonate, a chromate, a molybdate, an oxide, a phosphate, a phosphosilicate, a silicate, a sulfate (e.g., including one or more metals or metalloids), and/or zinc or a zinc salt (e.g., zinc aluminum phosphate, calcium strontium zinc phosphosilicate, calcium zinc molybdate, zinc aluminum calcium phosphate, zinc borate, zinc borate phosphate hydrate, zinc calcium aluminum strontium phosphate, zinc calcium phosphate, zinc calcium strontium phosphate, zinc dust, zinc flakes, zinc hydroxy phosphate, zinc molybdate, zinc oxide, zinc phosphate, zinc potassium chromate, zinc tetrahydroxy chromate, or any combination of these).

Embodiment 78 is the powder formulation of any one of embodiments 66-77, wherein the transfer efficiency additive comprises a ceramic (e.g., as a powder, particle, granule, or a free flowing form).

Embodiment 79 is the powder formulation of embodiment 78, wherein the ceramic comprises barium titanate, zirconium titanate, strontium titanate, barium strontium titanate, potassium niobate, sodium niobate, or a combination of any of these.

Embodiment 80 is the powder formulation of embodiment 79, wherein the flow modifier comprises an acrylic polymer.

Embodiment 81 is the powder formulation of embodiment 80, wherein the acrylic polymer comprises an adsorbed acrylic polymer on a particle.

Embodiment 82 is the powder formulation of any one of embodiments 66-81, further comprising a pigment.

Embodiment 83 is the powder formulation of embodiment 82, wherein the pigment comprises titanium dioxide.

Embodiment 84 is the powder formulation of any one of embodiments 66-83, further comprising a phase-transfer catalyst.

Embodiment 85 is the powder formulation of embodiment 84, wherein the phase-transfer catalyst an ammonium salt or a phosphonium salt (e.g., optionally adsorbed on a solid carrier).

Embodiment 86 is the powder formulation of embodiment 85, wherein the ammonium salt comprises $N^+(R^{N1})_4X^-$, and wherein each $R^{N1}$ is, independently, hydrogen (H) or an optionally substituted $C_{1-18}$ hydrocarbyl group (e.g., alkyl, haloalkyl, aryl, alkaryl, aralkyl, etc.) and X is an anion.

Embodiment 87 is the powder formulation of embodiment 85, wherein the ammonium salt comprises a tetraalkylammonium halide (e.g., benzyltriethylammonium chloride, benzyltrimethylammonium chloride, tetrabutylammonium bromide, tetrabutylammonium chloride, tetrabutylammonium iodide, tetradecylammonium bromide, tetradecylammonium chloride, tetradecylammonium iodide, butyl triethyl ammonium bromide, butyl triethyl ammonium chloride, or a combination thereof).

Embodiment 88 is the powder formulation of embodiment 85, wherein the phosphonium salt comprises $P^+(R^{P1})_4X^-$, and wherein each $R^{P1}$ is, independently, hydrogen (H) or an optionally substituted $C_{1-18}$ hydrocarbyl group (e.g., alkyl, haloalkyl, aryl, alkaryl, aralkyl, etc.) and X is an anion.

Embodiment 89 is the powder formulation of embodiment 85, wherein the phosphonium salt comprises a phosphonium halide (e.g., phosphonium bromide, phosphonium chloride, phosphonium iodide, and the like), an aryl phosphonium halide (e.g., triphenyl phosphonium bromide, triphenyl phosphonium chloride, triphenyl phosphonium iodide, and the like), or an alkyl phosphonium halide (e.g., tetrabutyl phosphonium bromide, tetrabutyl phosphonium chloride, tetrabutyl phosphonium iodide, and the like), or a combination thereof.

Embodiment 90 is the powder formulation of any one of embodiments 66-89, further comprising an antistatic agent.

Embodiment 91 is the powder formulation of any one of embodiments 66-90, further comprising a conductive agent.

Embodiment 92 is the powder formulation of embodiment 91, wherein the conductive agent comprises conductive carbon black, graphene, graphite fibers, carbon fibers, metal coated carbon fibers, carbon nanotubes, or a combination thereof.

Embodiment 93 is the powder formulation of embodiment 92, wherein the conductive agent is provided in powder, pellet, or bead form.

Embodiment 94 is the powder formulation of any one of embodiments 66-93, further comprising a wetting agent.

Embodiment 95 is the powder formulation of embodiment 94, wherein the wetting agent comprises a wax, a modified wax, a wax based wetting agent with pigment affinic groups, a silicone based wetting agent, an acrylic polymer, or a combination thereof.

Embodiment 96 is the powder formulation of any one of embodiments 66-95, further comprising a crosslinking agent.

Embodiment 97 is the powder formulation of embodiment 96, wherein the crosslinking agent comprises a hydroxyalkylamide.

Embodiment 98 is the powder formulation of any one of embodiments 66-97, further comprising a rheology modifier.

Embodiment 99 is the powder formulation of any one of embodiments 66-98, wherein the epoxy resin is present in a total amount of about 20 wt % to about 70 wt % of the formulation.

Embodiment 100 is the powder formulation of any one of embodiments 66-99, wherein the curing agent is present in a total amount of about 0.1 wt % to about 30 wt % of the formulation.

Embodiment 101 is the powder formulation of any one of embodiments 66-100, wherein the degassing agent is present in a total amount of about 0.05 wt % to about 5 wt % of the formulation.

Embodiment 102 is the powder formulation of any one of embodiments 66-101, wherein the corrosion resistance filler is present in a total amount of about 1 wt % to about 80 wt % of the formulation.

Embodiment 103 is the powder formulation of any one of embodiments 66-102, wherein the transfer efficiency additive is present in a total amount of about 0.05 wt % to about 5 wt % of the formulation.

Embodiment 104 is the powder formulation of any one of embodiments 66-103, further comprising a flow modifier present in a total amount of about 0.05 wt % to about 10 wt % of the formulation.

Embodiment 105 is the powder formulation of any one of embodiments 66-104, further comprising a pigment present in a total amount of about 1 wt % to about 10 wt % of the formulation.

Embodiment 106 is the powder formulation of any one of embodiments 66-105, further comprising a phase-transfer catalyst present in a total amount of about 0.05 wt % to about 10 wt % of the formulation.

Embodiment 107 is the powder formulation of any one of embodiments 66-106, further comprising an antistatic agent present in a total amount of about 0.05 wt % to about 5 wt % of the formulation.

Embodiment 108 is the powder formulation of any one of embodiments 66-107, further comprising a conductive agent present in a total amount of about 0.01 wt % to about 0.8 wt % of the formulation.

Embodiment 109 is the powder formulation of any one of embodiments 66-108, further comprising a wetting agent present in a total amount of about 0.05 wt % to about 10 wt % of the formulation.

Embodiment 110 is the powder formulation of any one of embodiments 66-109, further comprising a crosslinking agent present in a total amount of about 0.05 wt % to about wt % of the formulation.

Embodiment 111 is the powder formulation of any one of embodiments 66-110, wherein the powder formulation has an average particle size between about 20 and about 30 microns.

Embodiment 112 is the powder formulation of any one of embodiments 66-111, wherein the epoxy resin is characterized by a viscosity of about 1,000 to 10,000 mPa s at 200° C.

Embodiment 113 is the powder formulation of any one of embodiments 66-112, wherein the powder formulation is characterized by a flow of about 10 to 80 mm at 340° F.

Embodiment 114 is the powder formulation of any one of embodiments 66-113, wherein the powder formulation is characterized by an edge coverage of at least 16%.

Embodiment 115 is the powder formulation of any one of embodiments 66-114, wherein the powder formulation is characterized by a sealant coverage of a thickness of about 12.5 to about 125 microns and/or a percentage coverage of at least 60%.

Embodiment 116 is a powder formulation for a primer coat, the formulation comprising:

about 20 wt % to about 70 wt % of an epoxy resin (e.g., KD-242G);

about 0.1 wt % to about 30 wt % of a curing agent (e.g., dicyandiamide);
about 0.05 wt % to about 5 wt % of a degassing agent (e.g., benzoin coated polyamide);
about 1 wt % to about 80 wt % of a corrosion resistance filler (e.g., zinc dust and/or barium sulfate);
about 0.05 wt % to about 5 wt % of a transfer efficiency additive (e.g., barium titanate); and
about 0.5 wt % to about 5 wt % of a flow modifier (e.g., an acrylic polymer).

Embodiment 117 is a powder coating system comprising:
the powder formulation of any one of embodiments 66-116 for a primer coat; and
the powder formulation of any one of embodiments 1-65 for a topcoat.

Embodiment 118 is a powder coating system comprising:
a first powder formulation for a primer coat, wherein the first powder formulation comprises an epoxy resin and a cyanimide curing agent; and
a second powder formulation for a topcoat, wherein the second powder formulation comprises a carboxyl functional polyester resin and an epoxy curing agent.

Embodiment 119 is the powder coating system of embodiment 118, wherein the first powder formulation further comprises a degassing agent, a flow modifier, a corrosion resistance filler, a transfer efficiency additive, or a combination thereof.

Embodiment 120 is the powder coating system of embodiment 118 or embodiment 119, wherein the first powder formulation further comprises a pigment, a phase-transfer catalyst, an antistatic agent, a conductive agent, a wetting agent, or a crosslinking agent.

Embodiment 121 is the powder coating system of any one of embodiments 118-120, wherein the first powder formulation further comprises an antioxidant, an adhesion promoting agent, or a rheology modifier.

Embodiment 122 is the powder coating system of any one of embodiments 118-121, wherein the second powder formulation further comprises a degassing agent, a corrosion resistance filler, a transfer efficiency additive, a flow modifier, or a combination thereof.

Embodiment 123 is the powder coating system of any one of embodiments 118-122, wherein the second powder formulation further comprises a wetting agent, a phase-transfer catalyst, an antioxidant, a pigment, a matting agent, a crosslinking agent, an adhesion promoting agent, or a rheology modifier.

Embodiment 124 is a powder coated substrate comprising:
a substrate; and
a cured coating, wherein the cured coating comprises:
a primer coat disposed on at least a portion of a surface of the substrate, wherein the primer coat comprises the powder formulation of any one of embodiments 67-118 or a cured form thereof; and
a topcoat disposed on at least a portion of a surface of the primer, wherein the topcoat comprises the powder formulation of any one of embodiments 1-66 or a cured form thereof.

Embodiment 125 is the powder coated substrate of embodiment 124, wherein the cured coating is formed from the powder formulation of embodiment 67 and the powder formulation of embodiment 1.

Embodiment 126 is the powder coated substrate of embodiment 124 or embodiment 125, wherein the cured coating has a dry coating thickness between about 50 microns and about 1 mm.

Embodiment 127 is the powder coated substrate of any one of embodiments 124-126, wherein the cured coating has a surface smoothness on the Powder Coating Institute (PCI) scale of at least 4.

Embodiment 128 is the powder coated substrate of embodiment 127, wherein the cured coating has a surface smoothness on the PCI scale of at least 6.

Embodiment 129 is the powder coated substrate of any one of embodiments 124-128, wherein the cured coating has a scratch resistance between 0.5 and 5 N.

Embodiment 130 is the powder coated substrate of any one of embodiments 124-129, wherein the cured coating has a crosshatch adhesion of 4B to 5B.

Embodiment 131 is the powder coated substrate of any one of embodiments 124-130, wherein the substrate comprises a metal substrate, a plastic substrate, a wood substrate, or a combination thereof.

Embodiment 132 is a powder coated substrate comprising:
a substrate; and
a cured coating, wherein the cured coating comprises:
a primer coat disposed on at least a portion of a surface of the substrate, wherein the primer coat comprises a first powder formulation comprising an epoxy resin and a cyanimide curing agent or a cured form thereof; and
a topcoat disposed on at least a portion of a surface of the primer, wherein the topcoat comprises a second powder formulation comprising a carboxyl functional polyester resin and an epoxy curing agent or a cured form thereof.

Embodiment 133 is a method comprising:
applying the powder formulation of any one of embodiments 1-65 as a topcoat to at least a portion of a surface of a substrate; and
heating the substrate, thereby forming a cured topcoat on the substrate.

Embodiment 134 is the method of embodiment 133, wherein the substrate comprises a metal substrate, a plastic substrate, a wood substrate, or a combination thereof.

Embodiment 135 is the method of embodiment 133 or embodiment 134, wherein the substrate comprises a seam.

Embodiment 136 is the method of embodiment 135, wherein the seam comprises a sealant.

Embodiment 137 is the method of embodiment 136, wherein the sealant comprises silicone, acrylic plastisols, or both.

Embodiment 138 is the method of any one of embodiments 133-137, wherein the substrate comprises a ridge.

Embodiment 139 is the method of any one of embodiments 133-138, wherein said applying comprises applying the powder formulation to a seam of the substrate.

Embodiment 140 is the method of any one of embodiments 133-139, wherein said applying comprises applying the powder formulation to a ridge of the substrate.

Embodiment 141 is the method of any one of embodiments 133-140, wherein said applying comprises applying the powder formulation to the substrate using a corona charging system.

Embodiment 142 is the method of any one of embodiments 133-141, wherein said heating comprises heating the substrate to a temperature of about 320° F. to about 375° F.

Embodiment 143 is the method of any one of embodiments 133-142, wherein said heating comprises heating the substrate for between about 20 and about 40 minutes.

Embodiment 144 is the method of any one of embodiments 133-143, wherein the cured topcoat has seam coverage of a thickness of about 25 to about 250 microns and/or a percentage coverage of at least 60%.

Embodiment 145 is the method of any one of embodiments 133-144, wherein the cured topcoat has edge coverage of at least 12%.

Embodiment 146 is a method comprising:
applying a first powder formulation of any one of embodiments 66-116 to a substrate to form a primer coat on at least a portion of a surface of the substrate;
applying a second powder formulation of any one of embodiments 1-65 to at least a portion of a surface of the primer coat to form a topcoat disposed on the primer coat, wherein the primer coat has not been heated prior to forming the topcoat; and
heating the substrate with the primer coat and the topcoat applied thereon, thereby forming a cured coating on at least a portion of the surface of the substrate.

Embodiment 147 is the method of embodiment 146, wherein the substrate comprises a metal substrate, a plastic substrate, a wood substrate, or a combination thereof.

Embodiment 148 is the method of embodiment 146 or embodiment 147, wherein the substrate comprises a seam.

Embodiment 149 is the method of embodiment 148, wherein the seam comprises a sealant.

Embodiment 150 is the method of embodiment 149, wherein the sealant comprises silicone, acrylic plastisols, or both.

Embodiment 151 is the method of any one of embodiments 146-150, wherein the substrate comprises a ridge.

Embodiment 152 is the method of any one of embodiments 146-151, wherein said applying the first and/or second powder formulation comprises applying the first powder formulation to a seam of the substrate.

Embodiment 153 is the method of any one of embodiments 146-152, wherein said applying the first and/or second powder formulation comprises applying the first and/or second powder formulation to a ridge of the substrate.

Embodiment 154 is the method of any one of embodiments 146-153, wherein said applying the first and/or second powder formulation comprises first and/or second powder formulation using a corona charging system.

Embodiment 155 is the method of any one of embodiments 146-154, wherein heating the substrate comprises heating the substrate to a temperature of about 300° F. to about 425° F. (e.g., about 320° F. to about 375° F.).

Embodiment 156 is the method of any one of embodiments 146-155, wherein heating the substrate comprises heating the substrate for between about 5 and about 60 minutes (e.g., between about 20 and about 40 minutes.

Embodiment 157 is the method of any one of embodiments 146-156, wherein the cured coating has seam coverage of a thickness of about 12.5 to about 375 microns and/or a percentage coverage of at least 60%.

Embodiment 158 is the method of any one of embodiments 146-157, wherein the cured coating has edge coverage of at least 12%.

Embodiment 159 is a method comprising:
applying a first powder formulation to a substrate to form a primer coat on at least a portion of a surface of the substrate;
applying a second powder formulation of any one of embodiments 1-65 to at least a portion of a surface of the primer coat to form a topcoat disposed on the primer coat, wherein the primer coat has not been heated prior to forming the topcoat; and
heating the substrate with the primer coat and the topcoat applied thereon, thereby forming a cured coating on at least a portion of the surface of the substrate.

Embodiment 160 is a method comprising:
applying a first powder formulation to a substrate to form a primer coat on at least a portion of a surface of the substrate, wherein the first powder formulation comprises an epoxy resin and a cyanimide curing agent or a cured form thereof;
applying a second powder formulation to at least a portion of a surface of the primer coat to form a topcoat disposed on the primer coat, wherein the second powder formulation comprises a carboxyl functional polyester resin and an epoxy curing agent or a cured form thereof; and
heating the substrate with the primer coat and the topcoat applied thereon, thereby forming a cured coating on at least a portion of the surface of the substrate.

What is claimed is:

1. A powder coating system comprising:
a powder formulation for a topcoat comprising:
about 40 wt % to about 90 wt % of a carboxyl functional polyester resin, a hydroxyl functional polyester resin, or both;
about 0.1 wt % to about 10 wt % of a first curing agent;
about 0.05 wt % to about 5 wt % of a degassing agent;
about 0.1 wt % to about 5 wt % of a first flow modifier; and
one or more of about 0.05 wt % to about 5 wt % of a scratch resistance agent, about 0.05 wt % to about 5 wt % of a first transfer efficiency additive, and about 0.05 wt % to about 5 wt % of a phase-transfer catalyst;
a powder formulation for a primer coat comprising:
about 20 wt % to about 70 wt % of an epoxy resin;
about 0.1 wt % to about 30 wt % of a second curing agent;
about 1 wt % to about 80 wt % of a corrosion resistance filler; and
about 0.05 wt % to about 5 wt % of a second flow modifier;
wherein the powder coating system is formulated to provide a cured coating in which the powder formulations for the topcoat and the primer coat are simultaneously cured on a substrate using a single cure step;
the powder formulation for the topcoat is characterized by a flow of about 40 mm to about 95 mm at 340° F. using ASTM test method D4242; and
the powder formulation for the primer coat is characterized by a flow of about 45 mm to about 80 mm at 340° F. using ASTM test method D4242.

2. The powder coating system of claim 1, wherein the powder formulation for the primer coat comprises:
about 0.05 wt % to about 5 wt % of a second degassing agent, about 0.05 wt % to about 5 wt % of a second transfer efficiency additive, or both.

3. The powder coating system of claim 1, wherein the powder coating system is suitable to provide a cured coating having one or more of the following characteristics:
a scratch resistance of about 15 to about 45 mg loss of weight using ASTM test method D4060;
a sealant coverage characterized by a thickness of the cured coating of about 25 to about 250 microns by a percentage coverage of at least 60% using ASTM test method D4138;
an edge coverage of at least 12% using an Edge Coverage Test;

a transfer efficiency of at least 60% using ASTM test method D5286-20; and the cured coating is substantially free of visible defects selected from the group consisting of a loss of gloss, sagging, blistering, discoloration, striation, a loss of adhesion, microcracks, bleed through, and combinations thereof.

4. The powder coating system of claim 1, wherein the carboxyl functional polyester resin comprises an acid number of about 25 to about 75 mg KOH/g of resin.

5. The powder coating system of claim 1, wherein the first curing agent comprises a polyepoxide, an isocyanate, a glycidyl ester, a hydroxyalkylamide, or combinations thereof.

6. The powder coating system of claim 1, wherein the degassing agent comprises benzoin, benzoin coated polyamide, polyamide, polyethylene, a modified or derivative form of any of these, or combinations thereof.

7. The powder coating system of claim 1, wherein the powder formulation for the topcoat comprises the scratch resistance agent, and the scratch resistance agent comprises polyethylene, wax, polysiloxane, an organosilicone polyether copolymer, a surface treated filler, or combinations thereof.

8. The powder coating system of claim 1, wherein the powder formulation for the topcoat comprises the first transfer efficiency additive, and the first transfer efficiency additive comprises a ceramic.

9. The powder coating system of claim 1, wherein the powder formulation for the topcoat comprises the phase-transfer catalyst, and the phase-transfer catalyst comprises an ammonium salt or a phosphonium salt.

10. The powder coating system of claim 1, wherein the powder formulation for the topcoat further comprises a corrosion resistance filler.

11. The powder coating system of claim 1, wherein the powder formulation for the topcoat is characterized by a flow of about 50 mm to about 95 mm at 340° F. using ASTM test method D4242.

12. The powder coating system of claim 1, wherein the epoxy resin has an epoxy equivalent weight (EEW) of about 500 to about 1250 g/eq.

13. The powder coating system of claim 1, wherein the second curing agent comprises cyanamide; dicyanamide; dicyandiamide; guanidine; cyanoguanidine; diguanide; an acid functional acrylic resin, a carboxyl functional polyester resin, a phenolic resin, a novolac phenolic resin; a diacid; hydroxyalkylamide; or combinations thereof.

14. The powder coating system of claim 1, wherein the corrosion resistance filler comprises an alkaline earth metal salt, an aluminate, a borate, a borosilicate, a carbonate, a chromate, a molybdate, an oxide, a phosphate, a phosphosilicate, a silicate, a sulfate, zinc, a zinc salt, or combinations thereof.

15. The powder coating system of claim 2, wherein the second transfer efficiency additive comprises a ceramic.

16. The powder coating system of claim 1, wherein the powder formulation for the primer coat is characterized by a flow of about 50 mm to about 80 mm at 340° F. using ASTM test method D4242.

17. The powder coating system of claim 1, wherein the powder formulation for the primer coat further comprises a pigment.

18. The powder coating system of claim 1, wherein the corrosion resistance filler comprises a compound comprising zinc or a zinc salt.

19. The powder coating system of claim 18, wherein the corrosion resistance filler comprises zinc dust, zinc flakes, zinc phosphate, or a combination thereof.

20. The powder coating system of claim 1, wherein the powder formulation for the topcoat further comprises one or more curing catalysts.

21. The powder coating system of claim 1, wherein the powder formulation for the primer coat further comprises one or more curing catalysts.

22. The powder coating system of claim 1, wherein the powder formulation for the topcoat comprises the scratch resistance agent, the first transfer efficiency additive, and the phase-transfer catalyst.

23. The powder coating system of claim 1, wherein the powder formulation for the topcoat comprises the first transfer efficiency additive, and the first transfer efficiency additive comprises barium titanate.

24. A powder coating system comprising:
a powder formulation for a topcoat comprising:
about 40 wt % to about 90 wt % of a carboxyl functional polyester resin, a hydroxyl functional polyester resin, or both;
at least about 1 wt. % of a first curing agent;
about 0.05 wt % to about 5 wt % of a degassing agent;
about 0.1 wt % to about 5 wt % of a first flow modifier; and
one or more of a scratch resistance agent, a first transfer efficiency additive, and a phase-transfer catalyst;
a powder formulation for a primer coat comprising:
about 20 wt % to about 70 wt % of an epoxy resin;
about 0.1 wt % to about 30 wt % of a second curing agent;
about 1 wt % to about 80 wt % of a corrosion resistance filler; and
about 0.05 wt % to about 5 wt % of a second flow modifier;
wherein the powder coating system is formulated to provide a cured coating in which the powder formulations for the topcoat and the primer coat are simultaneously cured on a substrate using a single cure step;
the powder formulation for the topcoat is characterized by a flow about 40 mm to about 95 mm at 340° F. using ASTM test method D4242; and
the powder formulation for the primer coat is characterized by a flow of about 45 mm to about 80 mm at 340° F. using ASTM test method D4242.

* * * * *